(12) United States Patent
Giannakis et al.

(10) Patent No.: US 7,706,454 B2
(45) Date of Patent: Apr. 27, 2010

(54) FULL-DIVERSITY, FULL-RATE COMPLEX-FIELD SPACE-TIME CODING FOR WIRELESS COMMUNICATION

(75) Inventors: Georgios B. Giannakis, Minnetonka, MN (US); Xiaoli Ma, Auburn, AL (US)

(73) Assignee: Regents of the University of Minnesota, St. Paul, MN (US)

( * ) Notice: Subject to any disclaimer, the term of this patent is extended or adjusted under 35 U.S.C. 154(b) by 1453 days.

(21) Appl. No.: 10/955,336

(22) Filed: Sep. 30, 2004

(65) Prior Publication Data

US 2005/0105631 A1 May 19, 2005

Related U.S. Application Data

(60) Provisional application No. 60/507,829, filed on Oct. 1, 2003.

(51) Int. Cl.
*H04K 1/10* (2006.01)
*H04L 27/28* (2006.01)

(52) U.S. Cl. .................. 375/260; 375/356; 375/371

(58) Field of Classification Search .............. 375/260, 375/354, 355, 356, 359, 365, 265, 262, 259, 375/267

See application file for complete search history.

(56) References Cited

U.S. PATENT DOCUMENTS

| | | | |
|---|---|---|---|
| 6,088,408 A | 7/2000 | Calderbank et al. | |
| 6,351,499 B1 | 2/2002 | Paulraj et al. | |
| 6,442,214 B1 | 8/2002 | Boleskei et al. | |
| 6,452,981 B1 | 9/2002 | Raleigh et al. | |
| 6,614,861 B1 | 9/2003 | Terry et al. | |
| 6,865,237 B1 | 3/2005 | Boariu et al. | |
| 6,898,248 B1 | 5/2005 | Elgamal et al. | |
| 6,956,815 B2 | 10/2005 | Chiodini | |
| 2002/0122502 A1 | 9/2002 | El-Gamal et al. | |
| 2002/0136327 A1 | 9/2002 | El-Gamal et al. | |
| 2002/0163892 A1 | 11/2002 | Hassibi et al. | |
| 2005/0058217 A1* | 3/2005 | Sandhu et al. | 375/267 |
| 2005/0128936 A1* | 6/2005 | Shao | 370/208 |

FOREIGN PATENT DOCUMENTS

WO 2001/080446 A2 10/2001

OTHER PUBLICATIONS

Paulraj, A.J.; Papadias, C.B.; "Space-time processing for wireless communications" Signal Processing Magazine, IEEE vol. 14, Issue 6, Nov. 1997 pp. 49-83.*

(Continued)

*Primary Examiner*—Chieh M Fan
*Assistant Examiner*—Qutbuddin Ghulamali
(74) *Attorney, Agent, or Firm*—Shumaker & Sieffert, P.A.

(57) ABSTRACT

A wireless communication system is described that generates FDFR transmissions with any number of transmit and receive antennas through flat-fading channels and frequency- or time-selective channels. In particular, the system utilizes layer-specific linear complex-field (LCF) coding with a circular form of layered space-time (ST) multiplexing to achieve FDFR wireless communications with any number of transmit and receive antennas through flat-fading and frequency- or time-selective channels. Additionally, the described techniques provide flexibility for desirable tradeoffs among performance, rate, and complexity.

48 Claims, 15 Drawing Sheets

OTHER PUBLICATIONS

Onggosanusi, E.N.; Sayeed, A.M.; Van Veen, B.D.; "Canonical space-time processing for wireless communications", Communications, IEEE Transactions on vol. 48, Issue 10, Oct. 2000 pp. 1669-1680.*

L. Wei et al., "Space-Time-Frequency Block Coding Over Rayleigh Fading Channels For OFDM Systems," Proceedings of the International Conference on Communication Technology, ICCT 2003, vol. 2, pp. 1008-1012, Apr. 2003.

F.W. Vook et al., "Transmit Diversity Schemes for Broadband Mobile Communication Systems," Vehicular Technology Conference Fall 2000, IEEE Vehicular Technology Society, pp. 2523-2529, Sep. 24-28, 2000.

A. Duel-Hallen et al., "Long-Range Predication of Fading Channels," IEEE Signal Processing Magazine, pp. 62-75, May 2000.

A. Lapidoth et al., "Fading Channels: How Perfect Need "Perfect Side Information" be?," in Procedures IEEE Information Theory Communications Workshop, pp. 36-38, Jun. 1999.

A. M. Sayeed et al., "Joint Multipath-Doppler Diversity in Mobile Wireless Communications," IEEE Transactions On Communications, vol. 47, No. 1, pp. 123-132, Jan. 1999.

A. Medles et al., "Linear Space-Time Coding at Full Rate and Full Diversity," Proceedings of IEEE International Symposium on Information Theory, pp. 221, Lausanne, Switzerland, Jun. 30-Jul. 5, 2002.

A. Scaglione et al., "Filterbank Transceivers Optimizing Information Rate in block Transmissions Over Dispersive Channels," IEEE Transactions on Information Theory, vol. 45, No. 3, pp. 1019-1032, Apr. 1999.

A. Scaglione et al., "Redundant Filterbank Precoders and Equalizers, Part I: Unification and Optimal Designs," IEEE Transactions on Signal Processing, vol. 47, No. 7, pp. 1988-2006, Jul. 1999.

A. Scaglione et al., "Redundant Filterbank Precoders and Equalizers, Part II: Blind Channel Estimation, Synchronization, and Direct Equalization," IEEE Transactions on Signal Processing, Jul. 1999, vol. 47, No. 7, pp. 2007-2022.

A. Stamoulis et al., "Block FIR Decision-Feedback Equalizers for Filterbank Precoded Transmissions with Blind Channel Estimation Capabilities," IEEE Transactions on Communications, vol. 49, No. 1, pp. 69-83, Jan. 2001.

O. Tirkkonen et al., "Improved MIMO Performance with Non-Orthogonal Space-Time Block Codes," IEEE Global Telecommunications Conference, pp. 1122-1126, San Antonio, TX, Nov. 25-29, 2001.

B. Hassibi et al., "Cayley Differential Unitary Space-Time Codes," IEEE Transactions on Information Theory, vol. 48, No. 6, pp. 1485-1503, Jun. 2002.

B. Hassibi et al., "High-Rate Codes that are Linear in Space and Time," IEEE Transactions on Information Theory, vol. 48, No. 7, pp. 1-56, Apr. 24, 2001.

B. Hassibi et al., "How Much Training Is Needed in Multiple-Antenna Wireless Links?" IEEE Transactions On Information Theory, vol. 49, No. 4, pp. 951-963, Apr. 2003.

B. Hassibi et al., "On the Expected Complexity of Sphere Decoding," Proceedings of the 35th Asilomar Conference on Signals, Systems, and Computers, vol. 2, pp. 1051-1055, Pacific Grove, CA, Nov. 4-7, 2001.

B. Hochwald et al., "Achieving Near-Capacity on a Multiple-Antenna Channel,"pp. 1-30, Dec. 9, 2002.

B. Le Floch et al., "Coded Orthogonal Frequency Division Multiplex," Proceedings of the IEEE, vol. 83, No. 6, pp. 982-996, Jun. 1995.

B.D. Jelicic et al., "Design of Trellis Coded QAM for Flat Fading and AWGN Channels," IEEE Transactions on Vehicular Technology, vol. 44, No. 1, pp. 192-201, Feb. 1994.

B.M. Hochwald et al., "Space-Time Autocoding," IEEE Transactions on Information Theory, vol. 47, No. 7, pp. 2761-2781, Nov. 2001.

C. Fragouli et al., "Finite-Alphabet Constant-Amplitude Training Sequence for Multiple-Antenna Broadband Transmissions," Procedures of IEEE International Conference on Communications, vol. 1, pp. 6-10, NY City, Apr. 28-May 1, 2002.

C. Fragouli et al., "Reduced-Complexity Training Schemes for Multiple-Antenna Broadband Transmissions," Procedure of Wireless Communications and Networking Conference, vol. 1, pp. 78-83, Mar. 17-21, 2002.

C. Lamy et al., "On Random Rotations Diversity and Minimum MSE Decoding of Lattices," IEEE Transactions on Information Theory, vol. 46, No. 4, pp. 1584-1589, Jul. 2000.

C. Tepedelenlioglu et al., "Transmitter Redundancy for Blind Estimation and Equalization of Time-and Frequency-Selective Channels," IEEE Transactions On Signal Processing, vol. 48, No. 7, pp. 2029-2043, Jul. 2000.

G. Caire et al., "Bit-Interleaved Coded Modulation," IEEE Transactions on Information Theory, vol. 44, No. 3, pp. 927-946, May 1998.

M. de Courville et al., "Blind Equalization of OFDM Systems Based on the Minimization of a Quadratic Criterion," IEEE International Conference on Communications, Dallas, USA, vol. 3 of 3, pp. 1318-1321, Jun. 1996.

C. Budianu et al., "Channel Estimation for Space-Time Orthogonal Block Codes," IEEE Transactions on Signal Processing, vol. 50, No. 10, pp. 2515-2528, Oct. 2002.

D. K. Borah et al., "Frequency-Selective Fading Channel Estimation with a Polynomial Time-Varying Channel Model," IEEE Transactions On Communications, vol. 47, No. 6, pp. 862-873, Jun. 1999.

D. L. Goeckel, "Coded Modulation With Non-Standard Signal Sets for Wireless OFDM Systems," in Procedures International Conference Communications, Vancouver, BC, Canada, pp. 791-795, Jun. 1999.

D. Rainish, "Diversity Transform for Fading Channels," IEEE Transactions on Communications, vol. 44, No. 12, pp. 1653-1661, Dec. 1996.

E. Agrell et al., "Closest Point Search in Lattices," IEEE Transactions on Information Theory, vol. 48, No. 8, pp. 2201-2214, Aug. 2002.

E. Biglieri et al., "Fading Channels: Information-Theoretic and Communications Aspects," IEEE Transactions on Information Theory, vol. 44, No. 6, pp. 2619-2692, Oct. 1998.

E. Viterbo et al., "A Universal Lattice Code Decoder for Fading Channels," IEEE Transactions on Information Theory, vol. 45, No. 5, pp. 1639-1642, Jul. 1999.

ETSI Normalization Committee, "Channel Models for Hiper-Lan/2 in Different Indoor Scenarios," Norme ETSI, Document 3ERI085b, European Telecommunications Standards Institute, Sophia-Antipolis, France, 1998.

F. Tufvesson et al., "OFDM Time and Frequency Synchronization by Spread Spectrum Pilot Technique," in Procedures 8th IEEE Communication Theory Mini-Conference, Vancouver, BC, Canada, pp. 1-5, Jun. 1999.

P.K. Frenger et al., "Decision-Directed Coherent Detection in Multicarrier Systems on Rayleigh Fading Channels," IEEE Transactions On Vehicular Technology, vol. 48, No. 2, pp. 490-498, Mar. 1999.

G.B. Giannakis et al., "AMOUR—Generalized Multicarrier Transceivers for Blind CDMA Regardless of Multipath," IEEE Transactions on Communications, vol. 48, No. 12, pp. 2064-2076, Dec. 2000.

G.B. Giannakis et al., "Basis Expansion Models and Diversity Techniques for Blind Identification and Equalization of Time-Varying Channels," Proceedings of the IEEE, vol. 86, No. 10, pp. 1969-1986, Oct. 1998.

G.B. Giannakis et al., "Space-Time-Doppler Coding Over Time-Selective Fading Channels with Maximum Diversity and Coding Gains," Procedure of International Conference on ASSP, vol. 3, pp. III-2217-III-2220, Orlando, FL, May 13-17, 2002.

G.B. Giannakis, "Cyclostationary Signal Analysis," The Digital Signal Processing Handbook, V.K. Madisetti and D. B. Williams, Eds. Boca Raton, FL: CRC, Chapter 17, 1998.

G.B. Giannakis, "Filterbanks for Blind Channel Identification and Equalization," IEEE Signal Processing Letters, vol. 4, No. 6, pp. 184-187, Jun. 1997.

G.J. Foschini et al., "On Limits of Wireless Communication in a Fading Environment When Using Multiple Antennas," Wireless Personal Communications, vol. 6, No. 3, pp. 311-335, Mar. 1998.

G.J. Foschini, "Layered Space-Time Architecture for Wireless Communications in a Fading Environment When Using Multi-Element Antennas," Bell Labs Technical Journal, vol. 1, No. 2, pp. 41-59, 1996.

G.K. Kaleh, "Channel Equalization for Block Transmission Systems," IEEE Journal on Selected Areas In Communications, vol. 13, No. 1, pp. 110-121, Jan. 1995.

H. Bolcskei et al., "Blind Channel Identification and Equalization in OFDM-Based Multiantenna Systems," IEEE Transactions on Signal Processing, vol. 50, No. 1, pp. 96-109, Jan. 2002.

H. El Gamal et al., "A New Approach to Layered Space-Time Coding and Signal Processing," IEEE Transactions on Information Theory, vol. 47, No. 6, pp. 2321-2334, Sep. 2001.

H. El Gamal et al., "An Algebraic Number Theoretic Framework for Space-Time Coding," Proceedings of the IEEE International Symposium on Information Theory, pp. 132, Lausanne, Switzerland, Jun. 30-Jul. 5, 2002.

H. El Gamal et al., "SISO Codes for MIMO Channels," Proceedings of the $40^{th}$ Annual Allerton Conference on Communication, Control and Computing, pp. 916-925, Monticello, II, Oct. 2002.

H. El Gamal et al., "Threaded Algebraic Space-Time Signaling," Proceedings of the 2002 IEEE Information Theory Workshop, pp. 65-68, Bangalore, India, Oct. 20-25, 2002.

H. Liu et al., "A High-Efficiency Carrier Estimator for OFDM Communications," IEEE Communications Letters, vol. 2, No. 4, pp. 104-106, Apr. 1998.

H. Sari et al., "Transmission Techniques for Digital Terrestrial TV Broadcasting," IEEE Communications Magazine, vol. 33, pp. 100-103, Feb. 1995.

H. Vikalo et al., "Optimal Training for Frequency-Selective Fading Channels," Procedures of International Conference on ASSP, Salt Lake City, Utah, vol. 4, pp. 2105-2108, May 7-11, 2001.

H. Wang et al., "Upper Bounds of Rates of Complex Orthogonal Space-Time Block Codes," IEEE Transactions on Information Theory, vol. 49, No. 10, pp. 2788-2796, Oct. 2003.

R.W. Heath, Jr. et al., "Exploiting Input Cyclostationarity for Blind Channel Identification in OFDM Systems," IEEE Transactions on Signal Processing, vol. 47, No. 3, pp. 848-856, Mar. 1999.

I. Barhumi et al., "Optimal Training Sequences for Channel Estimation in MIMO OFDM Systems in Mobile Wireless Channels," Procedures of International Zurich Seminar on Access, Transmission, Networking of Broadband Communications, 6 pgs., ETH Zurich, Switzerland, Feb. 19-21, 2002.

I.E. Telatar, "Capacity of Multiple-Antenna Gaussian Channels," European Transactions Telecommunications, vol. 10, pp. 1-28, Nov.-Dec. 1998.

J. Baltersee et al., "Achievable Rate of MIMO Channels With Data-Aided Channel Estimation and Perfect interleaving," IEEE Journal on Selected Areas In Communication, vol. 19, No. 12, 2358-2368, Dec. 2001.

J. Boutros et al., "Good Lattice Constellations for Both Rayleigh Fading and Gaussian Channels," IEEE Transactions on Information Theory, vol. 42, No. 2, pp. 502-518, Mar. 1996.

J. Boutros et al., "Signal Space Diversity: A Power- and Bandwidth-Efficient Diversity Technique for the Rayleigh Fading Channel," IEEE Transactions on Information Theory, vol. 44, No. 4, pp. 1453-1467, Jul. 1988.

J.A. Gansman et al., "Optimum and Suboptimum Frame Synchronization for Pilot-Symbol-Assisted Modulation," IEEE Transactions on Communciations, vol. 45, No. 10, pp. 1327-1337, Oct. 1997.

J.F. Helard et al., "Trellis Coded Orthogonal Frequency Division Multiplexing for Digital Video Transmission," Proceedings of the Global Telecommunications Conference, vol. 2, Phoenix, AZ, Dec. 2-5, 1991, pp. 785-791.

J.H. Manton et al., "Affine Precoders for Reliable Communications," in Procedures International Conference ASSP, vol. 5, Istanbul, Turkey, pp. 2749-2752, Jun. 2000.

J.K. Cavers, "An Analysis of Pilot Symbol Assisted Modulation for Rayleigh Fading Channels," IEEE Transactions On Vehicular Technology, vol. 40, No. 4, pp. 686-693, Nov. 1991.

J.K. Cavers, "Pilot Symbol Assisted Modulation and Differential Detection in Fading and Delay Spread," IEEE Transactions On Communications, vol. 43, No. 7, pp. 2206-2212, Jul. 1995.

J.K. Tugnait et al., "Second-Order Statistics-Based Blind Equalization of IIR Single-Input Multiple-Output Channels with Common Zeros," IEEE Transactions On Signal Processing, vol. 47, No. 1, pp. 147-157, Jan. 1999.

Jiann-Ching Guey et al., "Signal Design for Transmitter Diversity Wireless Communication Systems Over Rayleigh Fading Channels," IEEE Transactions on Communications, vol. 47, No. 4, pp. 527-537, Apr. 1999.

K. Boulle et al., "Modulation Schemes Designed for the Rayleigh Channel," Proceedings of the 1992 Conference on Information Sciences and Systems, Princeton, NJ, pp. 288-293, Mar. 1992.

K. Liu et al., "Improved Layered Space-Time Processing in Multiple Antenna Systems," Proceedings of the $39^{th}$ Annual Allerton Conference on Communication, Control and Computing, Monticello, IL, pp. 757-766, Oct. 2001.

L. Zheng et al., "Optimal Diversity-Multiplexing Tradeoff in Multiple Antenna Channels," Procedure of the $39^{th}$ Allerton Conference on Communication, Control and Computing, pp. 835-844, Monticello, IL, Oct. 2001.

L. Zheng et al., "Communication on the Grassmann Manifold: A Geometric Approach to the Noncoherent Multiple-Antenna Channel," IEEE Transactions On Information Theory, vol. 48, No. 2, pp. 359-383, Feb. 2002.

L. Zheng et al., "Diversity and Multiplexing: A Fundamental Tradeoff in Multiple Antenna Channels," IEEE Transactions on Information Theory, vol. 49, No. 5, pp. 1073-1096, May 2003.

L.M. Davis et al., "Joint MAP Equalization and Channel Estimation for Frequency-Selective and Frequency-Flat Fast-Fading Channels," IEEE Transactions On communications, vol. 49, No. 12, pp. 2106-2114, Dec. 2001.

M. Damen et al., "A Construction of a Space-Time Code Based on Number Theory," IEEE Transactions on Information Theory, vol. 48, No. 3, pp. 753-760, Mar. 2002.

M. Dong et al., "Optimal Design and Placement of Pilot Symbols for Channel Estimation," IEEE Transactions On Signal Processing, vol. 50, No. 12, pp. 3055-3069, Dec. 2002.

M. Guillaud et al., "Multi-Stream Coding for MIMO OFDM Systems With Space-Time-Frequency Spreading," Wireless Personal Multimedia Communications, the $5^{th}$ International Symposium, vol. 1, pp. 120-124, Oct. 27-30, 2002.

M. Martone, "Wavelet-Based Separating Kernels for Sequence Estimation with Unknown Rapidly Time-Varying Channels," IEEE Communications Letter, vol. 3, No. 3, pp. 78-80, Mar. 1999.

M. Medard, "The Effect Upon Channel Capacity in Wireless Communications of Perfect and Imperfect Knowledge of the Channel," IEEE Transactions on Information Theory, vol. 46, No. 3, pp. 933-946, May 2000.

M. Morelli et al., "Carrier-Frequency Estimation for Transmissions Over Selective Channels," IEEE Transactions On Communications, vol. 48, No. 9, pp. 1580-1589, Sep. 2000.

M. Pohst, "On the Computation of Lattice Vectors of Minimal Length, Successive Minima and Reduced Bases with Applications," ACM SIGSAM Bulletin, vol. 15, No. 1, pp. 37-44, Feb. 1981.

M. Sandell et al., "A Comparative Study of Pilot-Based Channel Estimators for Wireless OFDM," pp. 5-34, Sep. 1996.

M.K. Tsatsanis et al., "Equalization of Rapidly Fading Channels: Self-Recovering Methods," IEEE Transactions on Communications, vol. 44, No. 5, pp. 619-630, May 1996.

M.K. Tsatsanis et al., "Modelling and Equalization of Rapidly Fading Channels," International Journal of Adaptive Control and Signal Processing, vol. 10, pp. 159-176, May 1996.

M.K. Tsatsanis et al., "Pilot Symbol Assisted Modulation in Frequency Selective Fading Wireless Channels," IEEE Transactions On Signal Processing, vol. 48, No. 8, pp. 2353-2365, Aug. 2000.

M.O. Damen et al., "A Construction of a Space-Time Code Based on Number Theory," IEEE Transactions on Information Theory, vol. 48, No. 3, pp. 753-760, Mar. 2002.

M.O. Damen et al., "A Number Theory Based Dual Transmit Antennae Space-Time Code," Procedure of GLOBECOM Conference, IEEE Global Telecommunications Conference, vol. 1, pp. 485-489, San Antonio, TX, Nov. 25-29, 2001.

M.O. Damen et al., "Diagonal Algebraic Space-Time Block Codes," IEEE Transactions on Information Theory, vol. 48, No. 3, pp. 628-636, Mar. 2002.

M.V. Clark, "Adaptive Frequency-Domain Equalization and Diversity Combining for Broadband Wireless Communications," IEEE Journal on Selected Areas in Communications, vol. 16, No. 8, pp. 1385-1395, Oct. 1998.

V. Mignone et al., "CD3-OFDM: A Novel Demodulation Scheme for Fixed and Mobile Receivers," IEEE Transactions on Communications, vol. 44, No. 9, pp. 1144-1151, Sep. 1996.

B. Muquet et al., "A Subspace Based Blind and Semi-Blind Channel Identification Method for OFDM Systems," 1999 $2^{nd}$ IEEE Workshop on Signal Processing Advances in Wireless Communications, Annapolis, MD, pp. 170-173, May 9-12, 1999.

N. Al-Dhahir et al., "Block Transmission Over Dispersive Channels: Transmit Filter Optimization and Realization, and MMSE-DFE Receiver Performance," IEEE Transactions Information Theory, vol. 42, No. 1, pp. 137-160, Jan. 1996.

N. Al-Dhahir et al., "The Finite-Length Multi-Input Multi-Output MMSE-DFE," IEEE Transactions on Signal Processing, 48(10), pp. 1-38, 2000.

O. Damen et al., "Lattice Code Decoder for Space-Time Codes," IEEE Communications Letters, vol. 4, No. 5, pp. 161-163, May 2000.

P. Hoeher et al., "Channel Estimation with Superimposed Pilot Sequence," in Procedure GLOBECOM Conference, Brazil, pp. 1-5, Dec. 1999.

P. Hoeher et al., "Two-Dimensional Pilot-Symbol-Aided Channel Estimation by Wiener Filtering," Procedures of International Conference on Acoustics, Speech and Signal Processing, Munich, Germany, vol. 3, pp. 1845-1848, Apr. 1997.

P. Schramm et al., "Pilot Symbol Assisted BPSK on Rayleigh Fading Channels with Diversity: Performance Analysis and Parameter Optimization," IEEE Transactions on Communications, vol. 46, No. 12, pp. 1560-1563, Dec. 1998.

P. Schramm, "Analysis and Optimization of Pilot-Channel-Assisted BPSK for DS-CDMA Systems," IEEE Transactions Communications, vol. 46, No. 9, pp. 1122-1124, Sep. 1998.

P.H. Moose, "A Technique for Orthogonal Frequency Division Multiplexing Frequency Offset Correction," IEEE Transactions On Communications, vol. 42, No. 10, pp. 2908-1314, Oct. 1994.

P.W. Wolniansky et al., "V-BLAST: An Architecture for Realizing Very High Data Rates Over the Rich-Scattering Wireless Channel," Procedure of URSI International Symposium Signals, Systems, and Electronics, Italy, 6 pages, Sep. 1998.

Q. Sun et al., "Estimation of Continuous Flat Fading MIMO Channel," IEEE Transactions On Wireless Communications, vol. 1, No. 4, pp. 549-553, Oct. 2002.

R. Negi et al., "Pilot Tone Selection for Channel Estimation in a Mobile OFDM System," IEEE Transactions On Consumer Electronics, vol. 44, No. 3, pp. 1122-1128, Aug. 1998.

R.J. Piechocki et al., "Performance Evaluation of BLAST-OFDM Enhanced Hiperlan/2 Using Stimulated and Measured Channel Data," Electronics Letters, vol. 37, No. 18, pp. 1137-1139, Aug. 30, 2001.

R.M. Gray, "On the Asymptotic Eigenvalue Distribution of Toeplitz Matrices," IEEE Transactions On Information Theory, vol. IT-18, No. 6, pp. 725-730, Nov. 1972.

R.W. Heath, Jr., et al., "Linear Dispersion Codes for MIMO Systems Based on Frame Theory," IEEE Transactions on Signal Processing, vol. 50, No. 10, pp. 2429-2441, Oct. 2002.

A. Ruiz et al., "Discrete Multiple Tone Modulation with Coset Coding for the Spectrally Shaped Channel," IEEE Transactions on Communications, vol. 4, No. 6, pp. 1012-1029, Jun. 1992.

S. Adireddy et al, "Optimal Placement of Training for Frequency-Selective Block-Fading Channels," IEEE Transactions On Information Theory, vol. 48, No. 8, pp. 2338-2353, Aug. 2002.

S. Adireddy et al., "Detection With Embedded Known Symbols: Optimal Symbol Placement and Equalization," In Procedures of International Conference ASSP, vol. 5, Istanbul, Turkey, pp. 2541-2544, Jun. 2000.

S. Adireddy et al., "Optimal Embedding of Known Symbols for OFDM," in Procedures International Conference, ASSP, vol. 4, Salt Lake City, UT, May 2001, 4 pages.

S. Baro et al., "Improved Codes for Space-Time Trellis Coded Modulation," IEEE Communication Letters, vol. 4, pp. 1-3, Jan. 2000.

S. Benedetto et al., "Principles of Digital Transmission: With Wireless Applications," Kluwer Academic/Plenum Publishers, 1 pg., 1999.

S. Bhashyam et al., "Time-Selective Signaling and Reception for Communication Over Multipath Fading Channels," IEEE Transactions On Communications, vol. 48, No. 1, pp. 1-34, Jan. 2000.

S. Galliou et al., "A New Family of Full Rate, Fully Diverse space-Time Codes Based on Galois Theory," ISIT, Lausanne, Switzerland, pp. 419, Jun. 30-Jul. 5, 2002.

S. Ohno et al., "Average-Rate Optimal PSAM Transmissions Over Time-Selective Fading Channels," IEEE Transactions On Wireless Communications, pp. 374-378, Oct. 2002.

S. Ohno et al., "Capacity Maximizing MMSE-Optimal Pilots for Wireless OFDM Over Frequency-Selective Block Rayleigh- Fading Channels," IEEE Transactions On Information Theory, pp. 2138-2145, vol. 50, No. 9, Sep. 2004.

S. Ohno et al., "Optimal Training and Redundant Precoding For Block Transmissions With Application to Wireless OFDM," IEEE Transactions on Communications, vol. 50, No. 12, pp. 2113-2123, Dec. 2002.

S. Zhou et al., "Single-Carrier Space-Time Block-Coded Transmissions Over Frequency-Selective Fading Channels," IEEE Transactions on Information Theory, vol. 49, No. 1, pp. 164-179, Jan. 2003.

S. Zhou et al., "Space-Time Coding With Maximum Diversity Gains Over Frequency-Selective Fading Channels," IEEE Signal Processing Letters, vol. 8, No. 10, pp. 269-272, Oct. 2001.

S. Zhou et al., "Subspace-Based (Semi-) Blind Channel Estimation for Block Precoded Space-Time OFDM," IEEE Transactions On Signal Processing, vol. 50, No. 5, pp. 1215-1228, May 2002.

S.A. Fechtel et al., "Optimal Parametric Feedforward Estimation of Frequency-Selective Fading Radio Channels," IEEE Transactions on Communications, vol. 42, No. 2/3/4, pp. 1639-1650, Feb./Mar./Apr. 1994.

S.M. Alamouti, "A Simple Transmit Diversity Technique for Wireless Communications," IEEE Journal on Selected Areas in Communications, vol. 16, No. 8, pp. 1451-1458, Oct. 1998.

T. Kailath, "Measurements on Time-Variant Communication Channels," IEEE Transactions On Information Theory, vol. IT-8, pp. S229-S236, Sep. 1962.

T. Keller et al., "Adaptive Multicarrier Modulation: A Convenient Framework for Time-Frequency Processing in Wireless Communications," IEEE Proceedings of the IEEE, vol. 88, No. 5, pp. 611-640, May 2000.

E. Telatar, "Capacity of Multi-Antenna Gaussian Channels," European Telecommunications Transactions, vol. 10, No. 6, pp. 585-595, 1999.

T.L. Marzetta and Bertrand M. Hochwald, "Capacity of a Mobile Multiple-Antenna Communication Link in Rayleigh Flat Fading," IEEE Transactions on Information Theory, vol. 45, pp. 1-38, Jan. 1999.

T.P. Holden et al., "A Spread-Spectrum Based Synchronization Technique for Digital Broadcast Systems," IEEE Transactions on Broadcasting, vol. 36, No. 3, pp. 185-194, Sep. 1990.

Tai-Lai Tung et al., "Channel Estimation and Adaptive Power Allocation for Performance and Capacity Improvement of Multiple-Antenna OFDM Systems," Third IEEE Signal Processing Workshop on Signal Processing Advances in Wireless Communications, Taoyuan, Taiwan, pp. 82-85, Mar. 20-23, 2001.

F. Tufvesson et al. "Pilot Assisted Channel Estimation for OFDM in Mobile Cellular Systems," IEEE $47^{th}$ Vehicular Technology Conference, Phoenix, USA, vol. 3, pp. 1639-1643, May 1997.

U. Fincke et al., "Improved Methods for Calculating Vectors of Short Length in Lattice, Including a Complexity Analysis," Mathematics of Computation, vol. 44, No. 170, pp. 463-471, Apr. 1985.

U. Tureli et al., "OFDM Blind Carrier Offset Estimation: ESPRIT," IEEE Transactions On Communications, vol. 48, No. 9, pp. 1459-1461, Sep. 2000.

V. Tarokh et al., "Combined Array Processing and Space-Time Coding," IEEE Transactions on Information Theory, vol. 45, No. 4, pp. 1121-1128, May 1999.

V. Tarokh et al., "Space-Time Block Codes from Orthogonal Designs," IEEE Transactions on Information Theory, vol. 45, No. 5, pp. 1456-1467, Jul. 1999.

V. Tarokh et al., "Space-Time Codes for High Data Rate Wireless Communication: Performance Criterion and Code Construction," IEEE Transactions on Information Theory, pp. 744-765, Mar. 1998.

V.M. DaSilva et al., "Fading-Resistant Modulation Using Several Transmitter Antennas," IEEE Transactions on Communications, vol. 45, No. 10, pp. 1236-1244, Oct. 1997.

J. van de Beek et al., "On Channel Estimation in OFDM Systems," IEEE $45^{th}$ Vehicular Technology Conference, Chicago, Illinois, USA, vol. 2, pp. 815-819, Jul. 1995.

R. van Nee et al., "New High-Rate Wireless LAN Standards," IEEE Communications Magazine, vol. 37, No. 12, pp. 82-88, Dec. 1999.

W. Kozek, "On the Transfer Function Calculus for Underspread LTV Channels," IEEE Transactions On Signal Processing, vol. 45, No. 1, pp. 219-223, Jan. 1997.

W. Zou et al., "COFDM: An Overview," IEEE Transactions on Broadcasting, vol. 41, No. 1, pp. 1-8, Mar. 1995.

W.K. Ma et al., "Quasi-Maximum-Likelihood Multiuser Detection Using Semi-Definite Relaxation with Application to Synchronous CDMA," IEEE Transactions on Signal Processing, vol. 50, No. 4, pp. 912-922, Apr. 2002.

Wen-Yi Kuo et al., "Frequency Offset Compensation of Pilot Symbol Assisted Modulation in Frequency Flat Fading," IEEE Transactions on Communications, vol. 45, No. 11, pp. 1412-1416, Nov. 1997.

X. Giraud et al., "Algebraic Tools to Build Modulation Schemes for Fading Channels," IEEE Transactions on Information Theory, vol. 43, No. 3, pp. 938-952, May 1997.

X. Giraud et al., "Constellations Matched to the Rayleigh Fading Channel," IEEE Transactions on Information Theory, vol. 42, No. 1, pp. 106-115, Jan. 1996.

X. Ma et al, "Space-Time Coding for Doubly-Selective Channels," Procedure of the International Conference on Circuits and Systems, vol. III, pp. 647-650, Scottsdale, AZ, May 25-29, 2002.

X. Ma et al., "Complex Field Coded MIMO Systems: Perfomance, Rate, and Trade-offs," Wireless Communication and Mobile Computing, pp. 693-717, Nov. 2002.

X. Ma et al., "Full-Rate Full-Diversity Space-Time Complex-Field Codes for Frequency-or Time-Selective Fading Channels," Procedure of $36^{th}$ Asilomar Conference on Signals, Systems, and Computers, Pacific Grove, CA, pp. 1714-1718, Nov. 3-6, 2002.

X. Ma et al., "Layered Space-Time Complex Field Coding: Full-Diversity with Full-Rate, and Tradeoffs," 2002 IEEE Sensor Array and Multichannel Signal Processing Workshop Proceedings, pp. 442-446, Rosslyn, VA, Aug. 4-6, 2002.

X. Ma et al., "Maximum Diversity Transmissions Over Doubly Selective Wireless Channels," IEEE Transactions On Information Theory, vol. 49, No. 7, pp. 1832-1840, Jul. 2003.

X. Ma et al., "Maximum-Diversity Transmissions Over Time-Selective Wireless Channels," Proceedings of the Wireless Communications and Networking conference, vol. 1, Orlando, FL, Mar. 17-21, 2002, pp. 497-501.

X. Ma et al., "Non-Data-Aided Carrier Offset Estimators for OFDM With Null Subcarriers: Identifiability, Algorithms, and Performance," IEEE Journal On Selected Areas In Communications, vol. 19, No. 12, pp. 2504-2515, Dec. 2001.

X. Ma et al., "Optimal Training for Block Transmissions Over Doubly Selective Wireless Fading Channels," IEEE Transactions on Signal Processing, vol. 51, No. 5, pp. 1351-1366, May 2003.

X. Ma et al., "Space-Time-Doppler Block Coding for Correlated Time-Selective Fading Channels," IEEE Transactions on Signal Processing, vol. 53, No. 6, pp. 2167-2181, Jun. 2005.

X. Ma et al., "Space-Time-Multipath Coding Using Digital Phase Sweeping," IEEE Global Telecommunications Conference, vol. 1 of 3, Taipei, Taiwan, pp. 384-388, Nov. 17-21, 2002.

X. Ma, et al., "Maximum Diversity Space-Time Systems with Maximum Rate for Any Number of Antennas," Proceedings of the $40^{th}$ Annual Allerton Conference on Communication, Control, and Computing, pp. 725-726, University of Illinois at U-C, Monticello, IL, Oct. 2-4, 2002.

Y. Gong et al., "Space-Frequency-Time Coded OFDM for Broadband Wireless Communications," Global Telecommunications Conference, GLOBECOM '01, IEEE, Vo. 1, pp. 519-523, Nov. 25-29, 2001.

Y. Liu et al., "Space-Time Codes Performance Criteria and Design for Frequency Selective Fading Channels," Procedures of International Conference on Communication, pp. 1-5, vol. 9, Jun. 11-14, 2001.

Y. Xin et al., "High-Rate Layered Space-Time Transmissions Based on Constellation-Rotation," 2002 IEEE Wireless Communications and Networking Conference Record, vol. 1, Orlando, FL, pp. 471-476, Mar. 17-21, 2002.

Y. Xin et al., "High-Rate Space-Time Layered OFDM," IEEE Communciations Letters, vol. 6, No. 5, pp. 187-189, May 2002.

Y. Xin et al., "Linear Unitary Precoders for Maximum Diversity Gains with Multiple Transmit and Receive Antennas," Proceedings of the $34^{th}$ Asilomar Conference on Signals, Systems, and Computers, Pacific Grove, CA, Oct. 29-Nov. 1, 2000, pp. 1553-1557.

Y. Xin et al., "Space-Time Diversity Systems Based on Unitary Constellation-Rotating Precoders," in Procedures International Conference, Speech, Signal Process., Salt Lake City, UT, pp. 2429-2432, May 7-11, 2001.

Y. Xin, et al., "Space-Time Constellation-Rotating Codes Maximizing Diversity and Coding Gains," Proceedings of the GLOBECOM, vol. 1, San Antonio, TX, Nov. 25-27, 2001, pp. 455-459.

Y. Zhang et al., "A Performance Analysis and Design of Equalization with Pilot Aided Channel Estimation," Procedures of the $47^{th}$ Vehicular Technology Conference, vol. 2, pp. 720-724, 1997.

Ye (Geoffrey) Li, "Simplified Channel Estimation for OFDM Systems With Multiple Transmit Antennas," IEEE Transactions On Wireless Communications, vol. 1, No. 1, pp. 67-75, Jan. 2002.

Yuze Zhang et al., "Soft Output Demodulation on Frequency-Selective Rayleigh Fading Channels Using AR Channel Models," Procedures of Global Communications Conference, vol. 1, pp. 327-331, 1997.

Z. Liu et al., "Layered Space-Time Coding Design for High Data Rate Transmissions," 2001 MILCOM Proceedings, Communications for Network-Centric Operations: Creating the Information Force, vol. 2, pp. 1295-1299, McLean, VA, Oct. 28-31, 2001.

Z. Liu et al., "Space-Time Block Coded Multiple Access Through Frequency-Selective Fading Channels," IEEE Transactions on Communications, vol. 49, No. 6, pp. 1033-1044, Jun. 2001.

Z. Liu et al., "Space-Time-Frequency Coded OFDM Over Frequency-Selective Fading Channels," IEEE Transactions on Signal Processing, vol. 50, No. 10, pp. 2465-2476, Oct. 2002.

Z. Liu et al., "Space-Time-Frequency Block Coded OFDM with Subcarrier Grouping and Constellation Precoding," Proceedings of the International Conference on ASSP, Orlando, FL, III-2205-III-2208, May 13-17, 2002.

Z. Wang et al., "A Simple and General Parameterization Quantifying Performance in Fading Channels," IEEE Transactions on Communications, vol. 51, No. 8, pp. 1389-1398, Aug. 2003.

Z. Wang et al., "Complex-Field coding for OFDM Over Fading Wireless Channels," IEEE Transactions on Information Theory, vol. 49, No. 3, pp. 707-720, Mar. 2003.

Z. Wang et al., "Joint Coding-Precoding with Low-Complexity Turbo-Decoding," IEEE Transactions on Wireless Communications, vol. 3, No. 3, pp. 832-842, May 2004.

Z. Wang et al., "Linearly Precoded or Coded OFDM Against Wireless Channel Fades?" Procedure of $3^{rd}$ IEEE Workshop on Signal Processing Advances in Wireless Communications, pp. 267-270, Taoyuan, Taiwan, R.O.C., Mar. 20-23, 2001.

Z. Wang et al., "Optimality of Single-Carrier Zero-Padded Block Transmissions," Procedures of Wireless Communications and Networking Conference, vol. 2, pp. 660-664, 2002.

Z. Wang et al., "Outage Mutual Information of Space-Time MIMO Channels," Proceedings of $40^{th}$ Annual Allerton Conference on Communication, Control, and Computing, Monticello, IL, pp. 885-894, Oct. 2-4, 2002.

Z. Wang et al., "Wireless Multicarrier Communications: Where Fourier Meets Shannon," IEEE Signal Processing Magazine, vol. 17, No. 3, pp. 29-48, May 2000.

S. Zhou et al., "Frequency-Hopped Generalized MC-CDMA for Multipath and Interference Suppression," Proc. of MILCOM Conf., Los Angeles, CA, pp. 937-941, Oct. 22-25, 2000.

S. Zhou et al., "Long Codes for Generalized FH-OFDMA Through Unknown Multipath Channels," IEEE Transactions on Communications, vol. 49, No. 4, pp. 721-733, Apr. 2001.

Y. Xin et al., "Space-Time Diversity Systems Based on Linear Constellation Precoding," IEEE Transactions on Wireless Communications, vol. 2, No. 2, Mar. 2003, pp. 294-309.

Lindskog et al., "A Transmit Diversity Scheme for Channels with Intersymbol Interference," Proc. of ICC, vol. 1, pp. 307-311, Jun. 2000.

* cited by examiner

FULL-DIVERSITY, FULL-RATE COMPLEX-FIELD SPACE-TIME CODING FOR WIRELESS COMMUNICATION

This application claims priority from U.S. Provisional Application Ser. No. 60/507,829, filed Oct. 1, 2003, the entire content of which is incorporated herein by reference.

STATEMENT REGARDING FEDERALLY SPONSORED RESEARCH OR DEVELOPMENT

This invention was made with Government support under University Account Number 522-6484, awarded by the Army Research Lab (ARL/CTA), and Contract No. DAAD19-01-2-011. The Government may have certain rights in this invention.

TECHNICAL FIELD

The invention relates to communication systems and, more particularly, transmitters and receivers for use in wireless communication systems.

BACKGROUND

Rapid increase of cellular service subscribers and wireless applications has stimulated research efforts in developing wireless communication systems that support reliable high rate transmissions over wireless channels. A major challenge in designing high-performance, high-rate systems is the mitigation of fading propagation effects within the prescribed bandwidth and power limitations. In order to mitigate deleterious effects fading has on system performance, transmitters and receivers that exploit available diversity have been developed. To this end, multi-input multi-output (MIMO) wireless links are particularly attractive when compared to single-input single-output wireless links. Existing MIMO designs utilizing multiple ($N_t$) transmit antennas and multiple ($N_r$) receive antennas aim primarily at achieving either high performance or high rate.

MIMO systems that achieve high performance by utilizing the available space-diversity. Space-time (ST) orthogonal designs (OD), linear constellation preceding (LCP) ST codes, and ST trellis codes are examples of performance driven designs. ST-OD codes can achieve full diversity (FD), i.e. the product of transmit and receive antennas, with linear decoding complexity. ST-OD systems with $(N_t, N_r)=(2, 1)$ antennas can achieve transmission rates up to one symbol per channel use (pcu). However, relative to full rate (FR) MIMO designs capable of $N_t$ symbols pcu, other ST-OD codes incur significant rate loss. For example, ST-OD systems with $N_t > 2$ have transmissions rates less than 0.75 symbols pcu. ST-TC schemes can offer better transmission rates, but are complex to decode and lack closed-form construction while their design complexity increases exponentially with $N_t$. In addition, high rate high performance ST-TC often require long size block resulting in long decoding delays.

MIMO systems designed to achieve high rate utilize the capacity of MIMO fading channels. Bell Laboratories layered space time architecture (BLAST)-type architectures and linear dispersion (LD) codes are examples of rate driven designs. LD designs offer no diversity guarantees. LD designs including diversity constraints are imposed require a search over a high dimensional space that becomes prohibitively complex as $N_t$ and the constellation size increase. However, layered ST multiplexers have complementary strengths and limitations. For example vertical-BLAST (V-BLAST) offers FR, i.e. $N_t$ symbols pcu, but relies on single-input single-output (SISO) error control coding per layer to offer performance guarantees. On the other hand, Diagonal-BLAST (D-BLAST) systems utilize space diversity but have rate improvements that come at the price of increasing decoding delays. Nevertheless, V-BLAST and D-BLAST can afford reasonable complexity decoding and facilitate SISO codes in MIMO systems. However, the rate efficiency of V-BLAST and D-BLAST schemes is offset by the bandwidth consuming SISO codes required to gain diversity. In other words, both high performance and high rate ST codes do not take full advantage of the diversity and capacity provided by MIMO channels. Furthermore, conventional schemes are not flexible to strike desirable tradeoffs among performance, rate, and complexity.

SUMMARY

In general, the invention is directed to techniques that allow full diversity and full rate (FDFR) wireless communication with any number of transmit and receive antennas through flat-fading channels and frequency- or time-selective channels. In particular, techniques are described that utilize layer specific linear complex-field (LCF) coding with a circular form of layered space-time (ST) multiplexing to achieve FDFR wireless communications with any number of transmit and receive antennas through flat-fading channels and frequency- or time-selective channels.

Unlike conventional ST coding techniques that achieve only full rate or full diversity, the techniques described herein utilize a set of layer specific LCF encoders and a ST mapper to generate a ST coded signal by performing layer specific LCF coding concatenated with a circular form of layered ST multiplexing. In some embodiment, the set of LCF encoders includes $N_t$ encoders, each of the layer specific LCF encoders having size $N_t$. Consequently, the size of the ST mapper is $N_t^2$. Additionally, the described techniques provide flexibility for desirable tradeoffs among performance, rate, and complexity.

More specifically, in accordance with an embodiment of the invention, a set of LCF encoders encode a block of information bearing symbols to form a respective set of layers and a ST mapper generates a ST coded signal by mapping the set of layers in a row circular manner to form an array. The block of information bearing symbols includes $N_t^2$ symbols and comprises $N_t$ sub-blocks, each sub-block including $N_t$ information bearing symbols. Each of the LCF encoders codes the information bearing symbols of a respective sub-block to produce a corresponding symbol layer. Each layer is circularly mapped by the ST mapper such that the encoded information bearing symbols of each layer are orthogonal in space and time. The ST mapper reads the array out in a column-wise manner and a modulator produces a multi-carrier output waveform in accordance with the ST coded signal for transmission through a frequency-selective wireless channel.

In one embodiment, the invention provides a wireless communication device comprising a set of linear complex-field (LCF) encoders, a space-time (ST) mapper, and a modulator. The set of linear complex-field encoders encode a block of information bearing symbols to form a respective set of symbol layers. The ST mapper generates a ST coded signal by mapping the set of symbol layers in a row circular manner to form an array where the encoded information bearing symbols of each layer are orthogonal in space and time. The modulator produces a multi-carrier waveform in accordance with the ST coded signal for transmission through a wireless channel.

In another embodiment, the invention is directed to a method comprising linearly encoding a block of information bearing symbols with a set of a complex-field codes selected from a constellation to produce a respective set of symbol layers and forming an array from the set of symbol layers by mapping the set of symbol layers in a row circular manner such that the encoded information bearing symbols of each of the symbol layers are orthogonal in space and time. The method may further comprise generating a space-time (ST) coded signal from the array of symbol layers, modulating the ST coded signal to produce a multi-carrier waveform, and transmitting the multi-carrier waveform through a wireless channel.

In another embodiment, the invention is directed to a computer-readable medium containing instructions. The instructions cause a programmable processor to linearly encode a block of information bearing symbols with a set of a complex-field codes selected from a constellation to produce a respective set of symbol layers and form an array from the set of symbol layers by mapping the set of symbol layers in a row circular manner so that the encoded information bearing symbols of each layer are orthogonal in space and time. The instruction may further cause the programmable processor to generate a space-time (ST) coded signal by reading out the array in a column-wise manner, modulate the ST coded signal to produce a multi-carrier waveform, and transmit the multi-carrier waveform through a wireless channel.

The invention may be capable of providing one or more advantages. For example, the invention provides techniques for achieving FDFR wireless communication over flat-fading and frequency- or time-selective channels with any number of transmit and receive antennas. Furthermore, unlike conventional ST coding techniques that can also achieve FD but result in considerable mutual information loss especially when $N_r>1$, the described invention incurs no mutual information loss regardless of the number of receive antennas. In other words, if a perfect code is applied at the transmitter, the capacity of the wireless channel is achieved.

Moreover, in systems with large antennae configurations, the described invention may tradeoff performance gains in order to reduce decoding complexity. When the number of antennas is large, the diversity order, e.g. $N_t N_r$, is large. At the same time, high performance and high rate result in high decoding complexity. For example, reducing the size of each of the LCF encoders results in reduced diversity but also reduces decoding block size while still transmitting at full rate. Full rate transmission can also be achieved while combining several layers to form one layer, provided that the constellation size is also increased. In other words, if layers are eliminated, then full diversity is maintained at reduced decoding block length.

The described invention also provides the flexibility to tradeoff rate in order to reduce complexity. For example, the invention may eliminate layers of the LCF encoders and employ maximum likelihood (ML), or near-ML) decoding to collect full diversity with a reduced decoding block length and transmission rate. Additionally, if the maximum affordable decoding block length $N<N_t^2$, then full diversity and full rate cannot be achieved, but a tradeoff between diversity for rate can be achieved by adjusting the size of the LCF encoders.

The described invention may also provide an advantage in wireless communication systems having a large number of transmit antennas. If the number of transmit antennas is large, then the block length, i.e. $N_t^2$, is also large within the described system. As a result, the affordable decoding complexity may not be enough to achieve FDFR, and the described techniques for diversity-rate tradeoffs are well motivated For example, if the maximum affordable decoding block length $N<N_t^2$, the described invention may be used to adjust the size of each of the LCF encoders in order to tradeoff diversity for rate.

The details of one or more embodiments of the invention are set forth in the accompanying drawings and the description below. Other features, objects, and advantages of the invention will be apparent from the description and drawings, and from the claims.

DETAILED DESCRIPTION

Throughout the Detailed Description, upper bold face letters represent matrices, bold face lower letters represent column vectors; $(\bullet)^T$ and $(\bullet)^H$ represent transpose and Hermitian transpose, respectively; $\text{diag}(d_1, \ldots, d_P)$ represents diagonal matrix with diagonal entries $d_1, \ldots, d_P$; $\mathbb{Z}[j]$ represents the algebraic integer ring with elements $p+jq$ where $p, q \in \mathbb{Z}$, $\mathbb{Q}(j)$ is the smallest subfield of the set of complex numbers $\mathbb{C}$ including both $\mathbb{Q}$ and $j$; and $\mathbb{Q}(j)(\alpha)$ represents the smallest subfield of $\mathbb{C}$ including both $\mathbb{Q}(j)$ and $\alpha$, where $\alpha$ is algebraic over $\mathbb{Q}(j)$.

Figure 1:
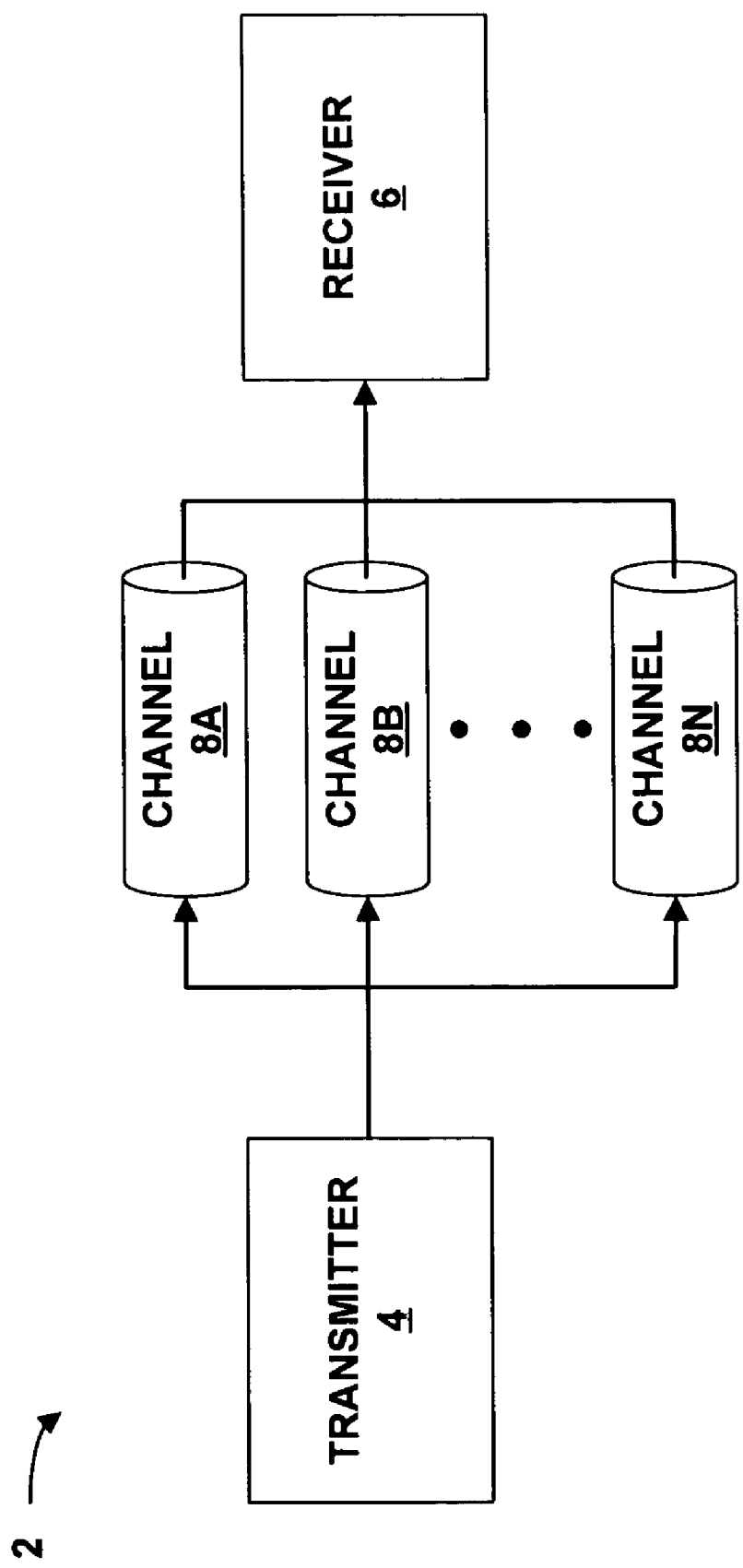
FIG. 1 is a block diagram illustrating a multiple-input multiple-output (MIMO) wireless communication system.

FIG. 1 is a block diagram illustrating multiple-input multiple-output (MIMO) wireless communication system 2. Communication system 2 includes a transmitter 4, which communicates with a receiver 6 by transmitting a space-time (ST) coded signal through a plurality of channels 8A-8N (hereinafter, "channels 8"). In general, ST coding techniques are applied in transmitter 4 to enable information bearing symbols to be transmitted via multiple antennas over channels 8 with full diversity and full rate (FDFR). Transmitter 4 may include any number of transmit antennas $N_t$, and receiver 6 may include any number of receive antennas $N_r$. Each of the transmit antennas corresponds to one of the channels 8 to transmit a ST coded signal from the transmit antenna to the receive antennas. Channels 8 may be flat fading, frequency-selective or time-selective.

Transmitter 4 includes a set of linear complex-field (LCF) encoders and a ST mapper that may be used to implement the ST coding techniques. In embodiments that include frequency- and/or time-selective channels, transmitter 4 may also include an inverse fast Fourier transform (IFFT) unit coupled to a module that inserts a cyclic prefix (CP) in order to implement orthogonal frequency-division multiplexing (OFDM). In any case, the set of LCF encoders utilize layer specific LCF coding and the ST mapper performs a circular form of layered ST multiplexing to generate a ST coded signal that achieves FDFR over wireless channels 8. In particular, each of the LCF encoders encodes a respective one of the sub-blocks of a block of information bearing symbols to form a corresponding layer. The ST mapper generates the ST coded signal by mapping each of the layers in a row circular manner to form an array. The array is read out in a column-wise manner and transmitted through a corresponding one of the transmit-antennas. The ST coding techniques described herein provide flexibility to select tradeoffs among performance, rate, and complexity. For example, in wireless communication systems with large antennae configurations, the described ST coding techniques may tradeoff performance gains in order to reduce decoding complexity.

Receiver 6 includes a LCF-ST decoder and, in frequency- and/or time-selective embodiments, a CP remover coupled to a fast Fourier transform (FFT) unit to recover the ST coded signal. The LCF-ST decoder may implement any of a plurality of decoding techniques. Maximum likelihood (ML) decoding may be employed to detect the ST coded signal from the received signal regardless of the number of receive antennas $N_r$. However, ML decoding may have high complexity when the length of number of transmit antennas $N_t$ is high. In general, the decoding complexity depends on $N_t^2$. Receiver 6 may employ sphere decoding (SD) or semi-definite programming algorithms to reduce decoding complexity while achieving performance approximately equal to ML decoding. To further reduce coding, receiver 6 may employ nulling-cancelling based or linear decoding at the expense of substantially lower decoding performance. Additionally, nulling-canceling decoding requires $N_r \geq N_t$.

However, the described ST coding techniques allow desirable tradeoffs among performance, rate and complexity. For example, when the number of antennas is large, the diversity order, e.g. $N_t N_r$, is large. At the same time, high performance and high rate result in high decoding complexity. Therefore, system 2 may tradeoff performance gains in order to reduce decoding complexity. Additionally, system 2 may tradeoff rate in order to reduce decoding complexity. Moreover, if the maximum affordable decoding block length is less than $N_t^2$, the block length that achieves FDFR, system 2 may tradeoff diversity for increased rate.

The ST coding techniques described herein apply to uplink and downlink transmissions, i.e., transmissions from a base station to a mobile device and vice versa. Transmitter 4 and receiver 6 may be any device configured to communicate using wireless transmissions including a cellular distribution station, a hub for a wireless local area network, a cellular phone, a laptop or handheld computing device, a personal digital assistant (PDA), a Bluetooth™ enabled device and other such devices.

Figure 2:
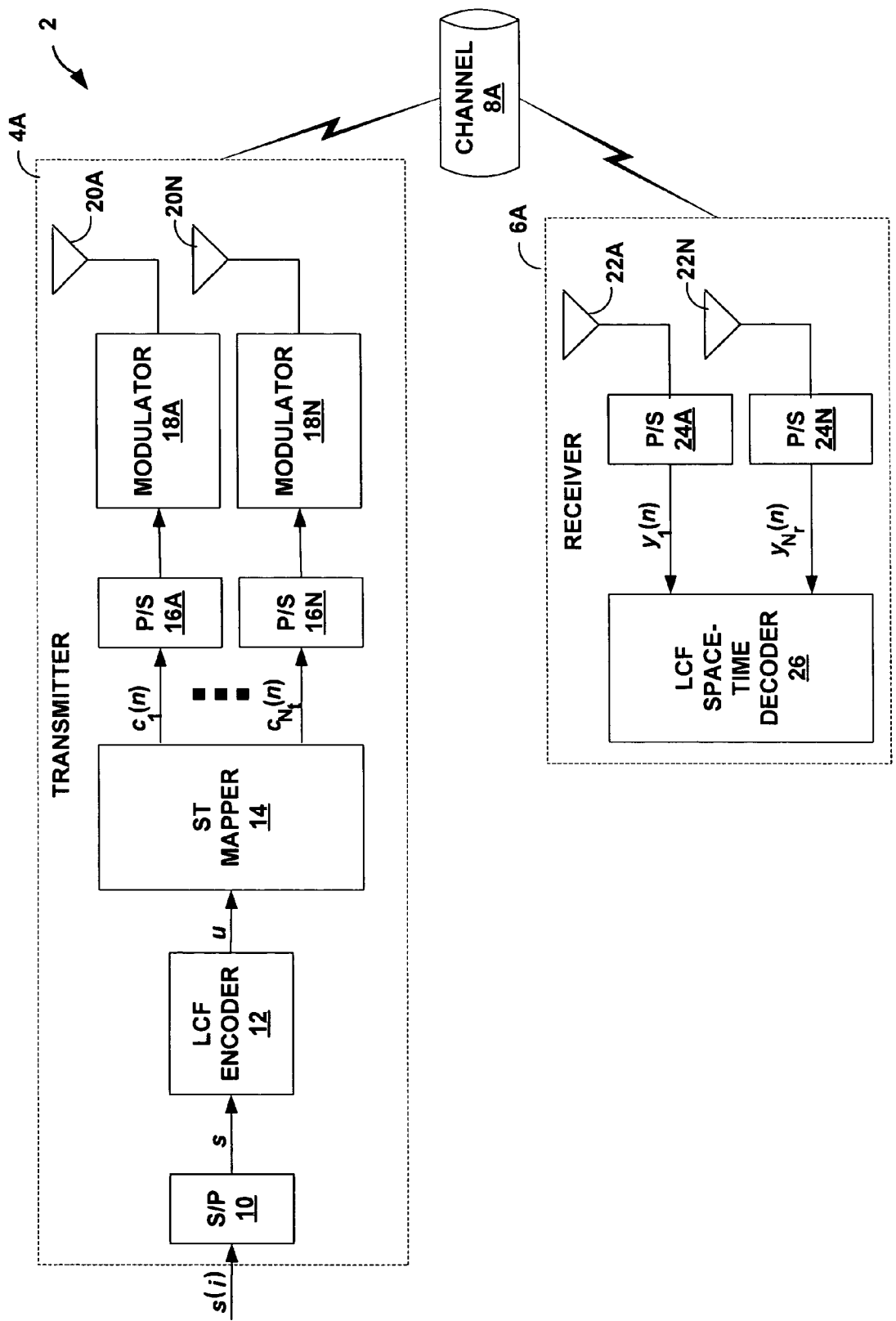
FIG. 2 is a block diagram illustrating an example MIMO wireless communication system in which a transmitter communicates to a receiver through a flat-fading channel with any number of transmit and receive antennas.

FIG. 2 is a block diagram illustrating in further detail MIMO wireless communication system 2 (FIG. 1) in which transmitter 4A transmits ST coded signals to receiver 6A through flat-fading channels 8. In the illustrated embodiment, transmitter 4A includes a LCF encoder 12 that applies a set of layer specific LCF encoders. Transmitter 4A further includes and a ST mapper 14 to generate a stream of ST coded information bearing symbols. For each of the $N_t$ antennas 20A-20N, respectively, transmitter 4A includes a parallel-to-serial converters 16A-16N and a corresponding modulator 18A-18N for transmitting the ST coded signal through channels 8. The ST coded signal achieves FDFR for any number of transmit and receive antennas ($N_t$, $N_r$) over flat-fading channels 8.

Receiver 6A includes LCF-ST decoder 26 to recover the ST coded signal received by $N_r$ receive antennas 22A-22N, respectively. For each of the $N_r$ receive antennas 22A-22N receiver 6A includes parallel-to-serial converter 24A-24N, respectively, for parsing the received waveform into vectors that can be decoded using LCF-ST decoder 26. LCF-ST decoder 26 may employ ML decoding or, alternatively, SD or semi-definite programming algorithms to reduce the decoding complexity. In other embodiments, LCF-ST decoder 26 may employ nulling-canceling decoding to further reduce decoding complexity.

MIMO wireless communication system 2 achieves FDFR communications over flat-fading channels 8 for any number of transmit and receive antennas. Additionally, system 2 allows flexibility to select tradeoffs among performance, rate and complexity. When the number of antennas is large, the diversity order $N_t N_r$ is large. However, high performance and high rate require high decoding complexity. Herein, decoding complexity is quantified by the block length of the ST coded signal that is to be decoded. Therefore, with large antennae configurations, it may be advantageous to tradeoff performance gains in order to reduce decoding complexity.

In general, transmitter 4A transmits the stream of information bearing symbols $\{s(i).\}$ as an output waveform through channels 8. The information bearing symbols are drawn from a finite alphabet $A_s$. Serial-to-parallel (S/P) converter 10 parses the information bearing symbols into blocks of size $N \times 1$, $s := [s(1), \ldots, s(N)]^T$, where $s(n)$ represents the nth information bearing symbol. Each block of information bearing symbols s is coded by LCF encoder 14 to form an $N \times 1$ vector u. In particular, LCF encoder 14 includes a set of LCF encoders that encode the block of information bearing symbols s to form a respective set of symbol layers u. ST mapper 14 circularly maps the set of layers in a row circular manner to form an array. Each layer is circularly mapped such that the encoded information bearing symbols of each layer are orthogonal in space and time. The array is read out in a column-wise manner to form $N_t$ blocks $\{c_\mu\}_{\mu=1}^{N_t}$ with size $P \times 1$. Parallel-to-serial (P/S) converters 16A-16N parse the corresponding $N_t$ blocks $\{c_\mu\}_{\mu=1}^{N_t}$ into a serial stream of encoded information bearing symbols and are modulated by modulators 18A-18N through transmit antennas 20A-20N, respectively. Receiver 6A receives the waveforms via receive-antennas 22A-22N, which may or may not be equal to the number of transmit antennas, and performs receive-filtering and sampling. Corresponding S/P converters 24A-24N parse the filtered samples of the received waveform into blocks $\{y_\nu\}_{\nu=1}^{N_r}$ that LCF-ST decoder 26 decodes to yield an estimate $\hat{s}$ of the information block s.

Channels 8 are flat-fading and, thus, remain invariant, e.g. flat, over the observation interval of P time slots. Letting $h_{v,\mu}(n)$ represent the channel associated with the μth transmit-antenna and the vth receive-antenna during the nth time slot, $h_{v,\mu}(n)=h_{v,\mu}$. Consequently, the nth sample at the output of the P/S converter corresponding to the vth receive-antenna can be expressed according to equation (1) where $w_v(n)$ represents the complex additive white Gaussian noise (AWGN) at the vth receive-antenna with mean zero and variance $N_0/2$. The vector-matrix counterpart of equation (1) is given according to equation (2) by stacking the received samples from the $N_r$ receive-antennas 22A-22N.

$$y_v(n) = \sum_{\varpi=1}^{N_t} h_{v,\mu} c_\mu(n) + w_v(n), \forall n \in [1, N_r] \quad (1)$$

$$y(n) = Hc(n) + w(n), \forall n \in [1, P] \quad (2)$$

In equation (2), the (v, μ)th entry of H represents $h_{v,\mu}$ and $c(n):=[c_1(n), \ldots, c_{N_t}(n)]^T$. Defining $Y:=[y(1) \ldots y(P)]$ and $C:=[c(1) \ldots c(P)]$ allows equation (2) to be expressed according to equation (3).

$$Y = HC + W \quad (3)$$

For simplicity, it is assumed that the $N_t N_r$ flat-fading channels 8 are complex Gaussian independent and identically distributed (i.i.d.). Importantly, however, it can be shown that the ST coding techniques described herein achieve FDFR and diversity-based analysis results apply to all practical fading models including correlated and non-Gaussian fading channel models. Using average pairwise error probability analysis, it follows that the maximum diversity order provided by the $N_t \times N_r$ MIMO channels 8 is given according to equation (4).

$$G_d^{max} = N_t N_r \quad (4)$$

The transmission rate is given according to equation (5) since it takes P time slots to transmit N information bearing symbols, i.e. the size of s. However, since it is possible to transmit up to one symbol per antenna per time slot, i.e. symbol period, the maximum possible transmission rate with $N_t$ antennas is given according to equation (6).

$$R = \frac{N}{P} \text{ symbols per channel use}(pcu) \quad (5)$$

$$R^{max} = N_t \text{ symbols } pcu \quad (6)$$

Parameters $G_d^{max}$ and $R^{max}$ quantify the full diversity and full rate, respectively. It is important to note that the model given in equation (3) is general in that it subsumes ST orthogonal designs (ST-OD), linear constellation precoding (LCP) ST designs, vertical-Bell Laboratories layered ST architecture (V-BLAST), and diagonal-BLAST (D-BLAST). These ST schemes offer different rates and come with different diversity orders. For example, V-BLAST achieves full rate $R^{max}$ but not full diversity while LCP ST codes achieve full diversity $G_d^{max}$ at rate R=1 symbol pcu for any $N_t$. The ST coding techniques described herein achieve FDFR for any number of antennas ($N_t$, $N_r$). Transmitter 4A and receiver 6A are judiciously designed in the following analysis to achieve FDFR for any number of transmit and receive antennas.

For simplicity, the block length N is selected as $N=N_t^2$ and each block of information bearing symbols s comprises $N_g=N_t$ sub-blocks. Each of the sub-blocks includes $N_t$ information bearing symbols. Consequently, the number of time slots is equal to the number of transmit antennas, i.e. $P=N_t$.

Accordingly, s is divided into $\{s_g\}_{g=1}^{N_t}$ sub-blocks and u is divided into $\{u_g\}_{g=1}^{N_t}$ where $u_g$ of the gth layer is given according to equation (7).

$$u_g = \Theta_g s_g \quad (7)$$

LCF encoder 12 enables full diversity and includes a set of LCF encoders $\Theta_g$. Each of the LCF encoders has entries drawn from $\mathbb{C}$ and implements layer specific LCF coding. Matrix $\Theta_g$ is given according to equation (8) where $\Theta$ is selected from the class of unitary Vandermonde matrices and the scalar β is selected as described in the following analysis.

$$\Theta_g = \beta^{g-1} \Theta, \forall g \in [1, N_t] \quad (8)$$

ST mapper 14 performs a circular form of layered ST multiplexing to construct an array according to the equation (9) where $u_g(n)$ represents the nth element of the gth layer $u_g$. In particular, ST mapper 14 circularly maps each layer such that encoded information bearing symbols of each layer are orthogonal in space and time. The array given in equation (9) is read out in a column-wise manner. Importantly, transmitter 4A transmits an encoded information bearing symbol per time slot and, thus, achieves full rate $R^{max} = N_t$. However, the rate-efficient fading-resilient precoding employed by LCF encoder 12 enables full diversity $G_d^{max} = N_t N_r$ for any number of transmit and receive antennas.

$$C = \begin{bmatrix} u_1(1) & u_{N_t}(2) & \cdots & u_2(N_t) \\ u_2(1) & u_1(2) & \cdots & u_3(N_t) \\ \vdots & \vdots & \cdots & \vdots \\ u_{N_t}(1) & u_{N_t-1}(2) & \cdots & u_1(N_t) \end{bmatrix} \begin{array}{l} \rightarrow \text{time} \\ \downarrow \text{space} \end{array} \quad (9)$$

The input-output relationship given according to equation (3) can be expressed according to equation (10) with LCF encoder 12 and ST mapper 14 expressed as equations (8) and (9), respectively, after stacking the receive vectors y(n) into one vector. Furthermore, the nth column of ST mapper 12 C can be expressed according to equation (11) where the permutation matrix $P_n$ and the diagonal matrix $D_\beta$ are defined, respectively, according to equations (12) and (13) where $\theta_n^T$ represents the nth row of $\Theta$.

$$y = (I_{N_t} \otimes H) \begin{bmatrix} c(1) \\ \vdots \\ c(N_t) \end{bmatrix} + w \quad (10)$$

$$c(n) = [(P_n D_\beta) \otimes \theta_n^T] s \quad (11)$$

$$P_n := \begin{bmatrix} 0 & I_{n-1} \\ I_{N_t-n+1} & 0 \end{bmatrix} \quad (12)$$

$$D_\beta := \text{diag}[1, \beta, \ldots, \beta^{N_t-1}] \quad (13)$$

By defining $\mathcal{H}:=I_{N_t} \otimes H$ and the unitary matrix given according to equation (14), equation (9) can be expressed according to equation (15).

$$\Phi := \begin{bmatrix} (P_1 D_\beta) \otimes \theta_1^T \\ \vdots \\ (P_{N_t} D_\beta) \otimes \theta_{N_t}^T \end{bmatrix} \quad (14)$$

$$y = \mathcal{H} \Phi s + w \quad (15)$$

Maximum likelihood decoding can be employed to detect s from y regardless of $N_r$, but possibly with high complexity because decoding complexity is dependent on the block length $N=N_t^2$. SD or semi-definite programming algorithms may also be used to achieve near-optimal performance. The SD algorithm is known to have average complexity $\mathbb{N}(N^3)$ irrespective of the alphabet size with $N_r \geq N_t$. When NT is large, the decoding complexity is high even for near-ML decoders. To further reduce decoding complexity, nulling-cancelling based or linear decoding may be used. However, such decoders require $N_r \geq N_t$.

In summary, given a number of transmit and receive antennas $N_t$, $N_r$, respectively, a block of information bearing symbols s with length $N=N_t^2$ is encoded to form a vector u. LCF encoder 12 includes a set of LCF encoders that encode a corresponding sub-block $s_g$ of s to form respective layers $u_g$ of u. ST mapper 14 circularly maps each of the layers to the array given according to equation (9) and each column in (9) is transmitted via $N_t$ antennas through channels 8. Receiver 6A decodes s using y given in equation (10).

In the following analysis transmitter 4A is examined with respect to performance and rate for FDFR transmissions. Let T represent channel coherence time and assume that $T \geq N_t$. In particular, Proposition 1 establishes design criteria that enable FDFR for LCF encoder 12 and ST mapper 14 given in equations (8) and (9), respectively.

Proposition 1 For a block of information bearing symbols s carved from $\mathbb{Z}[j]$, with ST mapper 14 given in equation (9), there exists at least one pair of $(\Theta, \beta)$ in equation (9) that enables full diversity $(N_t N_r)$ for the ST coded signal given in equation (3) at full rate $N_t$ symbols pcu.

The proof of proposition 1 is given in the following analysis. Since $N=N_t^2$ and $P=N_t$, it can be verified that the transmission rate is $R=N/N_t=N_t$ symbols pcu, which is the full rate given in equation (6).

To prove the full diversity claim, it suffices to show that $\forall s \neq s'$, there exists at least a pair of $(\Theta, \beta)$ such that $\det(C-C') \neq 0$.

For simplicity, define $\tilde{C}:=C-C'$, $\tilde{s}_g:=s_g-s_g'$, and $\tilde{u}_g:=u_g-u_g'$. The determinant of $\tilde{C}$ can then be expressed according to equation (16) where $(i_1, \ldots, i_{N_t})$ is a permutation of the sequence $(1, \ldots, N_t)$ and $\tau(i_1, \ldots, i_{N_t})$ is the number of inversions of the sequence $(i_1, \ldots, i_{N_t})$.

$$det(\tilde{C}) = \sum_{(i_1 \ldots i_{N_t})} (-1)^{\tau(i_1, \ldots, i_{N_t})} \prod_{n=1}^{N_t} \tilde{c}_{i_n}(n) \qquad (16)$$

Comparing $\tilde{c}_{i_n}(n)$ with $\tilde{u}_{g_n}(n)$, when $\tilde{c}_{i_n}(n) = \tilde{u}_{g_n}(n)$, then $g_n$ is given according to equation (17).

$$g_n = \begin{cases} N_t + i_n - n + 1 & \text{if } i_n - n + 1 \leq 0 \\ i_n - n + 1 & \text{if } i_n - n + 1 > 0 \end{cases} \quad \forall n \in [1, N_t] \qquad (17)$$

Thus, $g_n = i_n - n + 1$, or, $N_t + i_n - n + 1$, from which it follows that $$\sum_{n=1}^{N_t} (g_n - 1) = mN_t,$$

$m \in [0, N_t-1]$ where m depends on the sequence $(i_1, \ldots, i_{N_t})$. Therefore, it can be deduced that for each permutation $(i_1, \ldots, i_{N_t})$, $$\prod_{n=1}^{N_t} \tilde{c}_{i_n}(n) = \beta^{mN_t} \prod_{n=1}^{N_t} \theta_n^T \tilde{s}_{g_n},$$

$m \in [0, N_t-1]$.

Using the structure given in equation (9), it has been shown that the $\det(\tilde{C})$ is a function of $\Theta$, and at the same time a polynomial in $\beta^{N_t}$, with degree $N_t-1$. Before proving the existence of a pair $(\Theta, \beta)$ that enables FDFR the result given in Lemma 1 is needed.

Lemma 1 If the constellation of s is carved from the ring of Gaussian integers $\mathbb{Z}[j]$, then there exists a matrix $\Theta$ which guarantees that $\tilde{u}_g = \Theta \tilde{s}_g$ has no zero entry when $\tilde{s}_g \neq 0$.

Based on Lemma 2, there always exists $\Theta$, such that $\Theta \tilde{s}_g$ has no zero entry when $\tilde{s}_g \neq 0$. Now it must be proved that when $\tilde{s} \neq 0$, $\det(\tilde{C})$ is not a zero polynomial of $\beta^{N_t}$. In other words, not all the coefficients of $\det(\tilde{C})$ equal to zero simultaneously when $\tilde{s} \neq 0$. Suppose g is the smallest index of layers for which $\tilde{s}_g \neq 0$, i.e., $\tilde{s}_{g'} \neq 0$, for $g' < g$. Based on equation (17) the $\det(\tilde{C})$ is given according to equation (18) where (*) denotes the other terms from equation (17).

$$det(\tilde{C}) = (-1)^{\tau(g, \ldots, N_t, \ldots, g-1)} \beta^{N_t(g-1)} \prod_{n=1}^{N_t} \theta_n^T \tilde{s}_g + \beta^{N_t g}(*) \qquad (18)$$

Since $\tilde{s}_g \neq 0$, it follows from the design of $\Theta$, that $$\prod_{n=1}^{N_t} \theta_n^T \tilde{s}_g \neq 0.$$

Hence, $\det(\tilde{C})$ cannot be a zero polynomial for any error pattern $s \neq s'$. Furthermore, if the generator of $\Theta$ is $\alpha$, then the entries of $\Theta \tilde{s}_g \in \mathbb{Q}(j)(e^{j2\pi/N_t})(\alpha)$. Therefore, $\det(\tilde{C})$ is a polynomial of $\beta^{N_t}$ with coefficients belonging to $\mathbb{Q}(j)(e^{j2\pi/N_t})(\alpha)$. Similar to Lemma 2, there always exists $\beta^{N_t}$ which has minimum polynomial in $\mathbb{Q}(j)(e^{j2\pi/N_t})(\alpha)$ with degree greater than or equal to $N_t$. Thus, it has been have proved that there exists at least one $(\Theta, \beta)$ pair for which $\det(\tilde{C}) \neq 0, \forall \tilde{s} \neq 0$.

The proof of Proposition 1 reveals that selecting $\Theta$ and $\beta$ is critical in enabling FDFR transmissions in transmitter 4A. Intuitively, $\Theta$ enables full diversity per layer while $\beta$ fully diversifies transmissions across layers.

Relying on the algebraic number theoretic tools used to prove Proposition 1, systematic design methods for selecting $(\Theta, \beta)$ are provided in the following analysis. First, the unitary Vandermonde matrix $\Theta$ is given according to equation (19) where is the $N_t \times N_t$ fast Fourier transform (FFT) matrix with (m+1, n+1)st entry $e^{-j2\pi mn/N_t}$.

$$\Theta = \frac{1}{\sqrt{N_t}} F_{N_t}^{\mathcal{H}} diag[1, \alpha, \ldots, \alpha^{N_t-1}] \qquad (19)$$

Note that $\Theta$ in equation (19) is parameterized by the single parameter $\alpha$. Adding $\alpha$ to the scalar $\beta$ in equation (8), the ensuing design methods, Design A, Design B, and Design C, aim at selecting $(\alpha, \beta)$ that lead to $\Theta_g$s for which C in equation (9) offer FDFR.

Design A selects $\alpha$ such that the minimum polynomial of $\alpha$ over the field $\mathbb{Q}[j]$ has degree greater than or equal to $N_t$. Given $\alpha$, select $\beta^{N_t}$ such that the minimum polynomial of $\beta^{N_t}$ in the field $\mathbb{Q}(j)(e^{j2\pi/N_t})(\alpha)$ has degree greater than or equal to $N_t$. For example, when $N_t=2^k$, $k \in \mathbb{N}$ select $\alpha=e^{j\pi/2N_t}$ and $\beta^{N_t}=e^{j\pi/(4N_t)^2}$. In another example, when $N_t=3$, select $\alpha=e^{j\pi/54}$. In a further example, when $N_t=5$, select $\alpha=e^{j\pi/25}$ and $\beta^{N_t}=e^{j\pi/250}$.

Design B fixes fixes $\beta^{N_t}=\alpha$ and selects $\alpha$ such that the minimum polynomial of $\alpha$ in the field $\mathbb{Q}(j)(e^{j2\pi/N_t})(\alpha)$ has degree greater than or equal to $N_t^2$. For example, when $N_t=2^k$, $k \in \mathbb{N}$ select $\alpha=e^{j\pi/(N_t^3)}$. In another example, when $N_t=3$, select $\alpha=e^{j\pi/9}$ and $\beta^{N_t}=e^{j\pi/54}$. In a further example, when $N_t=5$, select $\alpha=e^{j\pi/250}$.

In the following analysis a general code design is described for Design A and Design B. Define $[\mathbb{M}:\mathbb{P}]$ as the degree of field extension of $\mathbb{P}$ to $\mathbb{M}$. For example $[\mathbb{Q}(j):\mathbb{Q}]=2$. For Design A, to enable full diversity, design $\alpha=e^{j\pi/K}$, $K \in \mathbb{N}$ such that condition (20) is satisfied.

$$[\mathbb{Q}(j)(e^{j2\pi/N_t})(\alpha):\mathbb{Q}(j)] \geq N_t \qquad (20)$$

Because $[\mathbb{Q}(\alpha):\mathbb{Q}]=\phi(K)$, where $\phi(\cdot)$ is the Euler totient function, K can be selected based on the properties of Euler numbers such that $\phi(K) \geq 2N_t$. Since $\mathbb{Q}(j)(e^{j2\pi/N_t})(\alpha) \supseteq \mathbb{Q}(\alpha)$, it can be verified that equation (21) can be satisfied.

$$[\mathbb{Q}(j)(e^{j2\pi/N_t})(\alpha):\mathbb{Q}]=[\mathbb{Q}(j)(e^{j2\pi/N_t})(\alpha):\mathbb{Q}(j)][\mathbb{Q}(j):\mathbb{Q}] \geq \phi(K) \geq 2N_t \qquad (21)$$

As a result, equation (20) is satisfied. Based on the selection of $\alpha$, the second step is to select $$\beta^{N_i} = e^{j\frac{2\pi}{M}},$$

$M \in \mathbb{N}$, such that equation (22) is satisfied. Similar to the selection of $\alpha$, $\beta^{N_t}$ is selected according to equation (23).

$$[\mathbb{Q}(j)(e^{j2\pi/N_t})(\alpha)(\beta^{N_t}):\mathbb{Q}(j)(e^{j2\pi/N_t})(\alpha)] \geq N_t \qquad (22)$$

$$[\mathbb{Q}(j)(e^{j2\pi/N_t})(\alpha)(\beta^{N_t}):\mathbb{Q}] = [\mathbb{Q}(j)(e^{j2\pi/N_t})(\alpha)(\beta^{N_t}):\mathbb{Q}(j)(e^{j2\pi/N_t})(\alpha)] \bullet [\mathbb{Q}(j)(e^{j2\pi/N_t})(\alpha):\mathbb{Q}] \qquad (23)$$

Because $[\mathbb{Q}(j)(e^{j2\pi/N_t})(\alpha):\mathbb{Q}] \leq 2\phi(N_t)\phi(K)$, and $[\mathbb{Q}(j)(e^{j2\pi/N_t})(\alpha)(\beta^{N_t}):\mathbb{Q}] \geq [\mathbb{Q}(\beta^{N_t}):\mathbb{Q}]=\phi(M)$, then given K, if M can be selected according to equation (24), then the inequality given in equation (22) is satisfied holds.

$$\phi(M) \geq 2N_t\phi(N_t)\phi(K) \qquad (24)$$

It is important to note that the selection of $\alpha$ and $\beta$ is not unique. For example, if K is an integer multiple of $N_t$, M can be selected such that the inequality given in equation (25) is satisfied.

$$\phi(M) \geq 2N_t\phi(K) \qquad (25)$$

For Design B, fix $\beta^{N_t}=\alpha=e^{j2\pi/K}$. Consequently, the design problem becomes selecting $\alpha$ such that inequality given in equation (26) is satisfied.

$$[\mathbb{Q}(j)(e^{j2\pi/N_t})(\alpha):\mathbb{Q}(j)(e^{j2\pi/N_t})] \geq N_t^2 \qquad (26)$$

In a similar manner, K can be selected such that the inequality given in equation (27) is satisfied.

$$\phi(K) \geq 2N_t\phi(K) \qquad (27)$$

Design C selects $\alpha$ such that the minimum polynomial of $\alpha$ in the field $\mathbb{Q}(j)$ has degree greater than or equal to $N_t$. Based on $\alpha$, one transcendental number in the field of $\mathbb{Q}(j)(e^{j2\pi/N_t})(\alpha)$ is found. Alternatively, a transcendental number $\alpha$ can be found directly for the field $\mathbb{Q}(j)(e^{j2\pi/N_t})(\alpha)$. For example, given $N_t$, select $\Theta$ as in Design A and let $\beta^{N_t}=e^{j/2}$. In another example, given $N_t$, select $\beta^{N_t}=\alpha$ and let $\alpha=e^{j/2}$.

Note that the transcendental number $e^{j/2}$ has also been used in M. O. Damen et al. "A construction of a space-time code based on number theory," IEEE Transactions on Information Theory, vol. 48, pp. 753-760, March 2002, which is incorporated by reference herein. According to Lindemann's Theorem given on page 44 of A. O. Gelfond, Transcendental & Algebraic Numbers, Dover Publications, Inc., 1960, which is incorporated herein by reference, transcendental numbers can be designed, e.g. $e^{jk}$, $\forall k \in \mathbb{Q}$. All three designs, i.e. Design A, Design B, and Design C, can enable full diversity. However, since the coding gain was not maximized for any of the designs, it may be possible to find other FDFR encoders with improved coding gains. Simulations of the designs are presented to compare their relative performance.

Proposition 2 gives a measure of mutual information for the FDFR ST coding techniques described herein for transmitter 4A.

Proposition 2 If the information symbols $s \sim CN(0, \epsilon_s/N_t I_N)$ and the average signal-to-noise (SNR) ratio is $\gamma := \epsilon_s/(N_0 N_t)$, then the mutual information of the FDFR ST coded signal transmitted through channels 8 is given by equation (28).

$$C_{flat} = \log \det(I_{N_r} + \gamma HH^H) \text{ bits pcu} \qquad (28)$$

The proof of Proposition 2 is given in the following analysis. Based on equation (15), the mutual information is given according to equation (29) where $H(\bullet)$ represents entropy. Since w is AWGN and matrix $\Phi$ are known, the second term on the right hand side of equation (21) can be expressed according to equation (30).

$$I(y;s|H)=H(s|H)-H(s|H,y) \qquad (29)$$

$$\mathcal{H}(s|\mathcal{H}, y) = \log\det\left(\pi e\left(\left(\frac{\varepsilon_s}{N_t}\right)^{-1} I_N + \frac{1}{N_0}\Phi^{\mathcal{H}}\mathcal{H}^{\mathcal{H}}\mathcal{H}\Phi\right)^{-1}\right) \qquad (30)$$

For a given $R_s=E[ss^H]=\epsilon_s/N_t I_N$, $H(s|H)$ is maximized when s is Gaussian. In other words, $H(s|H)$ is given according to equation (31).

$$\mathcal{H}(s|\mathcal{H}) \leq \log\det\left(\pi e\frac{\varepsilon_s}{N_t}I_N\right) \qquad (31)$$

Substituting equations (30) and (31) into equation (29), results in equation (32) when s is Gaussian.

$$c_{flat} = \frac{1}{N_t}\log\det(I_N + \gamma\Phi^{\mathcal{H}}\mathcal{H}^{\mathcal{H}}\mathcal{H}\Phi) = \log\det(I_{N_r} + \gamma HH^H) \qquad (32)$$

Compared with the MIMO channel capacity described in G. J. Foschini and M. J. Gans, "On limits of wireless communication in a fading environment when using multiple antennas," Wireless Personal Communications, vol. 6, no. 3, pp. 311-335, March 1998, which is incorporated herein by reference, the mutual information given in equation (28) coincides with the instantaneous channel capacity. In other words, the FDFR ST coding techniques applied in transmitter 4A incur no mutual information loss unlike other designs which can also achieve full diversity, e.g. ST-OD and LCP-STC, but result in substantial mutual information loss, particularly when $N_r>1$.

When the number of antennas is large, the diversity order $N_tN_r$ is large. At the same time, high performance and high rate come with high decoding complexity. Therefore, with large antennae configurations, it may be desirable to tradeoff performance gains, which may show up for impractically high SNR, in order to reduce decoding complexity. The following two corollaries provide methods that the FDFR ST coding techniques described herein may employ to tradeoff rate and performance with complexity. In particular, Corollary 1 illustrates a method that may be employed to tradeoff performance with complexity while Corollary 2 illustrates a method that may be employed to tradeoff rate with complexity. Again, decoding complexity is quantified based on the block length that is to be decoded.

Corollary 1 Keeping the same information rate, i.e. information bearing symbols pcu, two performance-complexity tradeoffs arise.

i.) (Diversity-Complexity Tradeoff) With samller size LCF encoders $\Theta$, e.g. $N_d<N_t$, the achieved diversity order reduces to $N_dN_r \leq N_dN_t$ while the decoding block size reduces to $N_dN_t$.

ii.) (Modulation-Complexity Tradeoff) Provided that the constellation size is increased, several layers can be combined to one layer. If (zero) $N_z$ layers, i.e. $u_{g1}=\ldots=u_{gN_z}=0$, then full diversity is maintained at reduced decoding block length $N_t(N_t-N_z)$. Clearly, the decoding block length decreases as $N_z$ increases.

Alternatively, decoding complexity may be reduced by decreasing the transmission rate. Reducing the transmission rate can be accomplished when $\min(N_t, N_r)$ is large because the rate can be reduced in order to reduce decoding complexity. Similar to full diversity, full rate is not always required. For example, instead of having $N_t$ layers in equation (9), ST mapper 14 can be designed with $N_t-1$ or $N_t-2$ layers. Corollary 2 quantifies the rate-complexity tradeoff.

Corollary 2 (Rate-Complexity Tradeoff) If, for the set of LCF encoders 12 given in equation (8) and ST mapper 14 given in equation (9), $N_z$ layers are eliminated by letting $u_{g1}=\ldots=u_{gN_z}=0$, then ML or near-ML decoding collects the full diversity $N_tN_r$ with decoding block length $N_t(N_t-N_z)$ and has transmission rate $N_t-N_z$ symbols pcu.

In other words, Corollary 2 states that when entries of s are selected from a fixed constellation, as the transmission rate increases, i.e. $N_z$ decreases, the decoding complexity increases as well. It is important to note that when the number of "null layers" $N_z>0$, the condition $N_r \geq N_t$ for SD described in B. Hassibi and H. Vikalo, "On the expected complexity of sphere decoding," Processions of $35^{th}$ Asilomar Conference on Signals, Systems, and Computers, vol 2, pp. 1051-1055, Pacific Grove, Calif., Nov. 4-7, 2001, which is incorporated herein by reference, or nulling-cancelling algorithms is relaxed to $Nr \geq Nt-N_z$. Importantly, while the tradeoffs described above have been considered when the channel has fixed coherence time, the tradeoffs vary accordingly with the channel coherence time.

When the number of transmit-antennas is large $N_t$, the block length is also large $N=N_t^2$ and the affordable decoding complexity may not be sufficient to achieve FDFR. In this case, diversity-rate tradeoffs are well motivated. Corollary 3 provides a method that the ST coding techniques may employ to tradeoff rate with diversity when the affordable decoding complexity is not sufficient to achieve FDFR.

Corollary 3 (Diversity-Rate Tradeoff) If the maximum affordable decoding block length $N<N_t^2$, then based on the described FDFR ST coding techniques, full diversity and full rate cannot be achieved simultaneously. By adjusting the size of $\Theta_g$, diversity can be traded-off for rate.

Figure 4:
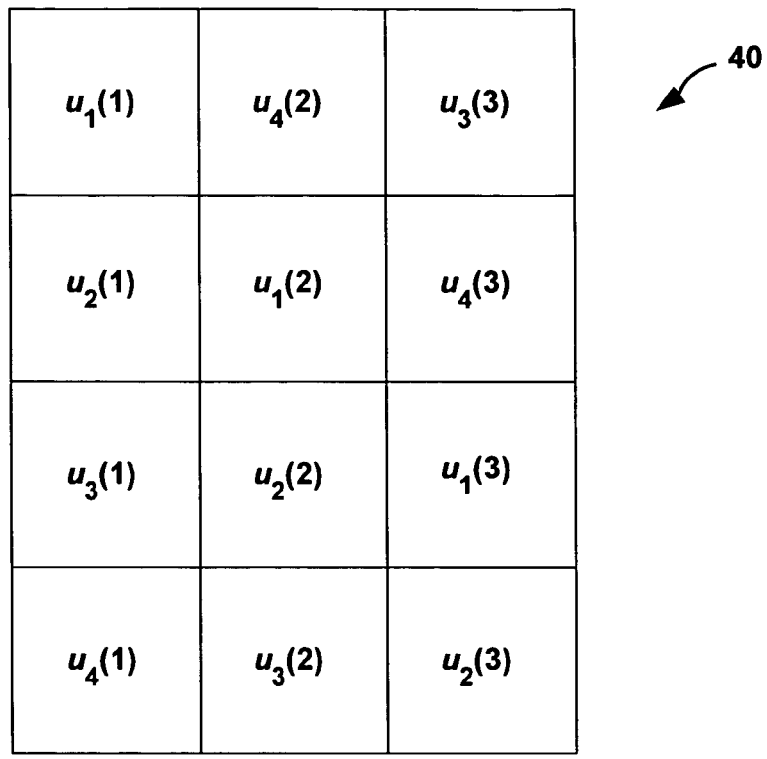
FIG. 4 illustrates an example arrangement of LCF coded information bearing symbols arranged in an array for a block length $N<N_t^2$.
Figure 5:
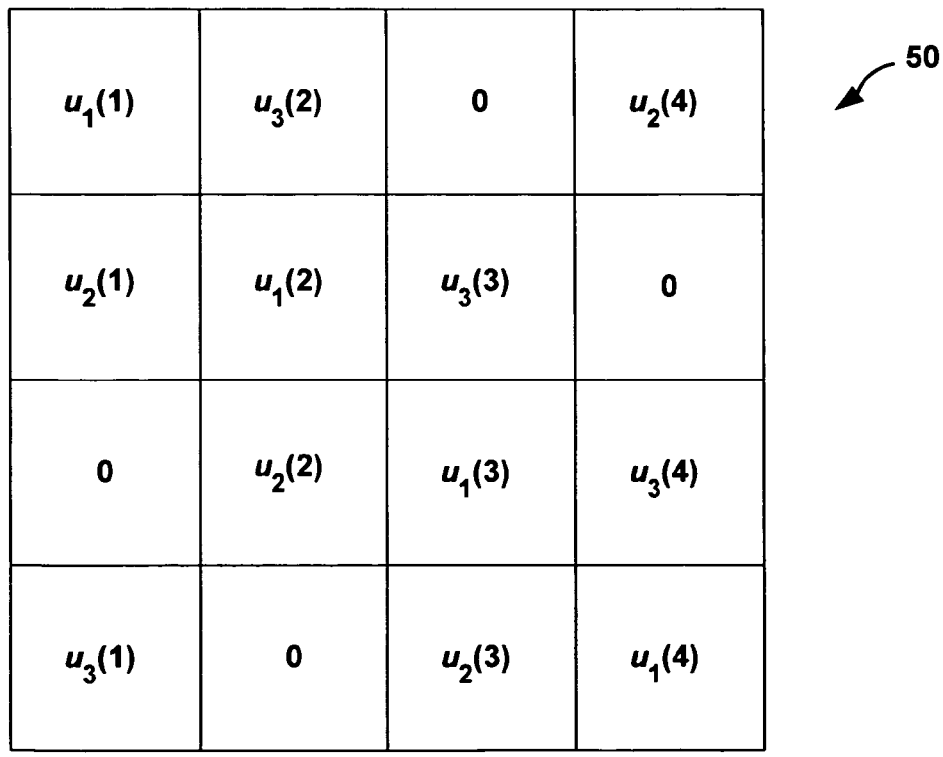
FIG. 5 illustrates an alternative example arrangement of LCF coded information bearing symbols arranged in an array for a block length $N<N_t^2$.

The rate-diversity tradeoff for block size $N=12$ and $N_t=4$ is illustrated in FIGS. 4 and 5.

It is important to note that the described diversity-rate tradeoffs are different from the diversity-multiplexing tradeoffs described in L. Zheng and D. Tse, "Diversity and multiplexing: a fundamental tradeoff in multiple antenna channels," IEEE Transactions on Information Theory, revised September 2002, which is incorporated by reference herein, where it is stated that "any fixed code has 0 spatial multiplexing gain." The multiplexing gain in that paper is defined as the limiting transmission rate divided by $\log_2$ (SNR) as SNR goes to infinity. For the ST coding techniques described herein, the transmission rate is defined as the number of symbols pcu. In any case, the transmission rate as defined herein does not vary with SNR.

Figure 3:
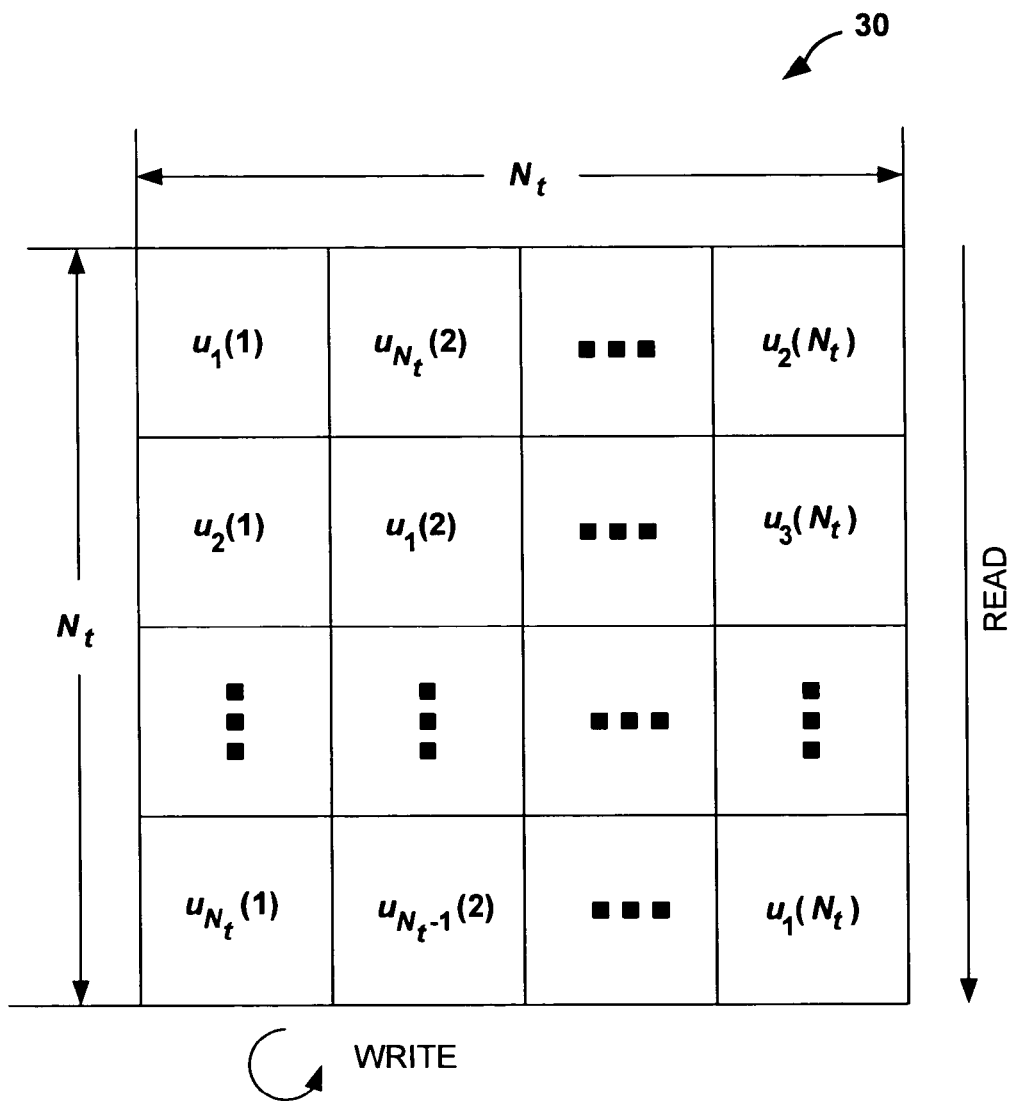
FIG. 3 illustrates an example arrangement of linear complex-field (LCF) coded information bearing symbols circularly mapped in an array in accordance with the transmitter in FIG. 2.

FIG. 3 illustrates an example arrangement of LCF coded information bearing symbols u circularly mapped in an array 30 in accordance with equation (9). In this arrangement the block of information bearing symbols s includes $N_t^2$ symbols and comprises $N_g=N_t$ sub-blocks, each sub-block including $N_t$ information bearing symbols. The LCF coded information bearing symbols u are organized in array 30 having $N_t$ rows and $N_t$ columns. Each of the LCF encoders $\Theta_g$ 12 encodes a corresponding block of information bearing symbols $s_g$ to form a respective layer $u_g$ in accordance with equation (7) and the described ST coding techniques. Each of the layers $\{u_g\}_{g=1}^{N_t}$ is circularly mapped by ST mapper 14 such that the encoded information bearing symbols of each layer are orthogonal in space and time. For example, the LCF encoded information symbols of the first layer are arranged along the diagonal of array 30. Array 30 is read out in a column-wise manner and transmits one symbol per antenna per time slot. Consequently, transmitter 4A can achieve the full rate $R^{max}=N_t$ symbols pcu.

FIG. 4 illustrates an example arrangement of LCF coded information bearing symbols in an array 40 that utilizes a diversity-complexity tradeoff. In this arrangement the maximum block size $N=12$ and $N_t=4$ and the encoded information bearing symbols are circularly arranged in array 40 having $N_t=4$ rows and $N_d=3$ columns. Per Corollary 3, FD and FR cannot be achieved simultaneously because $N<N_t^2$. The rate achieved by array 40 is $R^{max}=N_t=4$ symbols pcu. However, the diversity order is $3N_r<N_tN_r$. Further, the decoding complexity reduces to $N_dN_r=3N_r$. Array 40 achieves the full rate because each symbol is transmitted per antenna per time slot. The diversity is reduced because the size of each of the LCF encoders is reduced.

FIG. 5 illustrates another example arrangement of LCF coded information bearing symbols in an array 50 that utilizes a rate complexity tradeoff. In this arrangement, the maximum block size $N=12$ and $N_t=4$ and the encoded information bearing symbols are circularly arranged in array 40 having $N_t=4$ rows and $N_t=4$ columns. However, per Corollary 3, FD and FR cannot be achieved simultaneously because $N<N_t^2$. In accordance with Corollary 2, once layer is eliminated by letting $u_{g1}=\ldots=u_{gN_z}=0$. As a result, each transmit antenna does not transmit an information bearing symbol per time slot. Consequently, the rate achieve by array 50 is $R=3$. However, array 50 does achieve full diversity because $N_t=4$ transmit antennas transmit per time slot.

Figure 6:
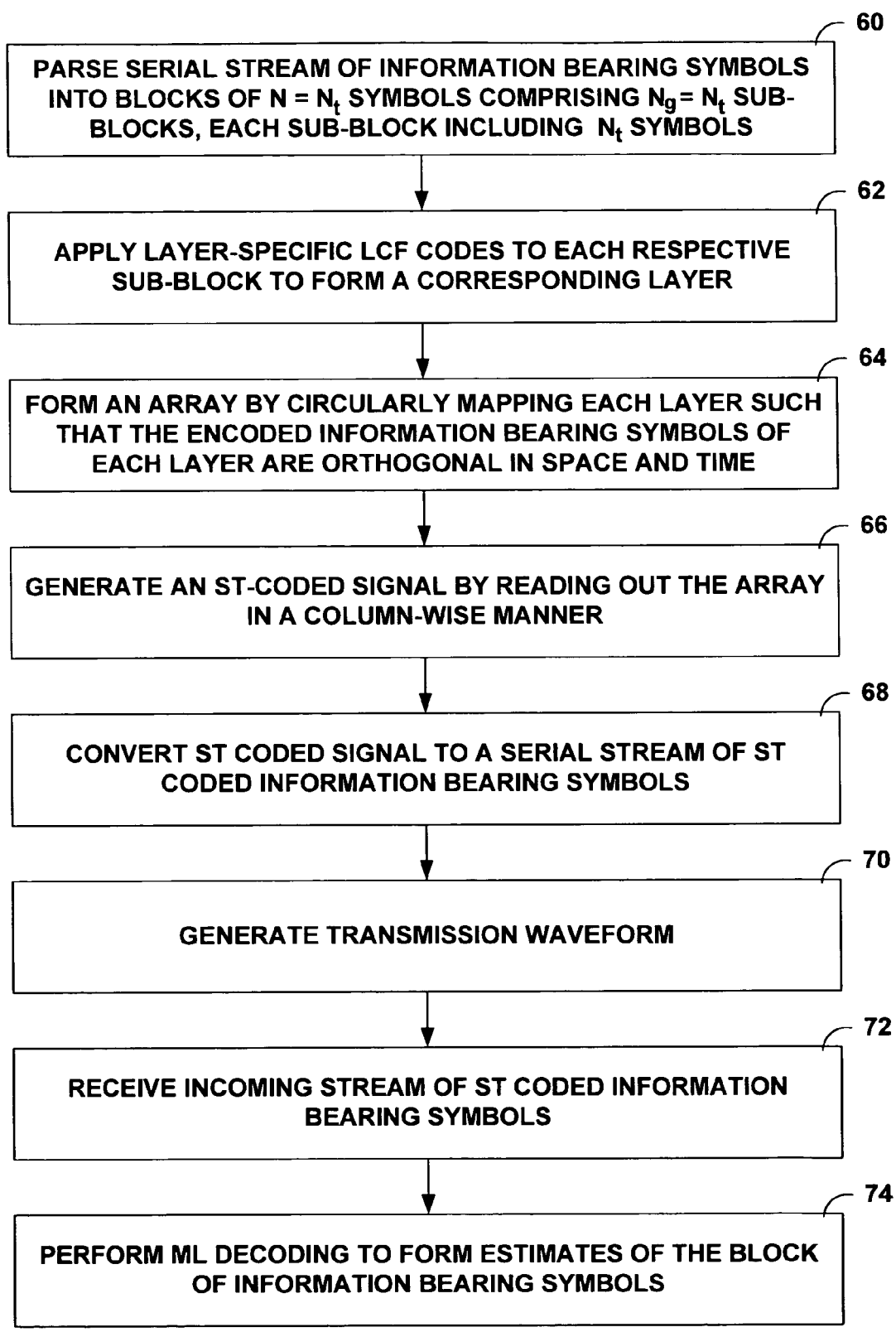
FIG. 6 is a flowchart illustrating an example mode of operation of the MIMO wireless communication system in FIG. 2.

FIG. 6 is a flowchart illustrating an example mode of operation of MIMO wireless communication system 2 (FIG. 2) in which transmitter 4A and receiver 6A communicate using the described ST coding techniques. Generally, transmitter 4A parses a serial stream of information bearing symbols into blocks of $N=N_t^2$ symbols s comprising $N_g=N_t$ sub-blocks, each sub-block including $N_t$ symbols (step 60). LCF encoders 12 applies a set of layer specific LCF encoders to encode respective sub-blocks to form corresponding layers (step 62). ST mapper 14 forms an array according to equation (9) by mapping each layer such that the encoded information bearing symbols of each layer are orthogonal in space and time (step 64). The array is read out in a column-wise manner to generate a ST coded signal (step 66) and transmitter 4AA converts the ST coded signal into a serial stream of ST coded symbols (step 68) and outputs a transmission waveform for carrying the ST coded signal through communication channels 8 to receiver 6A (step 70).

Receiver 6A receives the incoming stream of information bearing symbols (step 72) and perform ML decoding to form estimates ŝ of the block of information bearing symbols s (step 74).

Figure 7:
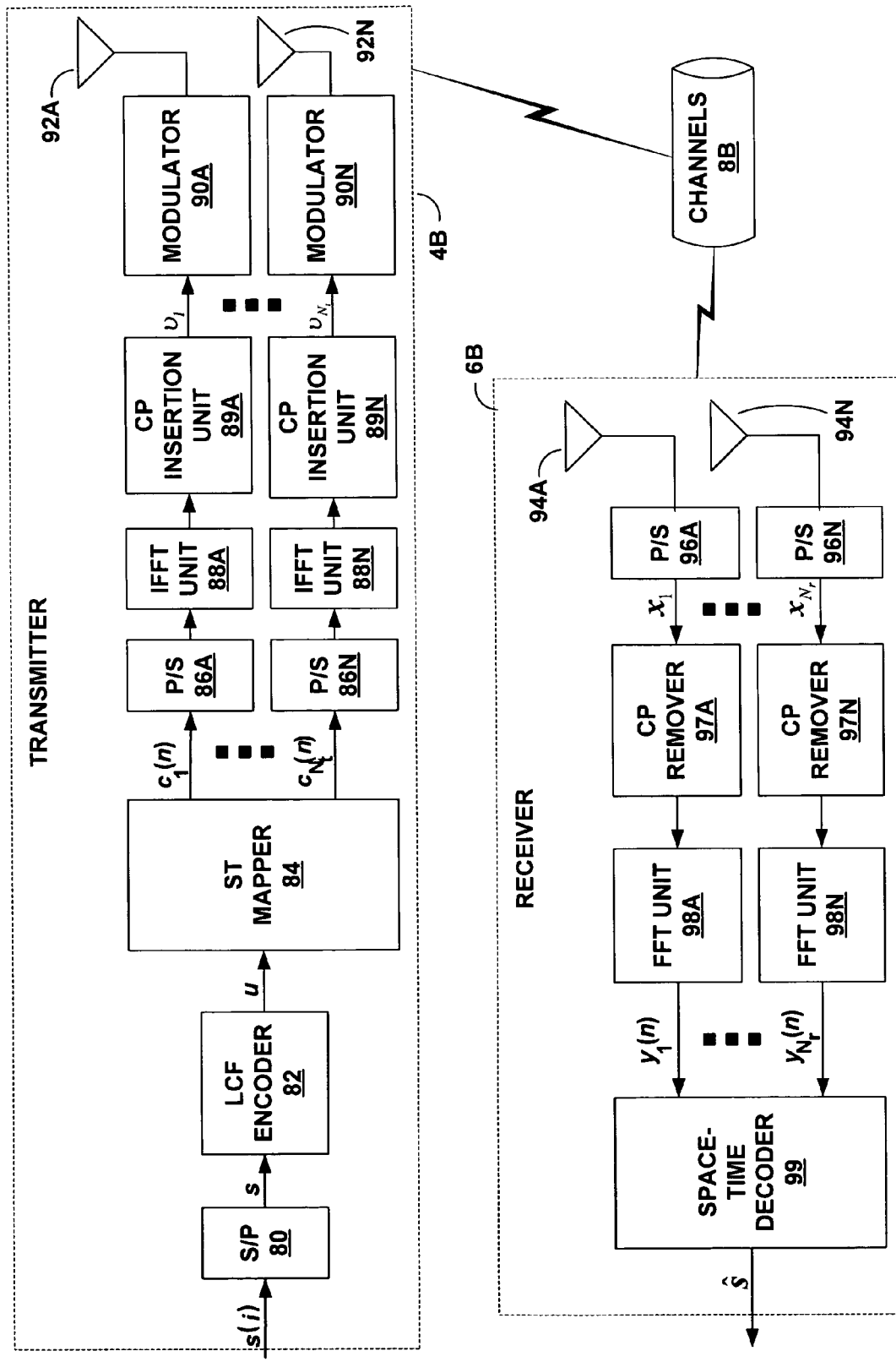
FIG. 7 is a block diagram illustrating an example MIMO wireless communication system in which a transmitter communicates to a receiver through a frequency- or time-selective channel with any number of transmit and receive antennas.

FIG. 7 is a block diagram illustrating in further detail one embodiment of MIMO wireless communication system 2 (FIG. 1) in which transmitter 4B employs orthogonal frequency-division multiplexing (OFDM) to transmit ST coded signals to receiver 6 through frequency- or time-selective channels 8B. System 2 is first described with frequency-selective channels. The frequency channels are assumed to be quasi-static, i.e. remain invariant over at least one block. System 2 is then described in a following analysis for time-selective channels.

When the maximum delay spread $\tau_{max}$ of a channel is greater than the symbol period $T_s$, the channel may become frequency-selective and cause inter-symbol interference (ISI). Specifically, if the maximum delay spread among $N_tN_r$ channels is finite, then the channel order is upper-bounded by a finite number $L:=\lfloor \tau_{max}/T_s \rfloor$. Channel taps are represented as $h_{v,\mu}(l)$ for $\mu \in [1, N_t]$, $v \in [1, N_r]$ and $l \in [0, L]$. OFDM mitigates ISI by converting frequency-selective channels to a set of frequency-flat subchannels.

In the illustrated embodiment, transmitter 4B includes a LCF encoder 82 and a ST mapper 84 to generate a stream of ST coded information bearing symbols. For each of the $N_t$ transmit-antennas 92A-92N, respectively, transmitter 4B includes corresponding P-point inverse fast Fourier transform (IFFT) units 88A-88N followed by respective cyclic prefix (CP) insertion units 89A-89N. Each output of ST mapper 84 $c_\mu$ is processed by a corresponding one of P-point IFFT units 88A-88N and a respective one of CP insertion units 89A-89N inserts a CP of length L. Modulators 90A-90N transmit the OFDM-ST coded signal through frequency-selective channels 8B. The OFDM-ST coded signal achieves FDFR for any number of transmit and receive antennas over frequency-selective channels 8B.

Receiver 6B includes cyclic prefix removers 97A-97N followed by corresponding fast Fourier transform (FFT) units 98A-98N for each of the receive antennas 94A-94N and decodes the received OFDM-ST coded signal via LCF-ST decoder 99. For each receive antenna 94A-94N, corresponding S/P converters 96A-96N parse the P+L filtered samples of the received waveform into a respective vector $\{x_v\}_{v=1}^{N_r}$. CP removers 97A-97N remove the first L samples to substantially reduce the ISI from the corresponding previously received block. The remaining P symbols are processed by the respective one of FFT units 98A-98N. The output of the FFT unit corresponding to the vth receive-antenna is represented by $y_v$. LCF-ST decoder 99 decodes $\{y_v\}_{v=1}^{N_r}$ to yield an estimate ŝ of the information block s. The input-out relationship between $\{c_\mu\}_{\mu=1}^{N_t}$ and $y_v$ is given according to equation (33) where $D_H^{(v,\mu)}$ represents a P×P matrix with (p, p)th entry given according to equation (34). In other words, equation (34) represents the frequency response of $h_{v,\mu}(l)$ at frequency bin $2\Pi p/P$.

$$y_v = \sum_{\mu=1}^{N_t} D_H^{(v,\mu)} c_\mu + w_v \tag{33}$$

$$H_{v,\mu}(p) = \sum_{l=0}^{L} h_{v,\mu}(l) e^{-j\pi p l/P} \tag{34}$$

Transmitter 4B communicates with receiver 6B to achieves FDFR communications over frequency-selective channels 8B for any number of transmit- and receive antennas. Additionally, transmitter 4B and receiver 6B allow flexibility to select tradeoffs among performance, rate, and complexity. When the number of antennas is large, the diversity order $N_tN_r(L+1)$ is large. However, high performance and high rate require high decoding complexity. Herein, decoding complexity is quantified by the block length of the ST coded signal that is to be decoded $N_t^2(L+1)$. Therefore, with large antennae configurations, it may be advantageous to tradeoff performance gains in order to reduce decoding complexity.

In general, transmitter 4B transmits the stream of information bearing symbols $\{s(i)\}$ as an output waveform through channels 8B. The information bearing symbols are drawn from a finite alphabet $A_s$. S/P converter 80 parses the information bearing symbols into blocks s of size $N_t^2(L+1)$. Each block s comprises $N_t$ sub-blocks $\{s_g\}_{g=1}^{N_t}$ with each sub-block having length $P=N_t(L+1)$. The increased block length is due to the CP inserted to mitigate ISI. Each block of information bearing symbols s is coded by LCF encoder 14 to form vector u. In particular, LCF encoder 14 includes a set of LCF encoders $\Theta_g$ that encode corresponding sub-blocks $\{s_g\}_{g=1}^{N_t}$ to form a respective set of layers $u_g=\Theta_g s_g$. Importantly, $\Theta_g$ has larger size $N_t(L+1)$ for frequency-selective channels than for flat-fading channels, however, $\Theta_g$ may be designed according to the analysis given previously for flat-fading channels.

ST mapper 84 circularly maps each of the LCF encoded symbols $u_g(n)$ into the array given according to equation (35). In particular, ST mapper 84 maps each symbol layer in a row circular manner to form the array given in equation (35). Array C given in equation (35) includes L+1 sub-arrays, each having the same structure as the array given in equation (9) for flat-fading channels. In other words, each layer of in a sub-array is mapped such that the encoded symbols of a layer are orthogonal in space and time.

$$C = \begin{bmatrix} u_1(1) & \cdots & u_2(N_t) & u_1(N_t+1) & \cdots & u_2(2N_t) & \cdots & u_2(P) \\ u_2(1) & \cdots & u_3(N_t) & u_2(N_t+1) & \cdots & u_3(2N_t) & \cdots & u_3(P) \\ \vdots & \cdots & \vdots & \vdots & \cdots & \vdots & & \\ u_{N_t}(1) & \cdots & u_1(N_t) & u_{N_t}(N_t+1) & \cdots & u_1(2N_t) & \cdots & u_1(P) \end{bmatrix} \tag{35}$$

The array given in equation (35) is read out in a column wise manner such that every layer is transmitted over $N_t$ transmit-antennas and through each antenna, each layer is spread over L+1 frequency bins. Intuitively, the structure of C given in equation (35) allows for joint exploitation of space and diversity modes.

Figure 9:
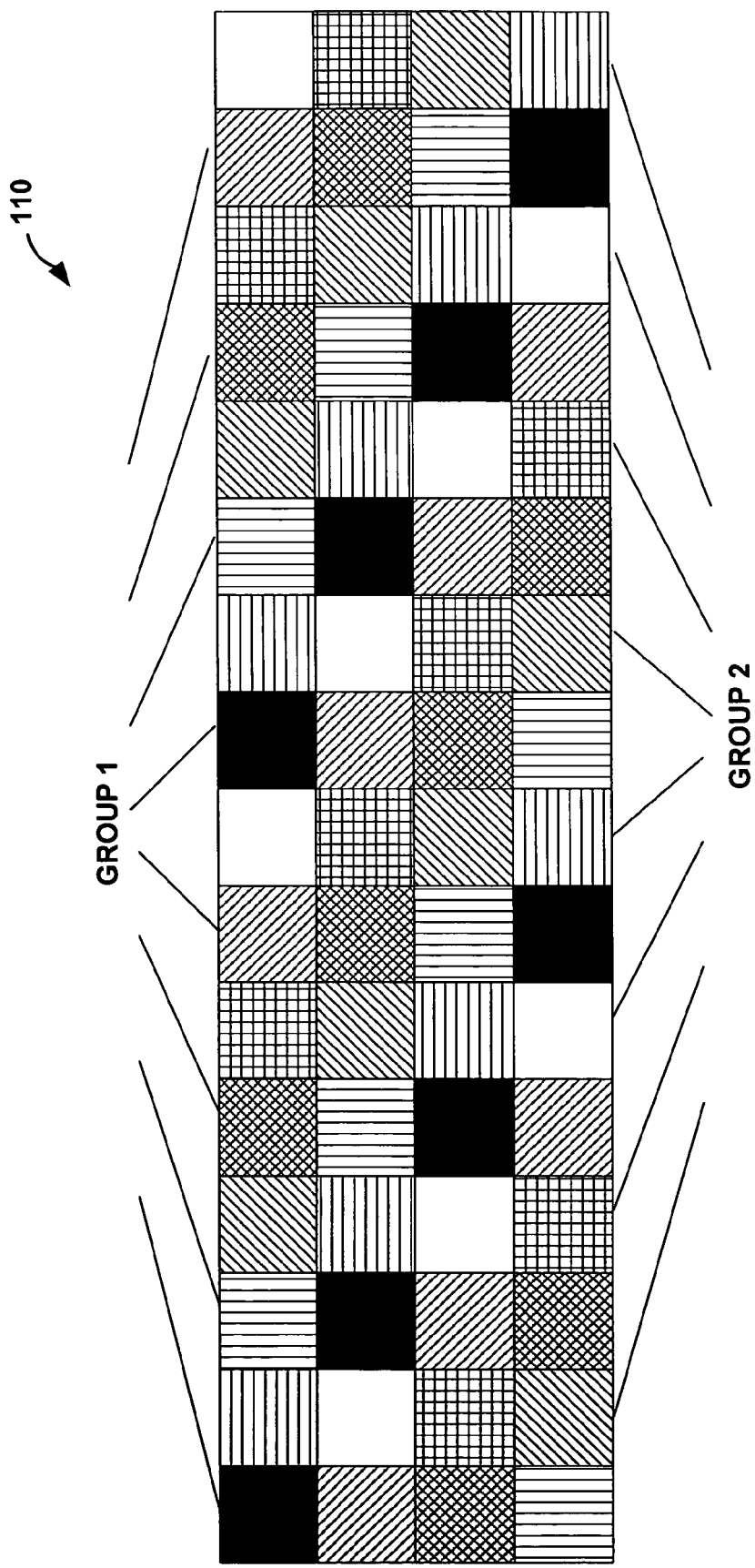
FIG. 9 illustrates an alternative arrangement of LCF coded information bearing symbols in an array in accordance with the transmitter in FIG. 7.

When the block size $N > N_t^2(L+1)$, i.e. when the number of subcarriers $P > N_t L+1$), the subcarrier grouping approach described in G. B. Giannakis et. al "Wireless multi-carrier communications: where Fourier meets Shannon," IEEE Signal Processing Magazine, vol. 17, no. 3, pp.29-48, May 2000, G. B. Giannakis et al. "Space-Time-Frequency Coded OFDM over Frequency-Selective Fading Channels," IEEE Transactions on Signal Processing, pp.2465-2476, October 2002, and G. B. Giannakis et al. "Linear Constellation Precoding for OFDM with Maximum Multipath Diversity and Coding Gains," IEEE Transactions on Communications, vol. 51, no.3, pp. 416-427, March 2003, each of which is incorporated herein by reference, can be used. In any event, the size of $\Theta_g$ is $N_t(L+1)$. However, if P is a multiple of $N_t(L+1)$, for example $P = N_g N_t(L+1)$ where $N_g$ is the number of sub-blocks, layers can be interlaced in different groups. As described below, FIG. 9 illustrates an example arrangement of matrix C when P is a multiple of $N_t(L+1)$.

In equation (33), the multi-channel output output samples are organized according to receive-antenna indices. Alternatively, the multi-channel output samples may be organized according to subcarrier indices. Specifically, if the $N_r \times N_t$ channel matrix H(n) with (v, μ)th entry $H_{v,\mu}(n)$ is defined, the input-output relationship given in equation (36) can be obtained.

$$\begin{bmatrix} y(1) \\ \vdots \\ y(P) \end{bmatrix} = \begin{bmatrix} H(1) & & \\ & \ddots & \\ & & H(P) \end{bmatrix} \begin{bmatrix} c(1) \\ \vdots \\ c(P) \end{bmatrix} + \begin{bmatrix} w(1) \\ \vdots \\ w(P) \end{bmatrix} \quad (36)$$

$$\begin{bmatrix} c(1) \\ \vdots \\ c(N_t) \\ c(N_t+1) \\ \vdots \\ c(P) \end{bmatrix} + \begin{bmatrix} (P_1 D_\beta) \otimes \theta_1^T \\ \vdots \\ (P_{N_t} D_\beta) \otimes \theta_{N_t}^T \\ (P_1 D_\beta) \otimes \theta_{N_t+1}^T \\ \vdots \\ (P_{N_t} D_\beta) \otimes \theta_P^T \end{bmatrix} s := \Phi s \quad (37)$$

Comparing equation (36) to equation (2) for flat-fading channels, it can be observed that due to frequency-selectivity, the channel response on different frequency bins may be different. Consequently, if there is no frequency-selectivity, the design described in this analysis reduces to the design previously described for flat-fading channels.

The transmitted vector given in equation (36) can be expressed according to equation (37). Given the channel matrices in equation (35), the matrix Φ given in equation (37) is known. Consequently, ML decoding, near-ML decoding such as SD, or linear decoding may be employed by receiver 6B to recover the information vector s.

Again, similar to flat-fading channels, the decoding complexity of SD depends only on the block length, regardless of the constellation size. However, decoding complexity for frequency-selective channels is higher than that for flat-fading channels because the block length $N = N_t^2(L+1)$ is larger. Importantly, when $N_t^2(L+1)$ is large the decoding complexity is high even for near-ML decoders. To further reduce decoding complexity, nulling-cancelling based or linear decoding may be used.

Maximum likelihood decoding can be employed to detect s from y regardless of $N_r$, but possibly with high complexity because decoding complexity is dependent on the block length $N = N_t^2$. SD or semi-definite programming algorithms may also be used to achieve near-optimal performance. The SD algorithm is known to have average complexity $N(N^3)$ irrespective of the alphabet size with $N_r \geq N_t$. When $N_t$ is large, the decoding complexity is high even for near-ML decoders. To further reduce decoding complexity, nulling-cancelling based or linear decoding may be used. However, such decoders require $N_r \geq N_t$.

The following analysis describes the performance of transmitter 4B for frequency-selective channels. Collecting received blocks from equation (33), the received matrix can be expressed according to equation (37) where $D_c^{(\mu)} := \text{diag}[c_\mu] = \text{diag}[c_\mu(1) \ldots c_\mu(P)]$, the (p, v)th entry of the $N_r(L+1) \times N_r$ matrix H is $h_{v,\lceil p/N_t\rceil}(p \mod N_t)$, and the P×(L+1) matrix $F_{1:L+1}$ comprises the first L+1 columns of the FFT matrix $F_P$ with (m+1, n+1)th entry $e^{-j2\Pi mn/P}$, $\forall m, n \in [1, P]$.

$$Y := [y_1 \ldots y_{N_r}] = [D_c^{(1)} F_{1:L+1} \ldots D_c^{(N_t)} F_{1:L+1}] H + W := \Lambda H + W \quad (38)$$

When viewing transmissions through $N_t$ antennas over frequency-selective channels of order L as transmissions through flat-fading channels with $N_t(L+1)$ virtual transmit-antennas, the full diversity order is expected, at least intuitively, to be $N_t N_r(L+1)$, provided that the relation matrix of the channel taps has full rank. However, the maximum transmission rate is still $N_t$ symbols pcu because it is impossible to transmit different symbols through the multiple paths of the same channel. This implies that for each transmit antenna, only one symbol can be transmitted pcu even though the channel has L+1 taps.

In order to enable the full diversity $N_t N_r(L+1)$ matrix Λ in equation (38) must be designed such that $\det(\Lambda - \Lambda') \neq 0$, $\forall s \neq s'$. Analogous to Proposition 1, Proposition 3 establishes design criteria that enable FDFR transmissions for LCF encoder 82 and ST mapper 84 that form the array given in equation (35).

Proposition 3 For any constellation of s carved from $\mathbb{Z}[j]$, with the array formed by LCF encoder 82 and ST mapper 84 and given in equation (35), there exists at least one pair of (Θ, β) in equation (9) that enables full diversity $(N_t N_r(L+1))$ for the ST coded signal given in equation (38) at transmission rate $N_t P/(P+L)$ symbols pcu.

The proof of proposition 3 is given in the following analysis. Similar to the flat-fading case, to prove Proposition 3, it suffices to show that the matrix $\Lambda - \Lambda'$ in equation (38) has full rank $\forall s \neq s'$. Defining $\tilde{\Lambda} := \Lambda - \Lambda'$, $\tilde{\Lambda}$ is given according to equation (39) where $\omega := e^{-j2\pi/P}$.

$$\tilde{\Lambda} = \begin{bmatrix} \tilde{c}_1(1) \cdots & \tilde{c}_1(1) \cdots & \tilde{c}_1(1) \cdots & \tilde{c}_{N_t}(1) \\ \tilde{c}_1(2) \cdots & \tilde{c}_1(2)\omega^L \cdots & \tilde{c}_{N_t}(2) \cdots & \tilde{c}_{N_t}(2)\omega^L \\ \vdots & \vdots & \vdots & \vdots \\ \tilde{c}_1(P) \cdots & \tilde{c}_1(P)\omega^{(P-1)L} \cdots & \tilde{c}_{N_t}(P) \cdots & \tilde{c}_{N_t}(P)\omega^{(P-1)L} \end{bmatrix} \quad (39)$$

The determinant of $\tilde{\Lambda}$ is according to equation (4) where $\tau(n_1, \ldots, n_P)$ represents the number of inversions of the sequence $(n_1, \ldots, n_P)$.

$$\det(\Lambda') = \sum_{(n_1, \ldots, n_P)} (-1)^{\tau(n_1, \ldots, n_P)} \prod_{p=1}^{P} \tilde{c}_{\lceil \frac{n_p}{L+1} \rceil}(p) \omega^{p(n_p \mod(L+1))} \quad (40)$$

Furthermore, ST mapper 84 can be described as mapping u to the array given in equation (35) according to equation (41) where $g_p$ is given according to equation (42) and equation (43) is satisfied.

$$\tilde{c}_{\left[\frac{n_p}{L+1}\right]}(p) = \tilde{u}_{g_p}(p) \tag{41}$$

$$g_p = \begin{cases} N_t + \lceil n_p/(L+1) \rceil - (p \bmod N_t) + 1 \\ \text{if } \lceil n_p/(L+1) \rceil - (p \bmod N_t) + 1 \le 0 \\ \lceil n_p/(L+1) \rceil - (p \bmod N_t) + 1 \\ \text{if } \lceil n_p/(L+1) \rceil - (p \bmod N_t) + 1 \rangle 0 \end{cases} \tag{42}$$

$$\sum_{p=1}^{P}(g_p - 1) = mN_t, m \in [0, N_t - 1] \tag{43}$$

Therefore, similar to the flat-fading case, it is determined that $\det(\tilde{\Lambda})$ is a polynomial of $\alpha$ and $\beta^{N_t}$. First, $\alpha$ is defined on the field of $\mathbb{Q}(j)$ to obtain a $\Theta$ for which $\Theta \tilde{s}_g$ has no zero entry $\forall \tilde{s}_g \ne 0$. Because $P = N_t(L+1)$, based on the design of $\alpha$, it can be verified that we can verify that $\omega^{p(n_p \bmod L+1)} \in \mathbb{Q}(j)(e^{j2\pi/N_t})(\alpha)$.

Given $\alpha$, $\det(\tilde{\Lambda})$ can be viewed a polynomial of $\beta^{N_t}$ with coefficients given according to equation (44).

$$\prod_{p=1}^{P} \theta_p^T \tilde{s}_{g_p} \omega^{p(n_p \bmod L+1)} \in \mathbb{Q}(j)(e^{j2\pi/N_t})(\alpha) \tag{44}$$

There always exists $\beta^{N_t}$ such that the degree of the minimum polynomial is greater than $N_t$. Thus, there exists $(\Theta, \beta)$ such that $\tilde{\Lambda} \ne 0, \forall \det(\tilde{s}) \ne 0$.

It is important to note that the rate loss $L/(P+L)$ is due to the CP inserted and removed by CP insertion units 89A-89N and CP removers 97A-97N, respectively, to substantially mitigate ISI. Furthermore, the LCF code described for frequency-selective channels 8B is analogous to LCF code described for flat-fading channels 8A apart from the differences in dimensionality. The difference between the LCF code described for frequency-selective channels and the LCF code described for flat-fading channels results from the differences in ST mapper 82 and ST mapper 12. In order to better illustrate the

EXAMPLE 1

LCF Repetition Codes

In order to enable only full diversity, $\Theta$ can be constructed to have identical rows, rather than being unitary. $\Theta$ having identical rows is given according to equation (45) where 1 represents a vector with all ones and the $1 \times N_t(L+1)$ vector $\theta_1^T := [1 \alpha \ldots \alpha^{N_t(L+1)-1}]$.

$$\Theta = 1 \otimes \theta_1^T \tag{45}$$

Consequently, for each sub-block $s_g$, each layer $u_g = \Theta_g s_g$. Clearly, this is why this specific LCF encoding is referred to as LCF repetition coding. From the definitions of $\Lambda$ in equation (38) and C in equation (35), after re-arranging the rows of $\Lambda$, $\overline{\Lambda}$ is given according to equation (47) where $U_{\mu,g} := \text{diag}[u_\mu(g)u_\mu(g+N_t) \ldots u_\mu(g+N_tL)]$, $J_g := J_1 \text{diag}[1, e^{-j2\pi(g-1)/P}, \ldots e^{-j2\pi(g-1)L/P}]$, and $[J_1]_{m+1,n+1} := e^{-j2\pi mn/(L+1)}$. With the LCF repetition encoder given in equation (45), $U_{\mu,g}$ is given according to equation (47).

$$\overline{\Lambda} = \begin{bmatrix} U_{1,1}J_1 & U_{2,1}J_1 & \cdots & U_{N_t,1}J_1 \\ U_{N_t,2}J_2 & U_{1,2}J_2 & \cdots & U_{N_t-1,2}J_2 \\ \vdots & & \cdots & \vdots \\ U_{2,N_t}J_{N_t} & U_{3,N_t}J_{N_t} & \cdots & U_{1,N_t}J_{N_t} \end{bmatrix} \tag{46}$$

$$U_{\mu,g} = \beta^{\mu-1}(\theta_1^T s_\mu) I_{L+1}, \forall g, \mu \in [1, N_t] \tag{47}$$

Assume that the transmitted vector s is erroneously decoded as s', and let $e_\mu := \theta_1^T s_\mu$. From equation (46), equation (48) can be expressed with $\det(\overline{\Lambda}-\overline{\Lambda}') = (L+1)^{N_t}(\det(E))^{L+1}$.

$$\overline{\Lambda} - \overline{\Lambda}' = \begin{bmatrix} J_1 & & \\ & \ddots & \\ & & J_{N_t} \end{bmatrix} \tag{48}$$

$$\left( \underbrace{\begin{bmatrix} e_1 & e_2\beta & \cdots & e_{N_t}\beta^{N_t-1} \\ e_{N_t}\beta^{N_t-1} & e_1 & \cdots & e_{N_t-1}\beta^{N_t-2} \\ \vdots & & & \vdots \\ e_2\beta & e_3\beta^2 & \cdots & e_1 \end{bmatrix}}_{E} \otimes I_{L+1} \right)$$

Guaranteeing that $\det(\overline{\Lambda}-\overline{\Lambda}') \ne 0$ is equivalent to ensuring that $\det(E) \ne 0, \forall s \ne s'$. As illustrated in the proof of Proposition 1, it follows that if the information bearing symbols s(n) are drawn from quadrature amplitude modulation (QAM) or pulse amplitude modulation (PAM), there always exists $\alpha$ and $\beta$ such that $\det(E) \ne 0, \forall s \ne s'$.

EXAMPLE 2

Two-Antenna Two-Ray Channel

In this example, FDFR transmissions are designed over two-ray channels with $(N_t, L) = (2, 1)$ and $P = 4$. As a result, the matrix $\Lambda$ is given according to equation (48).

$$\Lambda = \begin{bmatrix} c_1(1) & c_1(1) & c_2(1) & c_2(1) \\ c_1(2) & jc_1(2) & c_2(2) & jc_2(2) \\ c_1(3) & -c_1(3) & c_2(3) & -c_2(3) \\ c_1(4) & -jc_1(4) & c_2(4) & -jc_2(4) \end{bmatrix} \tag{48}$$

Using the ST mapping to form the array given in equation (35) with LCF encoded blocks $u_1 = \Theta s_1$, $u_2 = \beta \Theta s_2$ the determinant of $\Lambda$ in terms of $s_g$ and $(\Theta, \beta)$ is given according to equation (49).

$$\det(\Lambda) = \tag{49}$$

$$2j\left(-2\prod_{n=1}^{4}\theta_n^T s_1 + \beta^2\left(\prod_{n=1}^{2}\theta_n^T s_1 \prod_{n=3}^{4}\theta_n^T s_2 + (\theta_1^T s_1)(\theta_4^T s_1)\right)\right.$$

$$\prod_{n=2}^{3}\theta_n^T s_2 + (\theta_1^T s_2)(\theta_4^T s_2)\prod_{n=2}^{3}\theta_n^T s_1 +$$

-continued $$\prod_{n=1}^{2} \theta_n^T s_2 \prod_{n=3}^{4} \theta_n^T s_1 \bigg) - 2\beta^4 \prod_{n=1}^{4} \theta_n^T s_2 \bigg)$$

Equation (49) is a polynomial in $\beta^{N_t}$ with coefficients in $\mathbb{Q}(j)(e^{j2\pi/N_t})(\alpha)$ if $s_g \in \mathbb{Z}[j]$. In order to guarantee that all coefficients of $\beta^{N_t}$ in $\det(\Lambda)$ are non-zero $\forall s \neq s'$, $\Theta$ is designed according to the methods described in X. Giraud et al. "Algebraic tools to build modulation schemes for fading channels," IEEE Transaction on Information Theory, vol. 43, no. 3, pp. 938-952, May 1997, G. B. Giannakis et al. "Space-time diversity systems based on linear constellation preceding," IEEE Transactions on Wireless Communications, vol. 2, no. 2, pp. 294-309, March 2003, and G. B. Giannakis et al. "Complex field coded MIMO systems: performance, rate, and tradeoffs," Wireless Communications and Mobile Computing, pp. 693-717, November 2002, each of which is incorporated herein by reference. In this particular case, $\Theta$ is selected according to the equation (50).

$$\Theta = \frac{1}{2} \begin{bmatrix} 1 & e^{j\frac{\pi}{8}} & e^{j\frac{2\pi}{8}} & e^{j\frac{3\pi}{8}} \\ 1 & e^{j\frac{5\pi}{8}} & e^{j\frac{10\pi}{8}} & e^{j\frac{15\pi}{8}} \\ 1 & e^{j\frac{9\pi}{8}} & e^{j\frac{18\pi}{8}} & e^{j\frac{27\pi}{8}} \\ 1 & e^{j\frac{13\pi}{8}} & e^{j\frac{26\pi}{8}} & e^{j\frac{30\pi}{8}} \end{bmatrix} \quad (50)$$

Given $\Theta$, the $\det(\Lambda)$ can be viewed as a polynomial in $\beta^{N_t}$ with coefficients in $\mathbb{Q}(\alpha)$. Using Design A described in the analysis of wireless communication system 2 for flat-fading channels $\beta^{N_t}$ is selected $\beta^{N_t} 32 \, e^{j\Pi/32}$, such that $\det(\Lambda) \neq 0 \; \forall s \neq s'$.

Thus, full diversity in frequency-selective channels has higher decoding complexity with respect to flat-fading channels. However, the diversity order in frequency-selective channels is higher with respect to the diversity order of flat-fading channels. Therefore, selecting complexity-performance tradeoffs may be particularly advantageous.

Throughout the analysis of FDFT transmissions of ST coded signals, the channel taps have been assumed to be uncorrelated. When the channel taps are correlated, the maximum achievable diversity of the FDFR design for transmitter 4B and receiver 6B is the rank of the correlation matrix of all channel taps. The rank of the correlation matrix of all channel taps cannot exceed its dimension $N_t N_r (L+1)$ and can be as low as 1.

In order to complete the analysis of FDFR transmission over frequency-selective channels, Corollary 4 gives a measure of the mutual information for FDFR transmission over frequency-selective channels based on the input-output relationship given in equation (36).

Corollary 4 If the information bearing symbols $s \sim CN(0, \epsilon_s/N_t I_N)$ and the average signal-to-noise (SNR) ratio is $\gamma := \epsilon_s/(N_0 N_t)$, then the mutual information of the FDFR transmissions through frequency-selective channels is given according to equation (51).

$$c_{freq} = \frac{1}{P+L} \sum_{p=1}^{P} \log\det(I_{N_r} + \gamma H(p) H^{\mathcal{H}}(p)) \text{ bits } pcu \quad (51)$$

Figure 11:
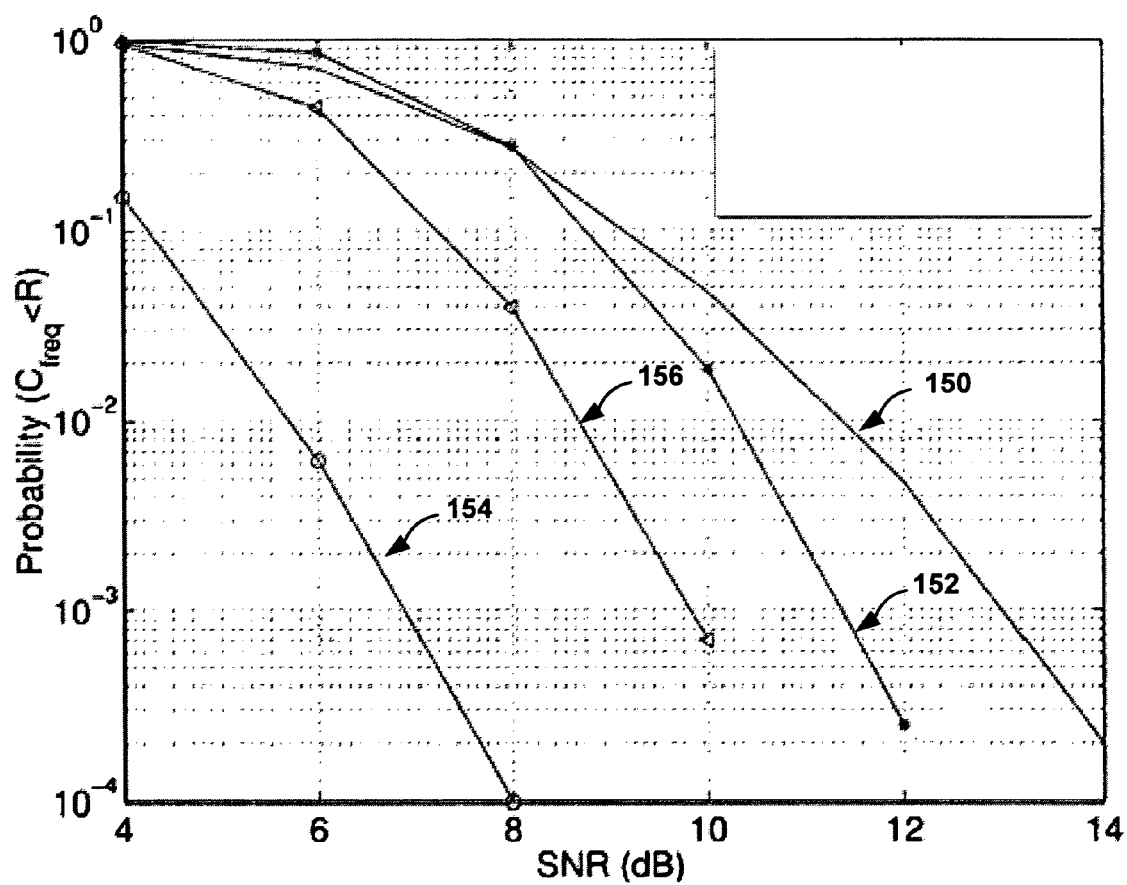
FIGS. 11-16 are graphs illustrating results of simulations and comparisons that validate analyses and designs of the described wireless communication systems.

Based on Corollary 4, the effects of of $N_t$, $N_r$, and L on the outage probability $\Pr(C_{freq} < R)$ are illustrated in FIG. 11. Generally, increasing either $N_t$, $N_r$, or L causes a decrease in the outage probability. When the product of $N_t N_r (L+1)$ is fixed, e.g. 16, the outage probability has the same slow for moderate to high SNR values. However, because the channel variance is a function of L and $N_t$ controls the power splitting factor, L and $N_t$ effect the outage probability differently.

In the following analysis the design of LCF encoders and ST mappers that generate ST coded signals which achieve FDFR transmissions over time-selective channels are described. The previously described ST coded signals assumed the channels were quasi-static. For simplicity, the channels in the following analysis are assumed to be time-selective but frequency-flat.

When channels are changing from symbol to symbol, the system model given in equation (2) can be re-expressed according to equation (52) where the channel matrix H(n) changes along with the time index n.

$$y(n) = H(n)c(n) + w(n) \quad (52)$$

The input-output relationship for time-selective channels in equation (52) coincides with the input-output relationship for frequency-selective channels given in equation (36). Therefore, the design for frequency selective-channels can also be utilized for time-selective channels. The diversity order for time-selective channels is quantified before analyzing the performance of the design described herein.

In order to define Doppler diversity, let $h_{v,\mu}(t)$ represent the time-varying impulse response of the resulting channel that includes transmit-receive filters as well as the time-selective propagation effects and let $H_{v,\mu}(f)$ represent the Fourier transform (FT) of $h_{v,\mu}(t)$. Although the bandwidth of $h_{v,\mu}(t)$ over a finite time horizon is theoretically infinite, $H_{v,\mu}(f)$ can be approximated as $H_{v,\mu}(f) \approx 0$ for $f \notin [-f_{max}, f_{max}]$ where $f_{max}$ is the maximum frequency offset, i.e. Doppler shift, of all the rays. Sampling $h_{v,\mu}(t)$ along the time t with period $T_s$ selects the discrete time equivalent channel taps h(p). Per Nyquist's theorem, it has thus been shown that such a channel can be well approximated by the basis expansion model given in equation (53) where $\omega_q := 2\Pi(q - Q/2)/N$, $Q := 2\Pi f_{max} N T_s$, and $h_v^{(v,\mu)}$ represent time-invariant channel coefficients.

$$h_{v,\mu}(p) \approx \sum_{p=0}^{Q} h_q^{(v,\mu)} e^{j\omega_q p} \quad (53)$$

In order to quantify the Doppler diversity in Lemma 2, the result described in G. B. Giannakis et al. "Maximum-diversity transmissions over time-selective wireless channels," Proceedings of Wireless Communications and Network Conference, vol. 1, pp.297-501, Orlando, Fla., Mar. 17-21, 2002, which is incorporated herein by reference, is used.

Lemma 2 Given the channel model in equation (53), when the coefficients $h_q^{(v,\mu)}$ are complex Gaussian distributed, the maximum diversity provided by the BEM $\{h_{v,\mu}(p)\}_{p=1}^P$ is at most Q+1.

It is important to note that the bases $e^{j\omega_q}$ in equation (53) are on the FFT grid. It is well known that circulant matrices can be diagonalized by IFF matrices. Using this property, the channel matrix $D_H^{(v,\mu)} := \text{diag}[h_{v,\mu}(1) \ldots h_{v,\mu}(P)]$ can be expressed according to equation (54) where $H^{(v,\mu)}$ is a circulant P×P matrix with first column $$[h_{Q/2}^{(v,\mu)} \cdots h_0^{(v,\mu)} \; 0 \cdots 0 \; h_Q^{(v,\mu)} \cdots h_{Q/2+1}^{(v,\mu)}]$$

and $F_P$ represents the P-point FFT matrix with (m+1, n+1)st entry $[F_P]_{m,n} := (1/\sqrt{P})e^{-j2\pi mn/P}$.

$$D_H^{(v,m)} \approx \sum_{q=0}^{Q} h_q^{(v,\mu)} D_q = F_P H^{(v,\mu)} F_P^{\mathcal{H}} \quad (54)$$

Comparing the right hand side of equation (54) with the previously described OFDM model for frequency-selective channels, it can be determined that, based on equation (53), a time-selective channel with Q+1 bases can be viewed as a frequency-selective channel with Q+1 taps. Relying on this time-frequency duality, the described design for FDFR over time-selective channels can be obtained from the previously described design for frequency-selective channels. The results for time-selective channels are given in Proposition 4.

Proposition 4 For any constellation of s carved from $\mathbb{Z}[j]$, with the array formed by LCF encoder 82 and ST mapper 84 and given in equation (35), there exists at least one pair of ($\Theta$, $\beta$) in equation (9) that enables full diversity ($N_tN_r(Q+1)$) if each channel provides Doppler diversity (Q+1) for the ST coded signal in equation (52) at full rate $N_t$ symbols pcu.

Figure 16:
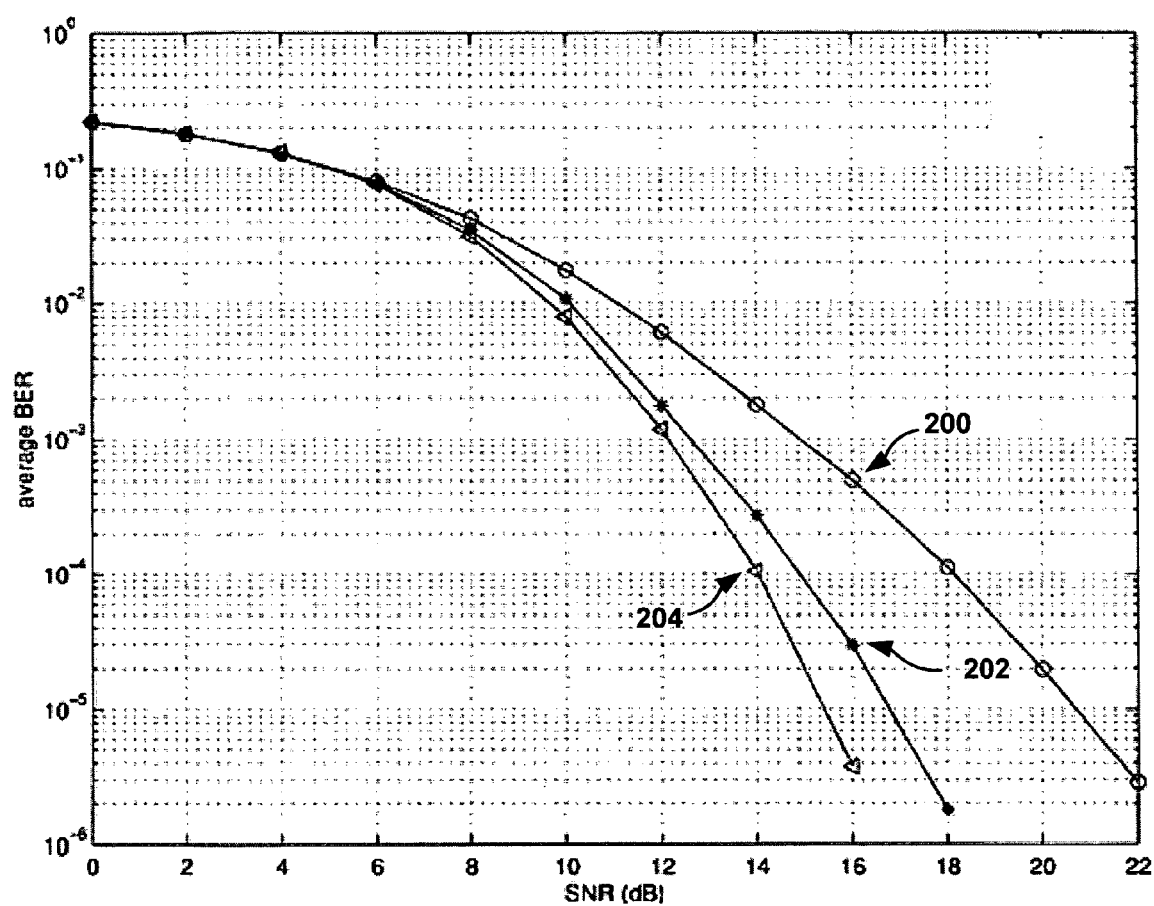

As the block size P, and thus Q, increases, the Doppler diversity increases. However, as Doppler diversity increases, both decoding delay and complexity increase. As illustrated in the simulations of FIG. 16, when the Doppler diversity is sufficiently high, e.g. Q>3, the performance with multiple antennas does not substantially increase by further increasing complexity. Furthermore, for fixed block size P, sampling period $T_s$, and $f_{max}$, the Doppler diversity (Q+1<P) is fixed. Therefore, selecting the size of $\Theta_g$ greater than $N_t(Q+1)$ is not desirable.

Figure 8:
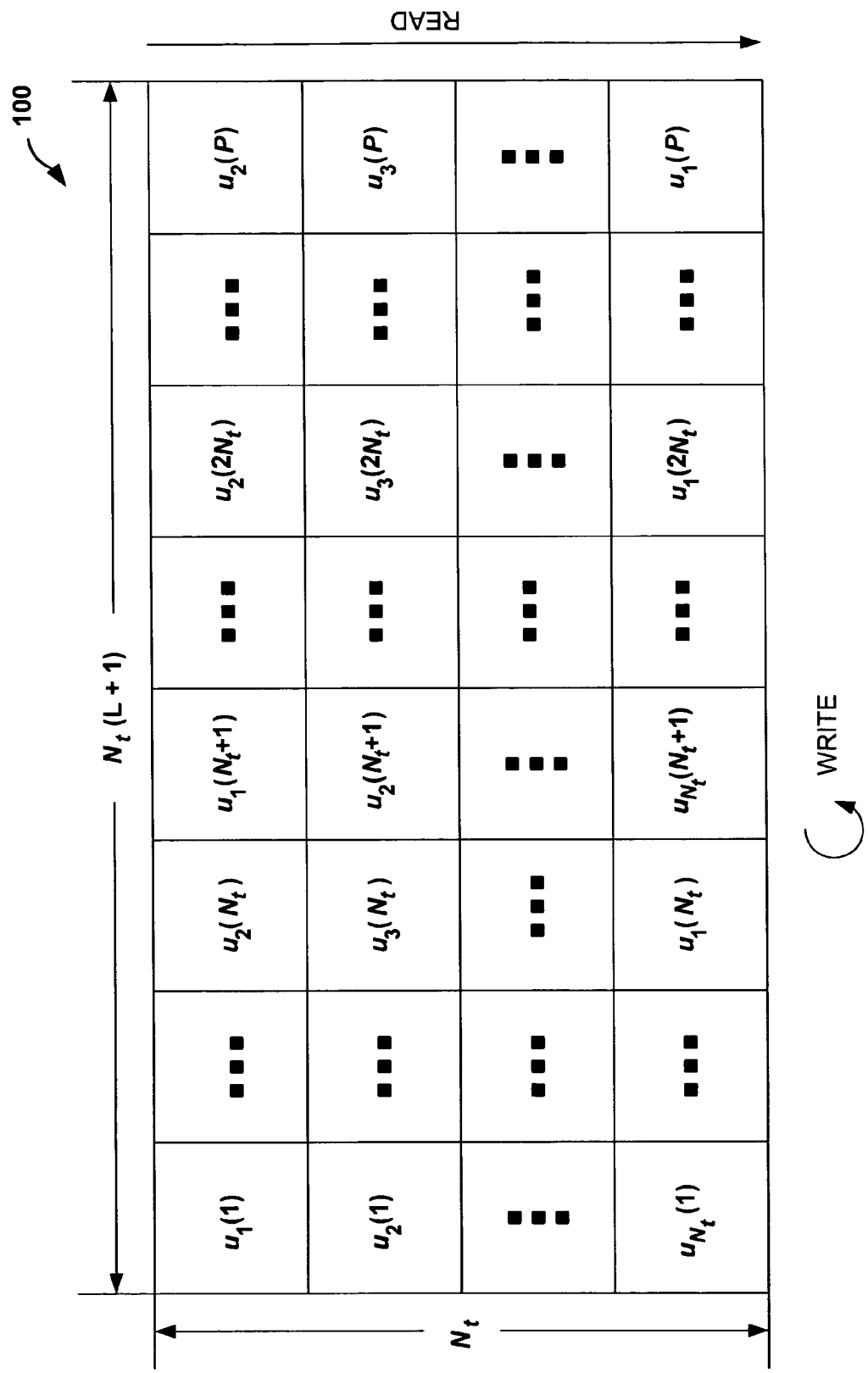
FIG. 8 illustrates an example arrangement of LCF coded information bearing symbols mapped in an array in accordance with the transmitter in FIG. 7.

FIG. 8 illustrates an example arrangement of LCF coded information bearing symbols u mapped in array 100 in accordance with equation (35). In this arrangement, the block of symbols s has length $N_t^2(L+1)$ and comprises $N_g=N_t$ sub-blocks, each sub-block having length $P=N_t(L+1)$. In particular, array 100 comprises L+1 sub-arrays, each having the same structure as the array given in equation (9), i.e. array 30. The LCF coded symbols u are organized in array 100 having $N_t$ rows and $N_t(L+1)$ columns. Each of the LCF encoders $\Theta_g$ of LCF encoder 82 $\Theta$ encodes a corresponding sub-block of symbols $s_g$ to form a respective layer $u_g$. For frequency-selective channels, $\Theta_g$ has larger size $N_t(L+1)$ than $\Theta_g$ for flat-fading channels. However, each layer in array 100 is transmitted over $N_t$ antennas and each layer is spread over at least L+1 frequency bins.

FIG. 9 illustrates an alternative arrangement of LCF coded information bearing symbols u mapped in array 110 in accordance with equation (35) when the block size $N>N_t^2(L+1)$, i.e. when the number of subcarriers $P>N_t(L+1)$. In this arrangement $N_t=4$, L=1, $N_g=1$ and $P=N_gN_t(L+1)$. Identically patterned boxes represent different symbols from the same layer and the layers are interlaced in different groups.

Figure 10:
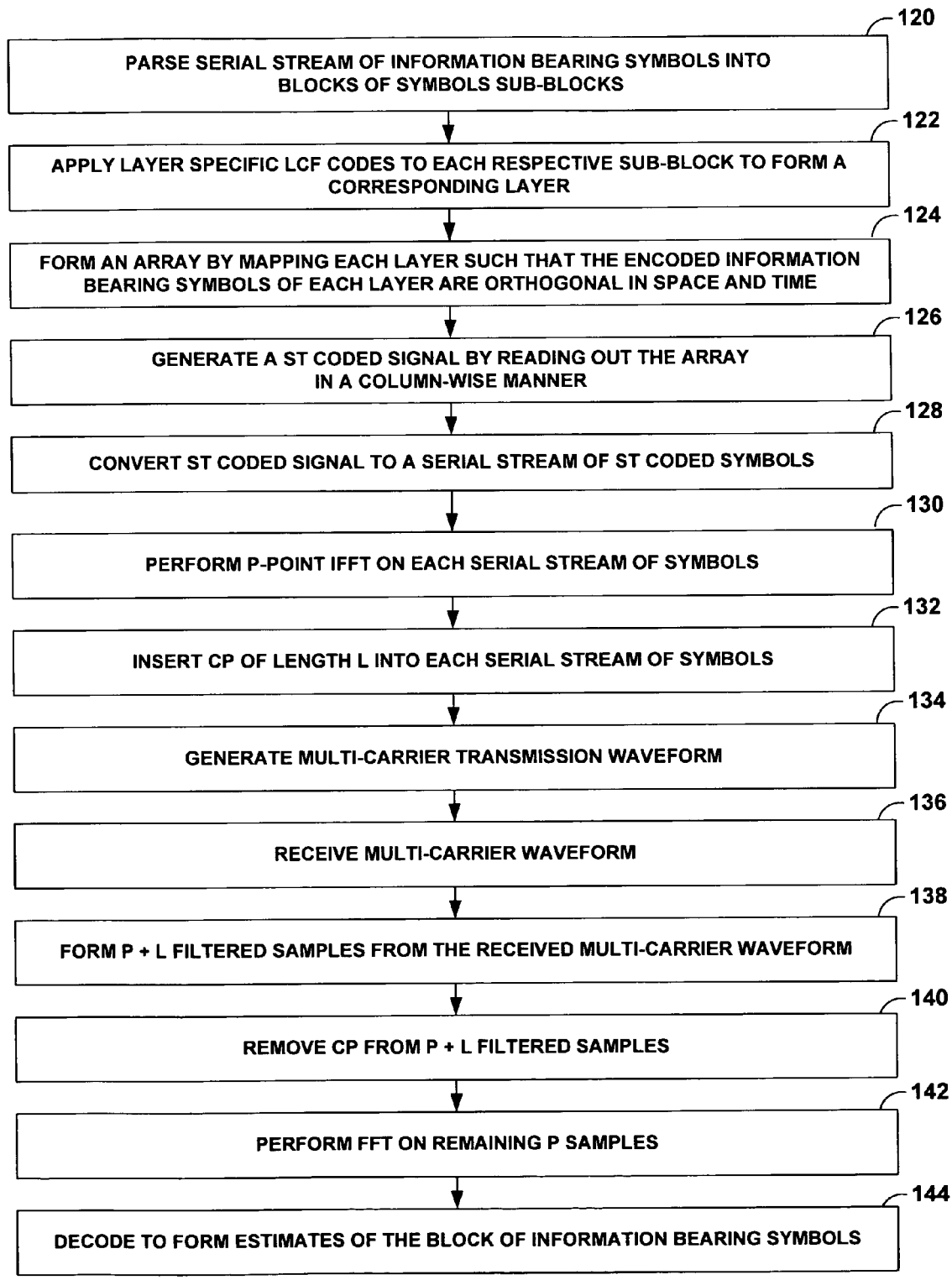
FIG. 10 is a flowchart illustrating an example mode of operation of the wireless communication system in FIG. 6.

FIG. 10 is a flowchart illustrating an example mode of operation of MIMO wireless communication system 2 (FIG. 7) in which transmitter 4B and receiver 6B communicate using the described ST coding techniques through frequency-selective channels 8B. Generally, transmitter 4B parses a serial stream of information bearing symbols into blocks of $N=N_t^2(L+1)$ symbols s (step 120) comprising $N_g=N_t$ sub-blocks, each sub-block including $P=N_t(L+1)$ symbols. LCF encoder $\Theta_g$ of LCF encoder 82 applies layer specific coding to encode a respective one of the sub-blocks to form a corresponding layer (step 122). ST mapper 84 forms an array according to equation (35) by mapping each layer such that the encoded symbols of each layer are orthogonal in space and time (step 124). In particular, the array is arranged such that each layer is transmitted over $N_t$ transmit-antennas and each layers is spread over at least L+1 frequency bins through each transmit-antenna. The array is read out in a column-wise manner to generate a ST coded signal (step 126). Transmitter 4B converts the ST coded signal into a serial stream of ST coded symbols (step 128) for each transmit-antenna 92A-92N. Each serial stream of ST coded symbols is processed by a corresponding P-point IFFT unit 88A-88N (step 130) and a CP of length L is inserted by a respective CP insertion unit 89A-89N (step 132). IFFT units 88A-88N and CP insertion units 89A-89N serve to implement OFDM and to substantially mitigate ISI by converting frequency-selective channels to a set of frequency-flat subchannels. Modulators 90A-90N generate a multi-carrier output waveform to transmit the OFDM-ST coded signal through frequency-selective channels 8B (step 134).

Receiver 6B receives the multi-carrier output waveform (step 136). S/P converters 94A-94N parse the received waveform into P+L filtered samples (step 138). CP removers 97A-97N remove the first L samples to substantially reduce ISI from the corresponding previously received block (step 140). The remaining P samples are processed by FFT units 98A-98N (step 142) and decoded by LCF-ST decoder 99 to yield and estimate ŝ of the information block s (step 144).

FIGS. 11-16 are graphs that illustrate FDFT ST codes for different types of MIMO fading channels, e.g. flat-fading channels, frequency-selective channels, and time-selective channels. The described ST codes for each of the different types of MIMO fading channels are simulated to verify that FDFR are achieved and tradeoffs between performance, rate, and complexity can be selected.

FIG. 11 is a graph illustrating results of a comparison of outage probability Based on Corollary 4, the effects of of $N_t$, $N_r$, and L on the outage probability $\Pr(C_{freq}<R)$ for the described ST coding techniques over time-selective channels with varying values of SNR. In particular, FIG. 11 illustrates the effects of $N_t$, $N_r$, and L on the outage probability. The transmission rate is fixed at R=4 bits pcu, the number of subcarriers P=48, and channel taps are simulated i.i.d. with zero mean and variance 1/(L+1). FIG. 11 illustrates four different designs for the described ST coding techniques for time-selective channels. The first design 150 has configuration ($N_t$, $N_r$, L)=(2, 2, 1), the second design 152 has configuration ($N_t$, $N_r$, L)=(2, 2, 3), the third design 154 has configuration ($N_t$, $N_r$, L)=(2, 4, 1), and the fourth design 156 has configuration ($N_t$, $N_r$, L)=(4, 2, 1).

Clearly, increasing $N_t$, $N_r$, or L causes the outage probability to decrease. When the product $N_tN_r(L+1)$ is fixed, for example $N_tN_r(L+1)=16$, the outage probability has the same slope for moderate to high SNR values. However, because L determines the channel variance and $N_t$ controls the power splitting factor, L and $N_t$ have different effects on the outage probability.

Figure 12:
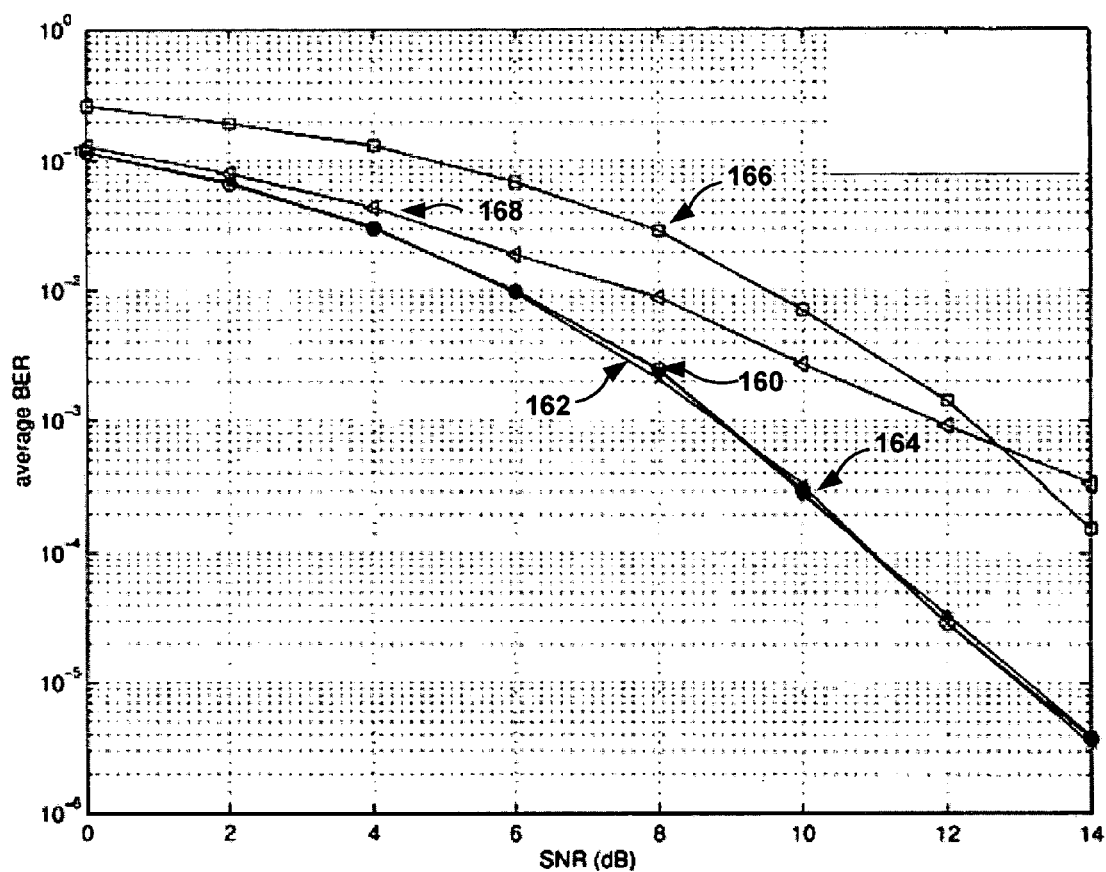

FIG. 12 is a graph illustrating results of a comparison of average BER for the described ST coding techniques over flat-fading channels with varying values of SNR. In particular, binary phase-shift keying (BPSK) is used to signal over an ($N_t$, $N_r$) configuration at transmission rate R=3 bits pcu. The flat-fading channels are i.i.d. Gaussian distributed with zero mean, and unit variance. The channel coherence time is greater than $N_t$. FDFR transmissions are decode using SD. Clearly, the three design schemes, Design A (160), Design B (162), and Design C (164) achieve similar performance with different encoders and the same diversity. Designs A (160), B (162), and C (164) are compared with two conventional ST codes, a high performance representative LCP-STC (166) described in G. B. Giannakis et al. "Space-time diversity systems based on linear constellation precoding," IEEE Transactions on Wireless Communications, vol 2, no. 2, pp. 294-309, Mar. 2003, which is incorporated by reference herein, and a high-rate representative V-BLAST (168) described in P. W. Wolniansky et al. "V-BLAST: An architecture for realizing very high data rates over the rich-scattering wireless channel," Proceedings of URSI International Symposium Signals, Systems, and Electronics, Italy, Sep. 1998, which is incorporated herein by reference. In order to maintain the same transmission rate, 8 QAM is employed for LCP-STC (166) and BPSK for V-BLAST (168). For V-BLAST (168) SD is performed per time slot. At high SNR V-BLAST (168) exhibits lower performance than LCP-ST codes because the maximum achievable diversity for uncoded V-BLAST is $N_r$. Clearly, the described FDFR ST coding techniques have higher performance than V-BLAST (168) and LCP-STC (166) because V-BLAST (168) does not achieve full diversity while LCP-STC (166) incurs rate loss. Furthermore, the described FDFR designs achieve the same full diversity order as LCP-STC (166).

Figure 13:
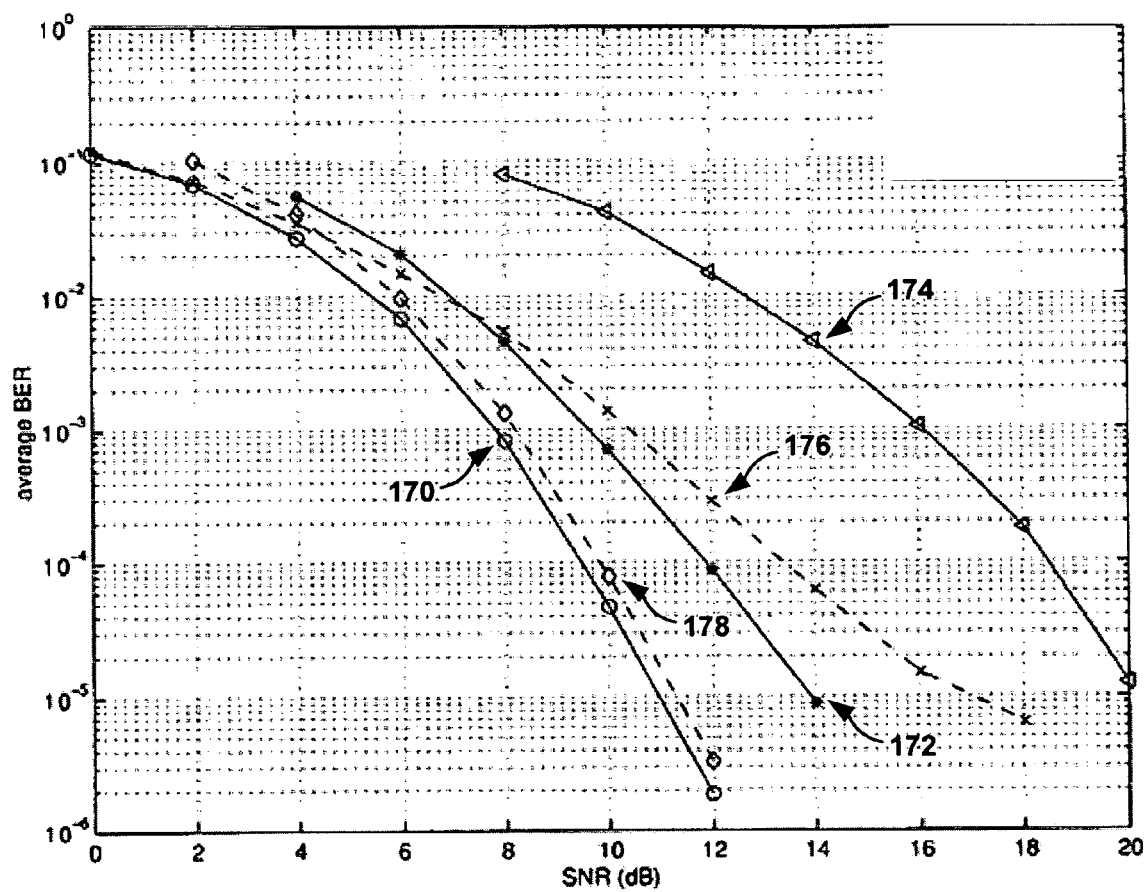

FIG. 13 is a graph illustrating results of a comparison of average BER for the described ST coding techniques over flat-fading channels with varying values of SNR. In particular, performance-complexity tradeoffs in Corollary 1 are demonstrated with a $(N_t, N_r)=(4, 4)$ configuration with fixed transmission power for each of the following three different designs. Assume that the rate is fixed at 4 bits pcu. The first design (170) employs BPSK per layer and includes four layers as given in equation (9) and forms the array given in equation (55). The second design (172) employs quadrature phase-shift keying (QPSK) per layer and includes two layers that form the array given in equation (56). The third design (174) employs 16 QAM and includes one layer that forms the array given in equation (57).

$$C_1 = \begin{bmatrix} u_1(1) & u_4(2) & u_3(3) & u_2(4) \\ u_2(1) & u_1(2) & u_4(3) & u_3(4) \\ u_3(1) & u_2(2) & u_1(3) & u_4(4) \\ u_4(1) & u_3(2) & u_2(3) & u_1(4) \end{bmatrix} \quad (55)$$

$$C_2 = \begin{bmatrix} u_1(1) & 0 & u_3(3) & 0 \\ 0 & u_1(2) & 0 & u_3(4) \\ u_3(1) & 0 & u_1(3) & 0 \\ 0 & u_3(2) & 0 & u_1(4) \end{bmatrix} \quad (56)$$

$$C_3 = \begin{bmatrix} u_1(1) & 0 & 0 & 0 \\ 0 & u_1(2) & 0 & 0 \\ 0 & 0 & u_1(3) & 0 \\ 0 & 0 & 0 & u_1(4) \end{bmatrix} \quad (57)$$

All three designs 170, 172, and 174 achieve similar diversity order when SD is performed at the receiver. However, each design 160, 162, and 164 has substantially different coding gains. The difference in coding gains is primarily a result of their respective constellation sizes. The decoding complexity for each of the three design is $\mathbb{N}(16^3)$, $\mathbb{N}(8^3)$, and $\mathbb{N}(4^3)$ for the first 170, second 172, and third 174 design, respectively.

Maintaining the same transmission rate, it can be determined from the decoding complexity for each design that a tradeoff between decoding complexity and performance can be selected. In particular, by increasing decoding complexity to increase results in an increase in performance.

First, second, and third designs 170, 172, and 174, respectively, are compared with the V-BLAST design 176 and the D-BLAST design 178 described in G. J. Foshini et al. "Layered space-time architecture for wireless communication in fading environments when using multiple antennas," Bell Labs Technical Journal, vol. 2, Autumn 1996, which is incorporate by reference herein. For the D-BLAST design 178, the ST matrix is given according to equation (58).

$$C_{D-BLAST} \begin{bmatrix} u_1(1) & u_2(1) & u_3(1) & & & \\ & \ddots & \ddots & \ddots & & \\ & & u_1(4) & u_2(4) & u_3(4) \end{bmatrix}_{4 \times 6} \quad (58)$$

In order to maintain the same transmission rate while ensuring affordable decoding complexity, three layers are used in D-BLAST design 178 and QPSK modulation is selected to maintain the same rate. Both performance and decoding complexity of the D-BLAST design 178 in equation (58) lie between the performance and decoding complexity for the first and second designs 170 and 172, while the D-BLAST design 178 has longer decoding delay. The V-BLAST design 176 enables a compromise between complexity and performance in comparison to the other illustrated designs. In this example, the V-BLAST design 176 has higher performance that the third design 174 at large SNR.

Figure 14:
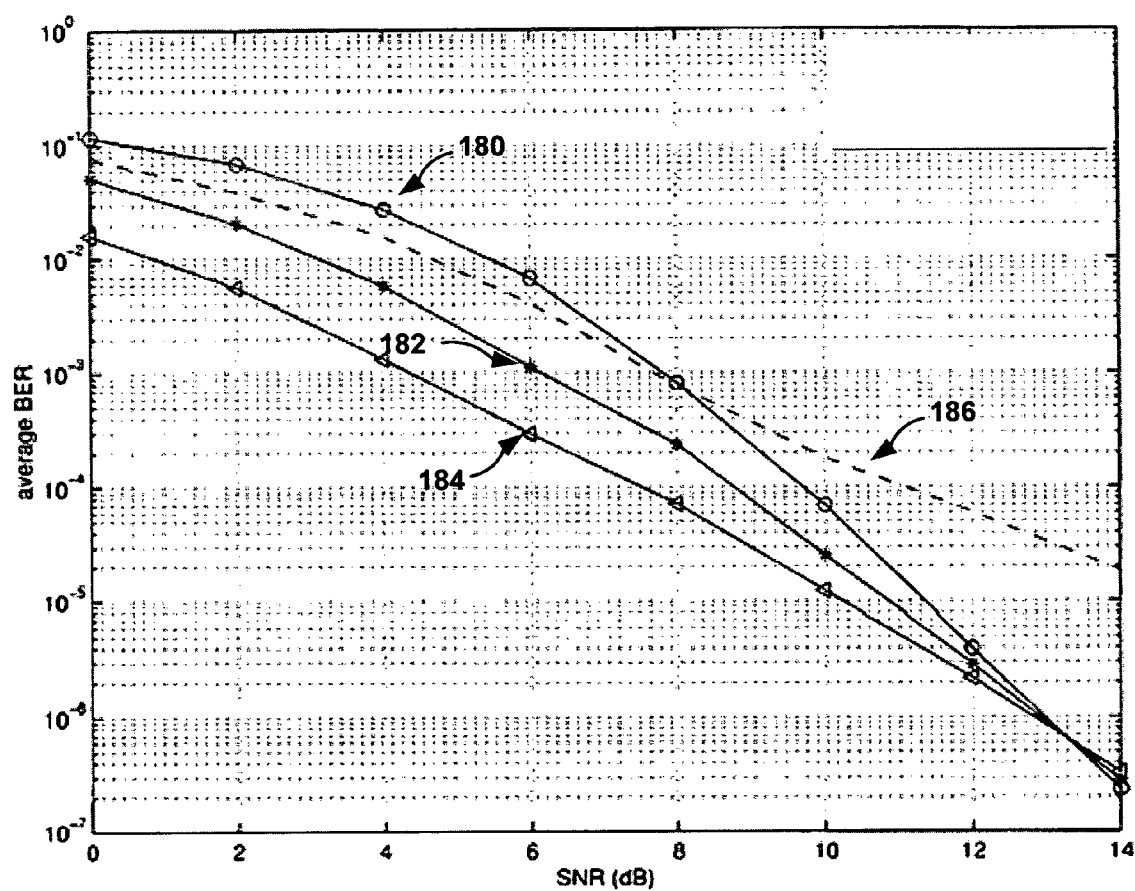

FIG. 14 is a graph illustrating results of a comparison of average BER for the described ST coding techniques over flat-fading channels with varying SNR. In particular, rate-complexity tradeoffs are demonstrated with a $(N_t, N_r)=(4, 4)$ configuration with fixed transmission power for each of the following three different designs. The first, second, and third design is the same as described above, but BPSK is used for each of the three designs. Consequently, the rates for the first, second, and third modified designs, 180, 182, and 186, respectively, are 4, 2, and 1 bits pcu. Again, the decoding complexity for each of the three design is $\mathbb{N}(16^3)$, $\mathbb{N}(8^3)$, and $\mathbb{N}(4^3)$ for the first 180, second 182, and third 184 modified designs, respectively. FIG. 14 illustrates the performance of each of the three designs 180, 182, 184 with different rates. Since the total power transmission is fixed, the lower rate designs that have fewer layers also have higher symbol power. Clearly, the low rate designs have higher performance that the high rate designs at low SNR. Moreover, the slopes of each of the curves is not identical. The slopes of each of the curves is not identical because the SNR is not sufficiently high to achieve full diversity, modified designs 180, 182, and 184 have different coding gains and in order to observe identical slopes, simulations should be performed below BER $10^{-6}$ which is not necessary for the designs that do not include GF error control codes.

The modified designs 180, 182, and 184 are also compared with the LD codes 186 described in R. W. Health et al. "Linear dispersion codes for MIMO systems based on frame theory," IEEE Transactions on Signal Processing, vol. 50, no. 10, pp. 2429-2441, Oct. 2002, which is incorporated herein by reference, with BPSK at transmission rate 2 bits pcu. The complexity for decoding the LD code 186 with SD is the same as the second modified design 182. Clearly, the second modified design 182 has higher performance than the LD code 186.

Figure 15:
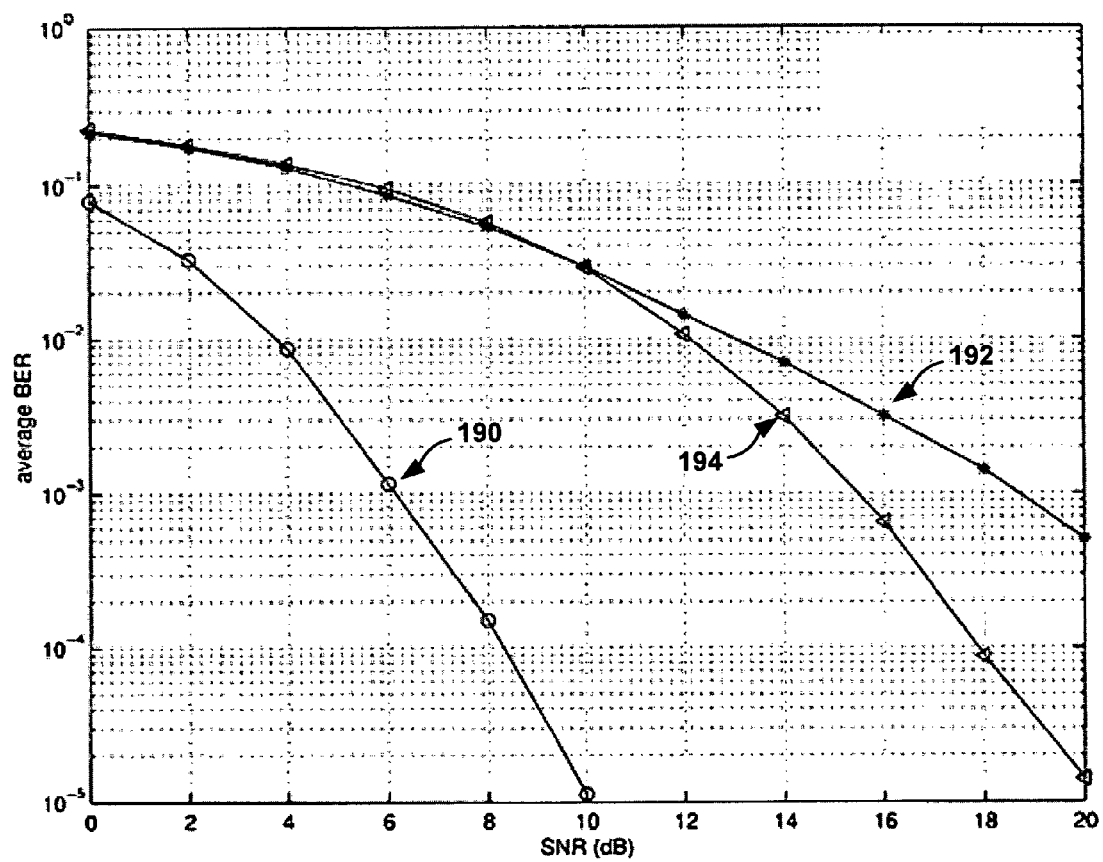

FIG. 15 is a graph illustrating results of a comparison of average BER for the described ST coding techniques over frequency-selective channels with varying values of SNR. In particular, frequency-selective channels with parameters ($N_t$, $N_r$, L)=(2, 2, 1) are considered. Furthermore, the channel taps are independent, and for each channel the power of the taps satisfies an exponentially decaying profile. The described FDFR design 190 is compared with two conventional space-time-frequency codes, V-BLAST-OFDM 192 described in R. J. Piechocki et al. "Performance evaluation of BLAST-OFDM enhanced Hiperlan/2 using simulated and measured channel data," Electronics Letters, vol. 37, no. 18, pp. 1137-1139, Aug. 30, 2001, which is incorporated herein by reference, and GSTF 194 described in G. B. Giannakis et al. "Space-Time-Frequency Coded OFDM over Frequency-Selective Fading Channels," IEEE Transactions on Signal Processing, pp. 2465-2476, Oct. 2002, which is incorporated herein by reference. GSTF 194 is basically a concatenation of ST-OD with OFDM.

The block size P is selected as P=$N_t$(L+1)=4. QPSK is employed for the described FDFR design 190 and V-BLAST-OFDM 192 while 16 QAM is employed for the GSTF design 194 in order to fix the rate at R=8/3 bits pcu. At the receiver, SD is employed for each of the designs 190, 192, and 194. From the slopes of the BER curves, the described FDFR design 190 and GSTF 194 achieve full diversity while V-BLAST-OFDM 192 only achieves diversity order $N_r$. The described FDFR design 190 has higher performance that the GSTF design 194 because a smaller constellation size is used for the FDFR design 190. The decoding complexity of the FDFR design 190 is $\mathbb{N}((N_t^2(L+1))^3)$ while the V-BLAST-OFDM design 192 has $\mathbb{N}(N_t^3)$ and the GSTF design 194 has $\mathbb{N}((L+1)^3)$.

FIG. 16 is a graph illustrating results of a comparison of average BER for the described ST coding techniques over time-selective channels with varying values of SNR. In particular, channels are considered that are changing from symbol to symbol, but not independently. The channels for different antenna pairs are independent and ($N_t$, $N_r$). Each channel is generated based on Jakes' model using carrier frequency $f_0$=5.2 GHz, sampling period $T_s$=43 μs and mobile speed $v_{max}$=100 km/hr. Thus, the maximum frequency shift is $f_{max}$=481 Hz. With block size P=48, it follows that Q=2. Therefore, the Doppler diversity for each time-varying channel is at most Q+1=3. Three encoders with $\Theta_g$'s of different size are simulated to illustrate the effect of Doppler diversity. The first encoder 200 has size $N_t \times N_t$ and the P/N layers are interlaced as illustrated in FIG. 9. At the receiver, the $N_t$ layers are jointly decoded using SD decoding. The second encoder 202 is based on a $2N_t \times 2N_t$ LCF encoder $\Theta_g$ and is also decoded via SD. The decoding complexity of the second encoder 202 is $\mathbb{N}((2N_t^2)^3)$. Thus, the decoding complexity of the second encoder 202 is higher than the decoding complexity of the first encoder 200. The size of the third encoder 204 is increased to $3N_t \times 3N_t$. Clearly, as the size of $\Theta_g$ increases, the diversity order increases since the Doppler effects increase. At the same time, the decoding complexity also increases. When the size of $\Theta_g$ is greater than $N_t$(Q+1), performance gains saturate.

The described ST coding techniques can be embodied in a variety of transmitters and receivers including base stations, cell phones, laptop computers, handheld computing devices, personal digital assistants (PDA's), and the like. The devices may include a digital signal processor (DSP), field programmable gate array (FPGA), application specific integrated circuit (ASIC) or similar hardware, firmware and/or software for implementing the techniques. If implemented in software, a computer readable medium may store computer readable instructions, i.e., program code, that can be executed by a processor or DSP to carry out one of more of the techniques described above. For example, the computer readable medium may comprise random access memory (RAM), read-only memory (ROM), non-volatile random access memory (NVRAM), electrically erasable programmable read-only memory (EEPROM), flash memory, or the like. The computer readable medium may comprise computer readable instructions that when executed in a wireless communication device, cause the wireless communication device to carry out one or more of the techniques described herein. These and other embodiments are within the scope of the following claims.

The invention claimed is:

1. A wireless communication device comprising:
a set of linear complex-field (LCF) encoders that encode a block of information bearing symbols to form a respective set of symbol layers;
a space-time (ST) mapper to generate a ST coded signal by mapping the set of symbol layers in a row circular manner to form an array where the encoded information bearing symbols of each layer are orthogonal in space and time, wherein the ST mapper forms an array of symbols according to the following equation:

$$C = \begin{bmatrix} u_1(1) & \cdots & u_2(N_t) & u_1(N_t+1) & \cdots & u_2(2N_t) & \cdots & u_2(P) \\ u_2(1) & \cdots & u_3(N_t) & u_2(N_t+1) & \cdots & u_3(2N_t) & \cdots & u_3(P) \\ \vdots & \cdots & \vdots & \vdots & \cdots & \vdots & & \vdots \\ u_{N_t}(1) & \cdots & u_1(N_t) & u_{N_t}(N_t+1) & \cdots & u_1(2N_t) & \cdots & u_1(P) \end{bmatrix},$$

where C represents the array, wherein C includes (L+1) sub-arrays described by the following equation: C=[A(0) A(1) ... A(L)], where (L+1) represents a number of channel taps of a wireless channel, and each sub-array, A(y), is described by the following equation:

$$A(y) = \begin{bmatrix} u_1(y \cdot N_t + 1) & u_{N_t}(y \cdot N_t + 2) & \ldots & u_2(y \cdot N_t + N_t) \\ u_2(y \cdot N_t + 1) & u_1(y \cdot N_t + 2) & \ldots & u_3(y \cdot N_t + N_t) \\ \vdots & \vdots & \ldots & \vdots \\ u_{N_t}(y \cdot N_t + 1) & u_{N_t-1}(y \cdot N_t + 2) & \ldots & u_1(y \cdot N_t + N_t) \end{bmatrix},$$

where $u_g(n)$ represents a nth information bearing symbol of a gth layer, $N_t$ represents a number of transmit antennas, and P represents the number of transmit antennas multiplied with the number of channel taps of the wireless channel; and
a modulator to produce a multi-carrier waveform in accordance with the ST coded signal for transmission through the wireless channel.

2. The wireless communication device of claim 1, wherein the set of LCF encoders encode blocks of information bearing symbols having $N_t^2$(L+1) information bearing symbols per block, where N, represents a number of transmit-antennas and (L+1) represents the number of channel taps of the wireless channel.

3. The wireless communication device of claim 2, wherein the block of information bearing symbols comprises $N_t$ sub-blocks of information bearing symbols, and each of the LCF encoders encodes a corresponding one of the Nt sub-blocks to form a respective one of the symbol layers.

4. The wireless communication device of claim 3, wherein each sub-block includes $N_t$(L+1) information bearing symbols.

5. The wireless communication device of claim 1,
wherein the block of information bearing symbols comprises a plurality of sub-blocks of information bearing symbols, and
wherein the set of LCF encoders encode corresponding sub-blocks of information bearing symbols to form the respective symbol layer.

6. The wireless communication device of claim 1, wherein the set of LCF encoders encodes the symbols in accordance with the following equation:

$$\Theta_g = \beta^{g-1}\Theta,$$

where $\Theta_g$ represents a square matrix corresponding to an LCF encoder of a gth layer, $\beta^{g-1}$ represents a scalar corresponding to the gth layer, and $\Theta$ represents a unitary square Vandermonde matrix.

7. The wireless communication device of claim 1, wherein the ST mapper forms the array with no zero entries.

8. The wireless communication channel of claim 1, wherein each of the LCF encoders operates on a sub-block having a reduced number of symbols $N_d$ that is less than $N_t(L+1)$, where $N_t$ represents a number of transmit-antennas and $(L+1)$ represents the number of channel taps of the wireless channel.

9. The wireless communication device of claim 1, wherein the ST mapper combines at least two of the symbol layers to form one layer.

10. The wireless communication device of claim 1, wherein the ST mapper substantially eliminates one or more of the symbol layers by inserting null symbols.

11. The wireless communication device of claim 1, further comprising a plurality of transmit antennas, wherein each layer is transmitted over the transmit antennas and each layer is spread over at least L+1 frequency bins, where (L+1) represents the number of channel taps of the wireless channel.

12. The wireless communication device of claim 1, wherein the multi-carrier waveform does not incur a substantial loss of mutual information.

13. The wireless communication device of claim 1, wherein the modulator produces an orthogonal frequency-division multiplexing (OFDM) signal.

14. The wireless communication device of claim 1, wherein the wireless communication channel is one of a frequency-selective wireless channel and a time-selective wireless channel.

15. The wireless communication device of claim 1, wherein the set of LCF encoders encode the block of information bearing symbols in accordance with a set of layer-specific parameters, and wherein the set of layer-specific parameters comprises a set of layer-specific square matrices, and wherein each layer-specific square matrix is a multiple of a single unitary square Vandermonde matrix.

16. The wireless communication device of claim 1, wherein the multi-carrier waveform achieves full diversity and full rate.

17. A wireless communication device comprising:
a set of linear complex-field (LCF) encoders that encode a block of information bearing symbols to form a respective set of symbol layers;
a space-time (ST) mapper to generate a ST coded signal by mapping the set of symbol layers in a row circular manner to form an array where the encoded information bearing symbols of each layer are orthogonal in space and time; and
a modulator to produce a multi-carrier waveform in accordance with the ST coded signal for transmission through a wireless channel,
wherein the set of LCF encoders encode the symbols in accordance with the following equation:

$$\Theta_g = \beta^{g-1}\Theta,$$

where $\Theta_g$ represents a square matrix corresponding to an LCF encoder of a gth layer, $\beta^{g-1}$ represents a scalar corresponding to the gth layer, and $\Theta$ represents a unitary square Vandermonde matrix, and wherein $\Theta$ is given according to the following equation:

$$\Theta = \frac{1}{\sqrt{N_t}} F_{N_t}^H diag[1, \alpha, \ldots, \alpha^{N_t-1}],$$

where $N_t$ represents a number of transmit antennas, $F_{N_t}^H$ represents a Hermitian transpose of a $N_t(L+1) \times N_t(L+1)$ Fast Fourier Transform (FFT) matrix with (m+1, n+1)th entry $e^{-j2\pi mn/(N_t(L+1))}$, (L+1) represents a number of channel taps of the wireless channel, and $\alpha$ is a scalar.

18. The wireless communication device of claim 17, wherein $(\alpha, \beta)$ is selected to achieve full diversity and full rate.

19. The wireless communication device of claim 17, wherein $\alpha$ is selected such that the minimum polynomial of $\alpha$ over a field $\Theta(j)$ has degree at least equal to $N_t(L+1)$ and $\beta$ is selected such that the minimum polynomial of $\beta^{N(L+1)}$ in the field $\Theta(j)(e^{j2\pi/(N_t(L+1))})(\alpha)$ has degree greater than or equal to $N_t(L+1)$.

20. The wireless communication device of claim 17, wherein $\beta$ is selected such that $\beta^{N_t(L+1)} = \alpha$ and $\alpha$ is selected such that the minimum polynomial of $\alpha$ in a field $\Theta(j)(e^{j2\pi/(N_t(L+1))})(\alpha)$ has degree greater than or equal to $N_t^2(L+1)$.

21. The wireless communication device of claim 17, wherein $\alpha$ is selected such that the minimum polynomial of $\alpha$ in a field $\Theta(j)$ has degree greater than or equal to $N_t(L+1)$ and $\beta$ is selected as a transcendental number in the field $\Theta(j))(e^{j2\pi/(N_t(L+1))})(\alpha)$.

22. The wireless communication device of claim 17, wherein the ST mapper forms an array of symbols according to the following equation:

$$C = \begin{bmatrix} u_1(1) & \cdots & u_2(N_t) & u_1(N_t+1) & \cdots & u_2(2N_t) & \cdots & u_2(P) \\ u_2(1) & \cdots & u_3(N_t) & u_2(N_t+1) & \cdots & u_3(2N_t) & \cdots & u_3(P) \\ \vdots & \cdots & \vdots & \vdots & & \vdots & & \vdots \\ u_{N_t}(1) & \cdots & u_1(N_t) & u_{N_t}(N_t+1) & \cdots & u_1(2N_t) & \cdots & u_1(P) \end{bmatrix},$$

where C represents the array, wherein C includes (L+1) sub-arrays described by the following equation: C=[A(0) A(1) . . . A(L)], where (L+1) represents a number of channel taps of the wireless channel, and each sub-array, A(y), is described by the following equation:

$$A(y) = \begin{bmatrix} u_1(y \cdot N_t+1) & u_{N_t}(y \cdot N_t+2) & \ldots & u_2(y \cdot N_t+N_t) \\ u_2(y \cdot N_t+1) & u_1(y \cdot N_t+2) & \ldots & u_3(y \cdot N_t+N_t) \\ \vdots & \vdots & \ldots & \vdots \\ u_{N_t}(y \cdot N_t+1) & u_{N_t-1}(y \cdot N_t+2) & \ldots & u_1(y \cdot N_t+N_t) \end{bmatrix},$$

where $u_g(n)$ represents a nth information bearing symbol of a gth layer, $N_t$ represents the number of transmit antennas, and P represents the number of transmit antennas multiplied with the number of channel taps of the wireless channel.

23. A method comprising:
linearly encoding a block of information bearing symbols with a set of complex-field codes selected from a constellation to produce a respective set of symbol layers;
forming an array from the set of symbol layers by mapping the set of symbol layers in a row circular manner such that the encoded information bearing symbols of each of the symbol layers are orthogonal in space and time, wherein forming the array comprises forming the array of symbol layers according to the following equation:

$$C = \begin{bmatrix} u_1(1) & \ldots & u_2(N_t) & u_1(N_t+1) & \ldots & u_2(2N_t) & \ldots & u_2(P) \\ u_2(1) & \ldots & u_3(N_t) & u_2(N_t+1) & \ldots & u_3(2N_t) & \ldots & u_3(P) \\ \vdots & \ldots & \vdots & \vdots & \ldots & \vdots & & \vdots \\ u_{N_t}(1) & \ldots & u_1(N_t) & u_{N_t}(N_t+1) & \ldots & u_1(2N_t) & \ldots & u_1(P) \end{bmatrix},$$

where C represents the array, wherein C includes (L+1) sub-arrays described by the following equation: C=[A(0) A(1) ... A(L)], where (L+1) represents a number of channel taps of a wireless channel, and each sub-array, A(y), is described by the following equation:

$$A(y) = \begin{bmatrix} u_1(y \cdot N_t + 1) & u_{N_t}(y \cdot N_t + 2) & \ldots & u_2(y \cdot N_t + N_t) \\ u_2(y \cdot N_t + 1) & u_1(y \cdot N_t + 2) & \ldots & u_3(y \cdot N_t + N_t) \\ \vdots & \vdots & \ldots & \vdots \\ u_{N_t}(y \cdot N_t + 1) & u_{N_t-1}(y \cdot N_t + 2) & \ldots & u_1(y \cdot N_t + N_t) \end{bmatrix},$$

where $u_g(n)$ represents an nth information bearing symbol of a gth symbol layer, $N_t$ represents a number of transmit antennas, and P represents a number of transmit antennas multiplied with a number of channel taps of the wireless channel;

generating a space-time (ST) coded signal from the array of symbol layers;

modulating the ST coded signal to produce a multi-carrier waveform; and transmitting the multi-carrier waveform through the wireless channel.

24. The method of claim 23, wherein linearly encoding comprises linearly encoding a block of information bearing symbols having $N_t^2(L+1)$ information bearing symbols, where $N_t$ represents the number of transmit-antennas and (L+1) represents the number of channel taps of the wireless channel, and wherein transmitting the multi-carrier waveform comprises transmitting the multi-carrier waveform over the $N_t$ transmit-antennas.

25. The method of claim 24, wherein the block of information bearing symbols comprises $N_t$ sub-blocks of information bearing symbols.

26. The method of claim 25, wherein each sub-block includes $N_t(L+1)$ information bearing symbols, where $N_t$ represents the number of transmit-antennas and (L+1) represents the number of channel taps of the wireless channel.

27. The method of claim 25, wherein linearly encoding comprises applying a corresponding one of the set of codes to each sub-block of information bearing symbols to produce a respective one of the layer layers.

28. The method of claim 23, wherein the set of codes is given according to the following equation:

$$\Theta_g = \beta^{g-1}\Theta,$$

where $\Theta_g$ represents a square matrix corresponding to a code for a gth layer, $\beta^{g-1}$ represents a scalar corresponding to the gth layer, and $\Theta$ represents a unitary square Vandermonde matrix.

29. The method of claim 23, wherein the array has no zero entries.

30. The method of claim 23, wherein each of the layers has reduced size $N_d$ less than $N_t(L+1)$, where $N_t$ represents the number of transmit-antennas and (L+1) represents the number of channel taps of the wireless channel.

31. The method of claim 23, further comprising combining at least two layers to form one a layer when forming the matrix.

32. The method of claim 23, further comprising substantially eliminating one or more of the layers by inserting null symbols when forming the matrix.

33. The method of claim 23, wherein transmitting the multi-carrier waveform comprises transmitting each of the symbol layers over $N_t$ transmit antennas and spreading each of the symbol layers over at least L+1 frequency bins, where (L+1) represents the number of channel taps of the wireless channel.

34. The method of claim 23, wherein the multi-carrier waveform does not incur a substantial loss of mutual information.

35. The method of claim 23, wherein modulating the ST coded signal comprises producing an orthogonal frequency-division multiplexing (OFDM) signal.

36. The method of claim 23, wherein the wireless communication channel is one of a frequency-selective wireless channel and a time-selective wireless channel.

37. The method of claim 23, further comprising receiving the multi-carrier waveform and decoding the received multi-carrier waveform to form estimates of the information bearing symbols based on the received multi-carrier waveform.

38. The method of claim 37, wherein decoding comprises decoding using maximum likelihood (ML) decoding, sphere decoding (SD), semi-definite programming, nulling-cancelling decoding or linear decoding.

39. The method of claim 23, wherein the set of complex-field codes is defined by a set of layer-specific square matrices, and wherein each layer-specific square matrix is a multiple of a single unitary square Vandermonde matrix.

40. The method of claim 23, wherein the multi-carrier waveform achieves full diversity and full rate.

41. A method comprising:

linearly encoding a block of information bearing symbols with a set of complex-field codes selected from a constellation to produce a respective set of symbol layers;

forming an array from the set of symbol layers by mapping the set of symbol layers in a row circular manner such that the encoded information bearing symbols of each of the symbol layers are orthogonal in space and time;

generating a space-time (ST) coded signal from the array of symbol layers;

modulating the ST coded signal to produce a multi-carrier waveform; and transmitting the multi-carrier waveform through a wireless channel, wherein the set of codes is given according to the following equation:

$$\Theta_g = \beta^{g-1}\Theta,$$

where $\Theta_g$ represents a square matrix corresponding to a code for a gth layer, $\beta^{g-1}$ represents a scalar corresponding to the gth layer, and $\Theta$ represents a unitary square Vandermonde matrix, and wherein $\Theta$ is given according to the following equation $$\Theta = \frac{1}{\sqrt{N_t}} F_{N_t}^H diag[1, \alpha, \ldots, \alpha^{N_t-1}],$$

where $N_t$ represents a number of transmit antennas, $F_N^H$ represents a Hermitian transpose of a $N_t(L+1) \times N_t(L+1)$ Fast Fourier Transform (FFT) matrix with (m+1, n+1)th entry $e^{-j2\pi mn/(N_t(L+1))}$, (L+1) represents a number of channel taps of the wireless channel, and $\alpha$ is a scalar.

42. The method of claim 41, further comprising selecting ($\alpha$, $\beta$) to achieve full diversity and full rate.

43. The method of claim 41, further comprising:
selecting α such that the minimum polynomial of α over a field Θ(j) has degree at least equal to $N_t(L+1)$; and
selecting β such that the minimum polynomial of $β^{N_t(L+1)}$ in the field $Θ(j)(e^{j2π/(N_t(L+1))})(α)$ has degree greater than or equal to $N_t(L+1)$.

44. The method of claim 41, wherein β is selected such that $β^{N_t(L+1)}=α$ and α is selected such that the minimum polynomial of α in a field $Θ(j)(e^{j2π/(N_t(L+1))})(α)$ has degree greater than or equal to $N_t^2(L+1)$.

45. The method of claim 41, wherein α is selected such that the minimum polynomial of α in a field Θ(j) has degree greater than or equal to $N_t(L+1)$ and β is selected as a transcendental number in the field $Θ(j)(e^{j2π/(N_t(L+1))})(α)$.

46. The method of claim 41, wherein forming an array comprising forming the array of symbol layers according to the following equation:

$$C = \begin{bmatrix} u_1(1) & \ldots & u_2(N_t) & u_1(N_t+1) & \ldots & u_2(2N_t) & \ldots & u_2(P) \\ u_2(1) & \ldots & u_3(N_t) & u_2(N_t+1) & \ldots & u_3(2N_t) & \ldots & u_3(P) \\ \vdots & \ldots & \vdots & \vdots & \ldots & \vdots & & \vdots \\ u_{N_t}(1) & \ldots & u_1(N_t) & u_{N_t}(N_t+1) & \ldots & u_1(2N_t) & \ldots & u_1(P) \end{bmatrix},$$

where C represents the array, wherein C includes (L+1) sub-arrays described by the following equation: C=[A(0) A(1) ... A(L)], where (L+1) represents the number of channel taps of the wireless channel, and each sub-array, A(y), is described by the following equation:

$$A(y) = \begin{bmatrix} u_1(y \cdot N_t+1) & u_{N_t}(y \cdot N_t+2) & \ldots & u_2(y \cdot N_t+N_t) \\ u_2(y \cdot N_t+1) & u_1(y \cdot N_t+2) & \ldots & u_3(y \cdot N_t+N_t) \\ \vdots & \vdots & \ldots & \vdots \\ u_{N_t}(y \cdot N_t+1) & u_{N_t-1}(y \cdot N_t+2) & \ldots & u_1(y \cdot N_t+N_t) \end{bmatrix},$$

where $u_g(n)$ represents an nth information bearing symbol of a gth symbol layer, $N_t$ represents the number of transmit antennas, and P represents a number of transmit antennas multiplied with a number of channel taps of the wireless channel.

47. A computer-readable medium storing a program comprising instructions that cause a programmable processor of a wireless communication device to:
linearly encode a block of information bearing symbols with a set of complex-field codes selected from a constellation to produce a respective set of symbol layers;
form an array from the set of symbol layers by mapping the set of symbol layers in a row circular manner so that the encoded information bearing symbols of each layer are orthogonal in space and time, wherein the instructions for causing the programmable processor to form the array comprise instructions for causing the programmable processor to form the array of symbol layers according to the following equation:

$$C = \begin{bmatrix} u_1(1) & \ldots & u_2(N_t) & u_1(N_t+1) & \ldots & u_2(2N_t) & \ldots & u_2(P) \\ u_2(1) & \ldots & u_3(N_t) & u_2(N_t+1) & \ldots & u_3(2N_t) & \ldots & u_3(P) \\ \vdots & \ldots & \vdots & \vdots & \ldots & \vdots & & \vdots \\ u_{N_t}(1) & \ldots & u_1(N_t) & u_{N_t}(N_t+1) & \ldots & u_1(2N_t) & \ldots & u_1(P) \end{bmatrix},$$

where C represents the array, wherein C includes (L+1) sub-arrays described by the following equation: C=[A(0) A(1) ... A(L)], where (L+1) represents a number of channel taps of a wireless channel, and each sub-array, A(y), is described by the following equation:

$$A(y) = \begin{bmatrix} u_1(y \cdot N_t+1) & u_{N_t}(y \cdot N_t+2) & \ldots & u_2(y \cdot N_t+N_t) \\ u_2(y \cdot N_t+1) & u_1(y \cdot N_t+2) & \ldots & u_3(y \cdot N_t+N_t) \\ \vdots & \vdots & \ldots & \vdots \\ u_{N_t}(y \cdot N_t+1) & u_{N_t-1}(y \cdot N_t+2) & \ldots & u_1(y \cdot N_t+N_t) \end{bmatrix},$$

where $u_g(n)$ represents an nth information bearing symbol of a gth symbol layer, $N_t$ represents a number of transmit antennas, and P represents a number of transmit antennas multiplied with the number of channel taps of the wireless channel;
generate a space-time (ST) coded signal by reading out the array in a column-wise manner;
modulate the ST coded signal to produce a multi-carrier waveform; and
transmit the multi-carrier waveform through the wireless channel.

48. A computer-readable medium storing a program comprising instructions that cause a programmable processor of a wireless communication device to:
linearly encode a block of information bearing symbols with a set of complex-field codes selected from a constellation to produce a respective set of symbol layers;
form an array from the set of symbol layers by mapping the set of symbol layers in a row circular manner so that the encoded information bearing symbols of each layer are orthogonal in space and time;
generate a space-time (ST) coded signal by reading out the array in a column-wise manner;
modulate the ST coded signal to produce a multi-carrier waveform; and
transmit the multi-carrier waveform through a wireless channel,
wherein the set of codes is given according to the following equation:

$$Θ_g = β^{g-1}Θ,$$

where $Θ_g$ represents a square matrix corresponding to a complex-field code for a gth layer, $β^{g-1}$ represents a scalar corresponding to the gth layer, and Θ represents a unitary square Vandermonde matrix, and wherein Θ is given according to the following equation $$Θ = \frac{1}{\sqrt{N_t}} F_{N_t}^H \text{diag}[1, α, \ldots, α^{N_t-1}],$$

where $N_t$ represents a number of transmit antennas, $F_{N_t}^H$ represents a Hermitian transpose of a $N_t(L+1) \times N_t(L+1)$ Fast Fourier Transform (FFT) matrix with (m+1, n+1)th entry $e^{-j2πmn/(N_t(L+1))}$, (L+1) represents a number of channel taps of the wireless channel, and α is a scalar.

* * * * *